US011308794B2

(12) United States Patent
Dimberg et al.

(10) Patent No.: US 11,308,794 B2
(45) **Date of Patent: *Apr. 19, 2022**

(54) BATTERY-POWERED RETROFIT REMOTE CONTROL DEVICE

(71) Applicant: Lutron Technology Company LLC, Coopersburg, PA (US)

(72) Inventors: Chris Dimberg, Easton, PA (US); Matthew Philip McDonald, Phoenixville, PA (US); William Taylor Shivell, Breinigsville, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/891,998

(22) Filed: Jun. 3, 2020

(65) Prior Publication Data

US 2020/0296816 A1 Sep. 17, 2020

Related U.S. Application Data

(63) Continuation of application No. 16/721,324, filed on Dec. 19, 2019, now Pat. No. 10,721,811, which is a (Continued)

(51) Int. Cl.

*G08C 17/02* (2006.01)
*H01H 25/06* (2006.01)

(Continued)

(52) U.S. Cl.

CPC ............. *G08C 17/02* (2013.01); *G05G 1/105* (2013.01); *H01H 25/065* (2013.01); *H02J 7/007* (2013.01);

(Continued)

(58) Field of Classification Search

CPC ...... G08C 17/02; H05B 47/19; H05B 47/175; H01H 25/065; H01H 3/02; G05G 1/105; H02J 7/0047; H02J 7/007

See application file for complete search history.

(56) References Cited

U.S. PATENT DOCUMENTS 5,264,761 A 11/1993 Johnson
5,905,442 A 5/1999 Mosebrook et al.

(Continued)

FOREIGN PATENT DOCUMENTS

CN 2596671 Y 12/2003
CN 201584381 U 9/2010

(Continued)

*Primary Examiner* — Minh D A

(74) *Attorney, Agent, or Firm* — Flaster Greenberg, P.C.

(57) ABSTRACT

A remote control device may be configured to be mounted over the toggle actuator of a light switch and to control a load control device. The remote control device may include a mounting assembly and a control unit that is removably attachable to the mounting assembly. The mounting assembly may include a release tab that is configured to be operated from a locking position in which the control unit is secured to the mounting assembly, to a release position in which the control unit may be detached from the mounting assembly. The mounting assembly may include a clamp that is configured to engage with the toggle actuator of a mechanical switch to which the remote control device is mounted.

19 Claims, 38 Drawing Sheets

Related U.S. Application Data continuation of application No. 16/296,813, filed on Mar. 8, 2019, now Pat. No. 10,548,205, which is a continuation of application No. 15/612,970, filed on Jun. 2, 2017, now Pat. No. 10,237,954.

(60) Provisional application No. 62/411,223, filed on Oct. 21, 2016, provisional application No. 62/356,179, filed on Jun. 29, 2016, provisional application No. 62/345,222, filed on Jun. 3, 2016.

(51) Int. Cl.

| | |
|---|---|
| ***H05B 47/19*** | (2020.01) |
| ***H05B 47/175*** | (2020.01) |
| ***G05G 1/10*** | (2006.01) |
| ***H02J 7/00*** | (2006.01) |
| *H01H 3/02* | (2006.01) |

(52) U.S. Cl.

CPC .......... *H02J 7/0047* (2013.01); *H05B 47/175* (2020.01); *H05B 47/19* (2020.01); *H01H 3/02* (2013.01)

(56) References Cited

U.S. PATENT DOCUMENTS

| | | | |
|---|---|---|---|
| 7,573,208 | B2 | 8/2009 | Newman, Jr. |
| 7,834,856 | B2 | 11/2010 | Grinshpoon et al. |
| 7,940,167 | B2 | 5/2011 | Steiner et al. |
| 8,009,042 | B2 | 8/2011 | Steiner et al. |
| 8,199,010 | B2 | 6/2012 | Sloan et al. |
| 8,330,638 | B2 | 12/2012 | Altonen et al. |
| 8,410,706 | B2 | 4/2013 | Steiner et al. |
| 8,451,116 | B2 | 5/2013 | Steiner et al. |
| 9,208,965 | B2 | 12/2015 | Busby et al. |
| 9,418,802 | B2 | 8/2016 | Romano et al. |
| 9,520,247 | B1 | 12/2016 | Finnegan et al. |
| 9,565,742 | B2 | 2/2017 | Swatsky et al. |
| 9,583,288 | B2 | 2/2017 | Jones et al. |
| 9,633,557 | B2 | 4/2017 | Dimberg et al. |
| 9,799,469 | B2 | 10/2017 | Bailey et al. |
| 9,959,997 | B2 | 5/2018 | Bailey et al. |
| 10,237,954 | B2 * | 3/2019 | Dimberg .............. H01H 25/065 |
| 10,548,205 | B2 * | 1/2020 | Dimberg ................ G05G 1/105 |
| 10,721,811 | B2 * | 7/2020 | Dimberg ............... H02J 7/0047 |
| 2008/0111491 | A1 | 5/2008 | Spira |
| 2009/0206983 | A1 | 8/2009 | Knode et al. |
| 2010/0191186 | A1 | 7/2010 | Blumberg, Jr. et al. |
| 2011/0186177 | A1 | 8/2011 | Lanier, Jr. et al. |
| 2011/0259722 | A1 | 10/2011 | Alderson et al. |
| 2012/0292174 | A1 | 11/2012 | Mah et al. |
| 2013/0076555 | A1 | 3/2013 | Altonen et al. |
| 2013/0222122 | A1 | 8/2013 | Killo et al. |
| 2013/0299371 | A1 | 11/2013 | Johansson |
| 2014/0117859 | A1 | 5/2014 | Swatsky et al. |
| 2014/0117871 | A1 | 5/2014 | Swatsky et al. |
| 2015/0077021 | A1 | 3/2015 | Smith et al. |
| 2015/0371534 | A1 | 12/2015 | Dimberg et al. |
| 2016/0073479 | A1 | 3/2016 | Erchak et al. |
| 2017/0105176 | A1 | 4/2017 | Finnegan et al. |
| 2017/0193814 | A1 | 7/2017 | Dimberg et al. |
| 2018/0190451 | A1 | 7/2018 | Scruggs |

FOREIGN PATENT DOCUMENTS

| | | | |
|---|---|---|---|
| CN | 102084446 | A | 6/2011 |
| CN | 104271467 | A | 1/2015 |
| WO | WO 2014/179531 | A2 | 11/2014 |
| WO | 2017165858 | A2 | 9/2017 |

* cited by examiner

BATTERY-POWERED RETROFIT REMOTE CONTROL DEVICE

CROSS-REFERENCE TO RELATED APPLICATIONS

This application is a continuation of U.S. application Ser. No. 16/721,324, filed Dec. 19, 2019, which is a continuation of U.S. application Ser. No. 16/296,813, filed Mar. 8, 2019, now issued as U.S. Pat. No. 10,548,205 on Jan. 28, 2020, which is a continuation of U.S. application Ser. No. 15/612,970, filed Jun. 2, 2017, now issued as U.S. Pat. No. 10,237,954 on Mar. 19, 2019, which claims the benefit of provisional U.S. patent application No. 62/345,222, filed Jun. 3, 2016, provisional U.S. patent application No. 62/356,179, filed Jun. 29, 2016, and provisional U.S. patent application No. 62/411,223, filed Oct. 21, 2016, the disclosures of which are incorporated herein by reference in their respective entireties.

BACKGROUND

In accordance with prior art installations of load control systems, one or more standard mechanical toggle switches may be replaced by more advanced load control devices (e.g., dimmer switches). Such a load control device may operate to control an amount of power delivered from an alternative current (AC) power source to an electrical load.

The procedure of replacing a standard mechanical toggle switch with a load control device typically requires disconnecting electrical wiring, removing the mechanical toggle switch from an electrical wallbox, installing the load control device into the wallbox, and reconnecting the electrical wiring to the load control device.

Often, such a procedure is performed by an electrical contractor or other skilled installer. Average consumers may not feel comfortable undertaking the electrical wiring that is necessary to complete installation of a load control device. Accordingly, there is a need for a load control system that may be installed into an existing electrical system that has a mechanical toggle switch, without requiring any electrical wiring work.

SUMMARY

As described herein, a remote control device may provide a simple retrofit solution for an existing switched control system. Implementation of the remote control device, for example in an existing switched control system, may enable energy savings and/or advanced control features, for example without requiring any electrical re-wiring and/or without requiring the replacement of any existing mechanical switches.

The remote control device may be configured to associate with, and control, a load control device of a load control system, without requiring access to the electrical wiring of the load control system. An electrical load may be electrically connected to the load control device such that the remote control device may control an amount of power delivered to the electrical load, via the load control device.

The remote control device may be configured to be mounted over a mechanical switch (e.g., over the toggle actuator of the switch) that controls whether power is delivered to the electrical load. The remote control device may be configured to maintain the toggle actuator in an on position when mounted over the toggle actuator, such that a user of the remote control device is not able to mistakenly switch the toggle actuator to the off position, which may cause the electrical load to be unpowered such that the electrical load cannot be controlled by one or more remote control devices.

In a first implementation, the remote control device may include a mounting assembly that is configured to be mounted over the toggle actuator of the switch, and a control unit that is releasably attachable to the mounting assembly. The control unit may include an attachment portion that is configured to be attached to the mounting assembly. The control unit may include a rotating portion that is configured to rotate relative to the attachment portion, and thus relative to the mounting assembly.

The mounting assembly may include a base and a release tab that is operatively coupled to the base. The mounting assembly may be operated, via the release tab, from a locking position in which the control unit is secured to the mounting assembly, into a release position in which the control unit may be detached from the mounting assembly.

The control unit may include an actuation portion that is carried by the rotating portion. The actuation portion may be configured to be actuated along a direction that extends parallel to an axis of rotation of the rotating portion. The control unit may include an annular light bar that is attached to the actuation portion of the control unit. The light bar may provide feedback indicative of the operation of the remote control device, via a plurality of LEDs that are configured to illuminate corresponding portions of the light bar.

The mounting assembly may be configured to be mounted to the toggle actuator of a mechanical switch in a first orientation in which the toggle actuator is in an up position, and in a second orientation in which the toggle actuator is in a down position, while maintaining the functionality of the remote control device. The mounting assembly may include a screw and an engagement member, such as a clamp, that is configured to engage with the toggle actuator of a mechanical switch to which the remote control device is mounted when the screw is tightened. The remote control device may be configured such that the mounting assembly does not actuate the toggle actuator of the electrical load when a force is applied to the rotating portion. The clamp may operate to prevent the mounting assembly base from pivoting about an axis defined by the screw when a downward force is applied to the control unit.

In a second implementation, the remote control device may include a mounting assembly that is configured to be mounted over the toggle actuator of the switch, and a control unit that is releasably attachable to the mounting assembly. The control unit may include a rotating portion that is configured to rotate relative to the mounting assembly. The remote control device may be configured such that the mounting assembly does not actuate the toggle actuator of the electrical load when a force is applied to the rotating portion.

The mounting assembly may include a base that is configured to be mounted over the toggle actuator of a mechanical switch. The base may include a release tab that is operable to detach the control unit from the mounting assembly.

The control unit may include an actuation portion that is carried by the rotating portion. The actuation portion may be configured to be actuated along a direction that extends parallel to an axis of rotation of the rotating portion. The control unit may include an annular light bar that is attached to the actuation portion of the control unit. The light bar may provide feedback indicative of the operation of the remote control device, via a plurality of LEDs that are configured to illuminate corresponding portions of the light bar.

The mounting assembly may be configured to be mounted to the toggle actuator of a mechanical switch in a first orientation in which the toggle actuator is in an up position, and in a second orientation in which the toggle actuator is in a down position, while maintaining the functionality of the remote control device. The mounting assembly may include an engagement mechanism that is configured to engage the toggle actuator so as to retain the mounting assembly in a secured position relative to the toggle actuator. For example, the mounting assembly may include a bar that is operably coupled to the base and translatable within a toggle actuator opening in the base.

DETAILED DESCRIPTION

Figure 1:
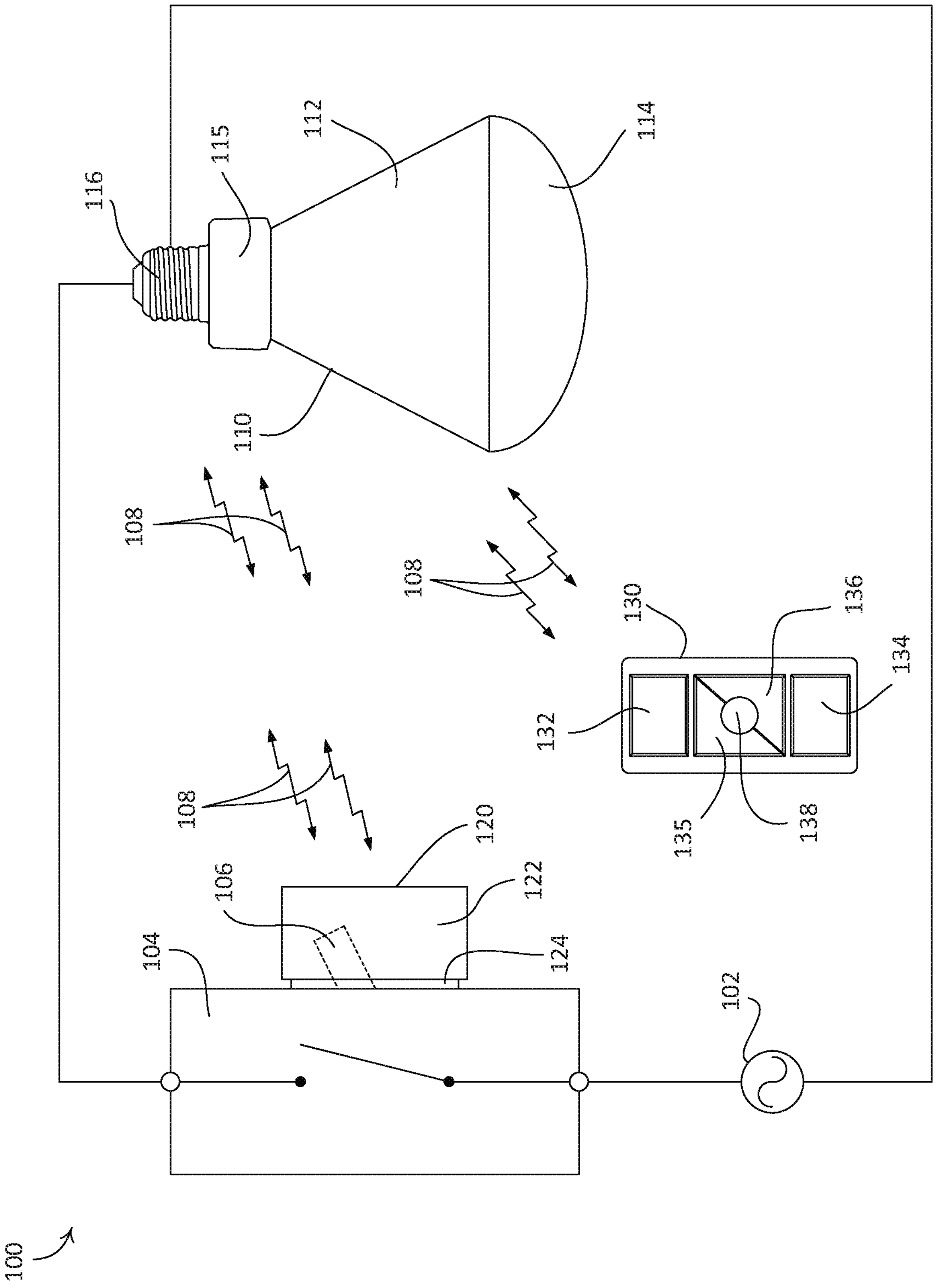
FIG. 1 is a simplified diagram of an example load control system that includes an example retrofit remote control device.

FIG. 1 depicts an example load control system 100. As shown, the load control system 100 is configured as a lighting control system that includes a load control device, such as a controllable light source 110, and a remote control device 120, such as a battery-powered rotary remote control device. The remote control device 120 may include a wireless transmitter. The load control system 100 may include a standard, single pole single throw (SPST) maintained mechanical switch 104 (e.g., a toggle switch, a paddle switch, a pushbutton switch, or a "light switch," or other suitable switch) that may be in place prior to installation of the remote control device 120 (e.g., pre-existing in the load control system 100). The switch 104 may be electrically coupled in series between a power source (e.g., an alternating current (AC) power source 102 or a direct-current (DC) power source) and the controllable light source 110. The switch 104 may include a toggle actuator 106 that may be actuated to toggle, for example to turn on and/or turn off, the controllable light source 110. The controllable light source 110 may be electrically coupled to the AC power source 102 when the switch 104 is closed (e.g., conductive), and may be disconnected from the AC power source 102 when the switch 104 is open (e.g., non-conductive).

The remote control device 120 may be operable to transmit wireless signals, for example radio frequency (RF) signals 108, to the controllable light source 110 for controlling the intensity and/or color (e.g., color temperature) of the controllable light source 110. The controllable light source 110 may be associated with the remote control device 120 during a configuration procedure of the load control system 100, such that the controllable light source 110 is then responsive to the RF signals 108 transmitted by the remote control device 120. An example of a configuration procedure for associating a remote control device with a load control device is described in greater detail in commonly-assigned U.S. Patent Publication No. 2008/0111491, published May 15, 2008, entitled "Radio-Frequency Lighting Control System," the entire disclosure of which is hereby incorporated by reference. The remote control device 120 may also be configured to transmit wireless signals for control of other electrical loads, such as for example, the volume of a speaker and/or audio system, the position of a motorized window treatment, the setpoint temperature of a heating and/or cooling system, and/or a controllable characteristic of another electrical load or device.

The controllable light source 110 may include an internal lighting load (not shown), such as, for example, a light-emitting diode (LED) light engine, a compact fluorescent lamp, an incandescent lamp, a halogen lamp, or other suitable light source. The controllable light source 110 includes a housing 112 that defines an end portion 114 through which light emitted from the lighting load may shine. The controllable light source 110 may include an enclosure 115 that is configured to house one or more electrical components of the controllable light source 110, such as an integral load control circuit (not shown), for controlling the intensity of the lighting load between a low-end intensity (e.g., approximately 1%) and a high-end intensity (e.g., approximately 100%). The controllable light source 110 may include a wireless communication circuit (not shown) housed inside the enclosure 115, such that the controllable light source 110 may be operable to receive the RF signals 108 transmitted by the remote control device 120 and control the intensity of the lighting load in response to the received RF signals. As shown, the enclosure 115 is attached to the housing 112. Alternatively, the enclosure 115 may be integral with, for example monolithic with, the housing 112, such that the enclosure 115 defines an enclosure portion of the housing 112. The controllable light source 110 may include a screw-in base 116 that is configured to be screwed into a standard Edison socket, such that the controllable light source may be coupled to the AC power source 102. The controllable light source 110 may be configured as a downlight (e.g., as shown in FIG. 1) that may be installed in a recessed light fixture. The controllable light source 110 is not limited to the illustrated screw-in base 116, and may include any suitable base, for example a bayonet-style base or other suitable base providing electrical connections.

The load control system 100 may also include one or more other devices configured to wirelessly communicate with the controllable light source 110. As shown, the load control system 100 includes a handheld, battery-powered, remote control device 130 for controlling the controllable light source 110. The remote control device 130 may include one or more buttons, for example, an on button 132, an off button 134, a raise button 135, a lower button 136, and a preset button 138, as shown in FIG. 1. The remote control device 130 may include a wireless communication circuit (not shown) for transmitting digital messages (e.g., including commands to control the lighting load) to the controllable light source 110, for example via the RF signals 108, responsive to actuations of one or more of the buttons 132, 134, 135, 136, and 138. Alternatively, the remote control device 130 may be mounted to a wall or supported by a pedestal, for example a pedestal configured to be mounted on a tabletop. Examples of handheld battery-powered remote controls are described in greater detail in commonly assigned U.S. Pat. No. 8,330,638, issued Dec. 11, 2012, entitled "Wireless Battery Powered Remote Control Having Multiple Mounting Means," and U.S. Pat. No. 7,573,208, issued Aug. 22, 1009, entitled "Method Of Programming A Lighting Preset From A Radio-Frequency Remote Control," the entire disclosures of which are hereby incorporated by reference.

The load control system 100 may also include one or more of a remote occupancy sensor or a remote vacancy sensor (not shown) for detecting occupancy and/or vacancy conditions in a space surrounding the sensors. The occupancy or vacancy sensors may be configured to transmit digital messages to the controllable light source 110, for example via the RF signals 108, in response to detecting occupancy or vacancy conditions. Examples of RF load control systems having occupancy and vacancy sensors are described in greater detail in commonly-assigned U.S. Pat. No. 7,940,167, issued May 10, 2011, entitled "Battery Powered Occupancy Sensor," U.S. Pat. No. 8,009,042, issued Aug. 30, 2011, entitled "Radio Frequency Lighting Control System With Occupancy Sensing," and U.S. Pat. No. 8,199,010, issued Jun. 12, 2012, entitled "Method And Apparatus For Configuring A Wireless Sensor," the entire disclosures of which are hereby incorporated by reference.

The load control system 100 may include a remote daylight sensor (not shown) for measuring a total light intensity in the space around the daylight sensor. The daylight sensor may be configured to transmit digital messages, such as a measured light intensity, to the controllable light source 110, for example via the RF signals 108, such that the controllable light source 110 is operable to control the intensity of the lighting load in response to the measured light intensity. Examples of RF load control systems having daylight sensors are described in greater detail in commonly assigned U.S. Pat. No. 8,451,116, issued May 28, 2013, entitled "Wireless Battery-Powered Daylight Sensor," and U.S. Pat. No. 8,410,706, issued Apr. 2, 2013, entitled "Method Of Calibrating A Daylight Sensor," the entire disclosures of which are hereby incorporated by reference.

The load control system 100 may include other types of input devices, for example, radiometers, cloudy-day sensors, temperature sensors, humidity sensors, pressure sensors, smoke detectors, carbon monoxide detectors, air-quality sensors, security sensors, proximity sensors, fixture sensors, partition sensors, keypads, kinetic or solar-powered remote controls, key fobs, cell phones, smart phones, tablets, personal digital assistants, personal computers, laptops, time clocks, audio-visual controls, safety devices, power monitoring devices (such as power meters, energy meters, utility submeters, utility rate meters), central control transmitters, residential, commercial, or industrial controllers, or any combination of these input devices.

During the configuration procedure of the load control system 100, the controllable light source 110 may be associated with a wireless control device, for example the remote control device 120, by actuating an actuator on the controllable light source 110 and then actuating (e.g., pressing and holding) an actuator on the wireless remote control device (e.g., the rotating portion 122 of the remote control device 120) for a predetermined amount of time (e.g., approximately 10 seconds).

Digital messages transmitted by the remote control device 120, for example directed to the controllable light source 110, may include a command and identifying information, such as a unique identifier (e.g., a serial number) associated with the remote control device 120. After being associated with the remote control device 120, the controllable light source 110 may be responsive to messages containing the unique identifier of the remote control device 120. The controllable light source 110 may be associated with one or more other wireless control devices of the load control system 100, such as one or more of the remote control device 130, the occupancy sensor, the vacancy sensor, and/or the daylight sensor, for example using similar association process.

After a remote control device, for example the remote control device 120 or the remote control device 130, is associated with the controllable light source 110, the remote control device may be used to associate the controllable light source 110 with the occupancy sensor, the vacancy sensor, and/or the daylight sensor, without actuating the actuator 118 of the controllable light source 110, for example as described in greater detail in commonly-assigned U.S. Patent Publication No. 2013/0222122, published Aug. 29, 2013, entitled "Two Part Load Control System Mountable To A Single Electrical Wallbox," the entire disclosure of which is hereby incorporated by reference.

The remote control device 120 may be configured to be attached to the toggle actuator 106 of the switch 104 when the toggle actuator 106 is in the on position (e.g., typically pointing upwards) and the switch 104 is closed and conductive. As shown, the remote control device 120 may include a rotating portion 122 and a base portion 124. The base portion 124 may be configured to be mounted over the toggle actuator 106 of the switch 104. The rotating portion 122 may be supported by the base portion 124 and may be rotatable about the base portion 124.

When the remote control device 120 is mounted over the toggle actuator of a switch (e.g., the toggle actuator 106), the base portion 124 may function to secure the toggle actuator 106 from being toggled. For example, the base portion 124 may be configured to maintain the toggle actuator 106 in an on position, such that a user of the remote control device 120 is not able to mistakenly switch the toggle actuator 106 to the off position, which may disconnect the controllable light source 110 from the AC power source 102, such that controllable light source 110 may not be controlled by one or more remote control devices of the load control system 100 (e.g., the remote control devices 120 and/or 130), which may in turn cause user confusion.

As shown, the remote control device 120 is battery-powered, not wired in series electrical connection between the AC power source 102 and the controllable light source 110 (e.g., does not replace the mechanical switch 104), such that the controllable light source 110 receives a full AC voltage waveform from the AC power source 102, and such that the controllable light source 110 does not receive a phase-control voltage that may be created by a standard dimmer switch. Because the controllable light source 110 receives the full AC voltage waveform, multiple controllable light sources (e.g., controllable light sources 110) may be coupled in parallel on a single electrical circuit (e.g., coupled to the mechanical switch 104). The multiple controllable light sources may include light sources of different types (e.g., incandescent lamps, fluorescent lamps, and/or LED light sources). The remote control device 120 may be configured to control one or more of the multiple controllable light sources, for example substantially in unison. In addition, if there are multiple controllable light sources coupled in parallel on a single circuit, each controllable light source may be zoned, for example to provide individual control of each controllable light source. For example, a first controllable light source 110 may be controlled by the remote control device 120, while a second controllable light source 110 may be controlled by the remote control device 130). In prior art systems, a mechanical switch (such as the switch 104, for example) typically controls such multiple light sources in unison (e.g., turns them on and/or off together).

The remote control device 120 may be part of a larger RF load control system than that depicted in FIG. 1. Examples of RF load control systems are described in commonly-assigned U.S. Pat. No. 5,905,442, issued on May 18, 1999, entitled "Method And Apparatus For Controlling And Determining The Status Of Electrical Devices From Remote Locations," and commonly-assigned U.S. Patent Application Publication No. 2009/0206983, published Aug. 20, 2009, entitled "Communication Protocol For A Radio Frequency Load Control System," the entire disclosures of which are incorporated herein by reference.

While the load control system 100 is described herein with reference to the single-pole system shown in FIG. 1, one or both of the controllable light source 110 and the remote control device 120 may be implemented in a "three-way" lighting system having two single-pole double-throw (SPDT) mechanical switches, which may be referred to as "three-way" switches, for controlling a single electrical load. To illustrate, an example system may comprise two remote control devices 120, with one remote control device 120 connected to the toggle actuator of each SPDT switch. In such a system, the toggle actuators of each SPDT switch may be positioned such that the SPDT switches form a complete circuit between the AC source and the electrical load before the remote control devices 120 are installed on the toggle actuators.

The load control system 100 shown in FIG. 1 may provide a simple retrofit solution for an existing switched control system. The load control system 100 may provide energy savings and/or advanced control features, for example without requiring any electrical re-wiring and/or without requiring the replacement of any existing mechanical switches. To install and use the load control system 100 of FIG. 1, a consumer may replace an existing lamp with the controllable light source 110, switch the toggle actuator 106 of the mechanical switch 104 to the on position, install (e.g., mount) the remote control device 120 onto the toggle actuator 106, and associate the remote control device 120 and the controllable light source 110 with each other, for example as described above.

It should be appreciated that the load control system 100 need not include the controllable light source 110. For example, in lieu of the controllable light source 110, the load control system 100 may alternatively include a plug-in load control device for controlling an external lighting load. For example, the plug-in load control device may be configured to be plugged into a receptacle of a standard electrical outlet that is electrically connected to an AC power source. The plug-in load control device may have one or more receptacles to which one or more plug-in electrical loads, such a table lamp or a floor lamp, may be plugged. The plug-in load control device may be configured to control the intensity of the lighting loads plugged into the receptacles of the plug-in load control device. It should further be appreciated that the remote control device 120 is not limited to being associated with, and controlling, a single load control device. For example, the remote control device 120 may be configured to control multiple controllable load control devices, for example substantially in unison.

Examples of remote control devices configured to be mounted over existing light switches are described in greater detail in commonly-assigned U.S. Pat. No. 9,565,742, issued Feb. 7, 2017, and U.S. Pat. No. 9,633,557, issued Apr. 25, 2017, both entitled "Battery-Powered Retrofit Remote Control Device," the entire disclosures of which are hereby incorporated by reference.

It should further still be appreciated that, although a lighting control system with the controllable light source 110 is provided as an example above, a load control system as described herein may include more lighting loads, other types of lighting loads, and/or other types of electrical loads that may be configured to be controlled by the one or more control devices. For example, the load control system may include one or more of: a dimming ballast for driving a gas-discharge lamp; an LED driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; one or more motorized interior and/or exterior shutters; a thermostat for a heating and/or cooling system; a temperature control device for controlling a set-point temperature of a heating, ventilation, and air-conditioning (HVAC) system; an air conditioner; a compressor; an electric baseboard heater controller; a controllable damper; a variable air volume controller; a fresh air intake controller; a ventilation controller; one or more hydraulic valves for use in radiators and radiant heating system; a humidity control unit; a humidifier; a dehumidifier; a water heater; a boiler controller; a pool pump; a refrigerator; a freezer; a television and/or computer monitor; a video camera; a volume control; an audio system or amplifier; an elevator; a power supply; a generator; an electric charger, such as an electric vehicle charger; an alternative energy controller; and/or the like.

FIGS. 2-8 depict an example remote control device 200 (e.g., a battery-powered rotary remote control device) that may be deployed, for example, as the remote control device 120 of the load control system 100 shown in FIG. 1. The remote control device 200 may be configured to be mounted over a standard light switch (e.g., the toggle actuator 106 of the SPST maintained mechanical switch 104 shown in FIG. 1). For example, as shown the remote control device 200 may be installed over the toggle actuator 204 of an installed light switch 202 without removing a faceplate 206 that is mounted to the light switch 202 (e.g., via faceplate screws 208).

Figure 5:
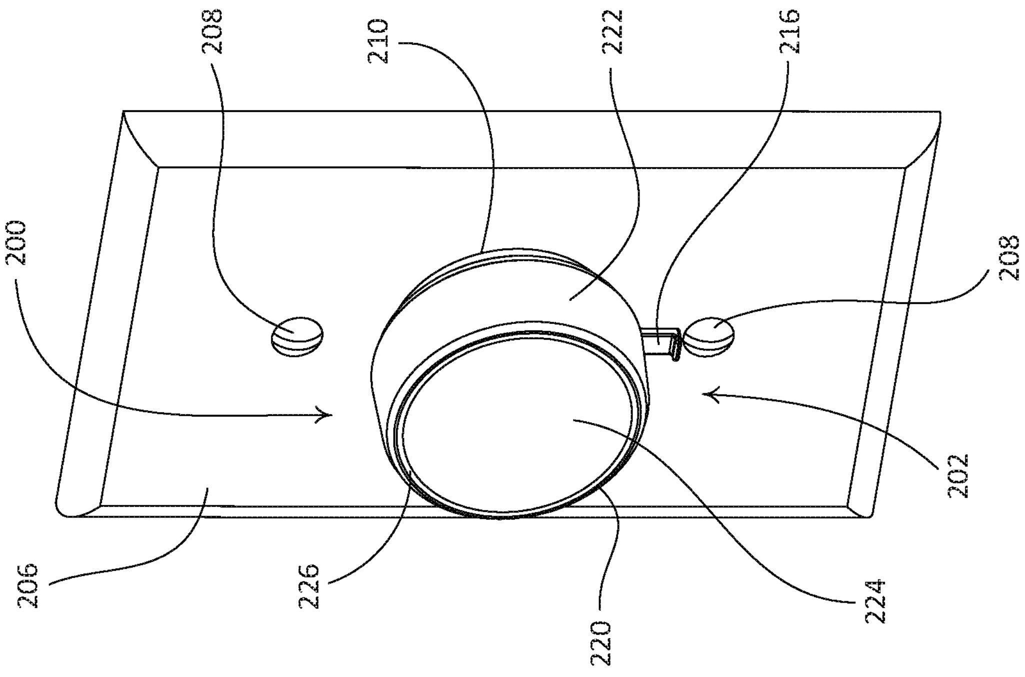
FIG. 5 is a front perspective view of the example retrofit remote control device illustrated in FIG. 2, with the example retrofit remote control device mounted over the switch actuator of an installed light switch.
Figure 7:
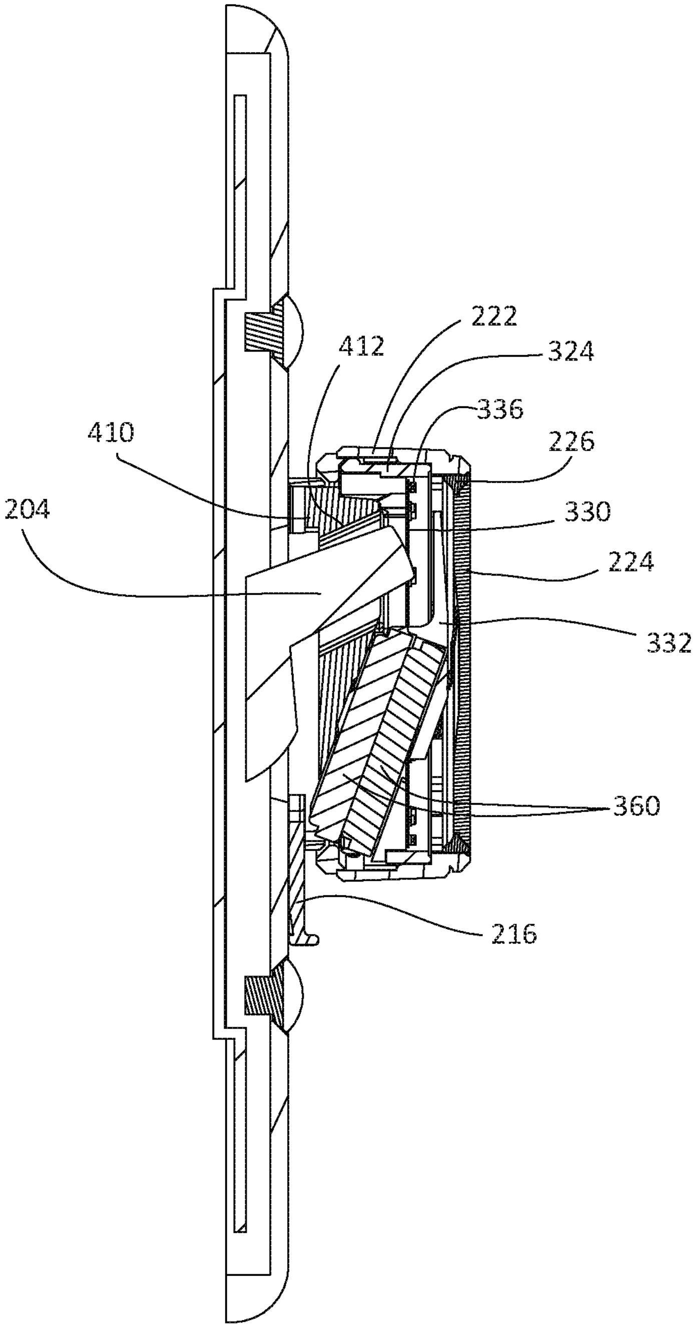
FIG. 7 is a right-facing section view of the example retrofit remote control device illustrated in FIG. 2.
Figure 8:
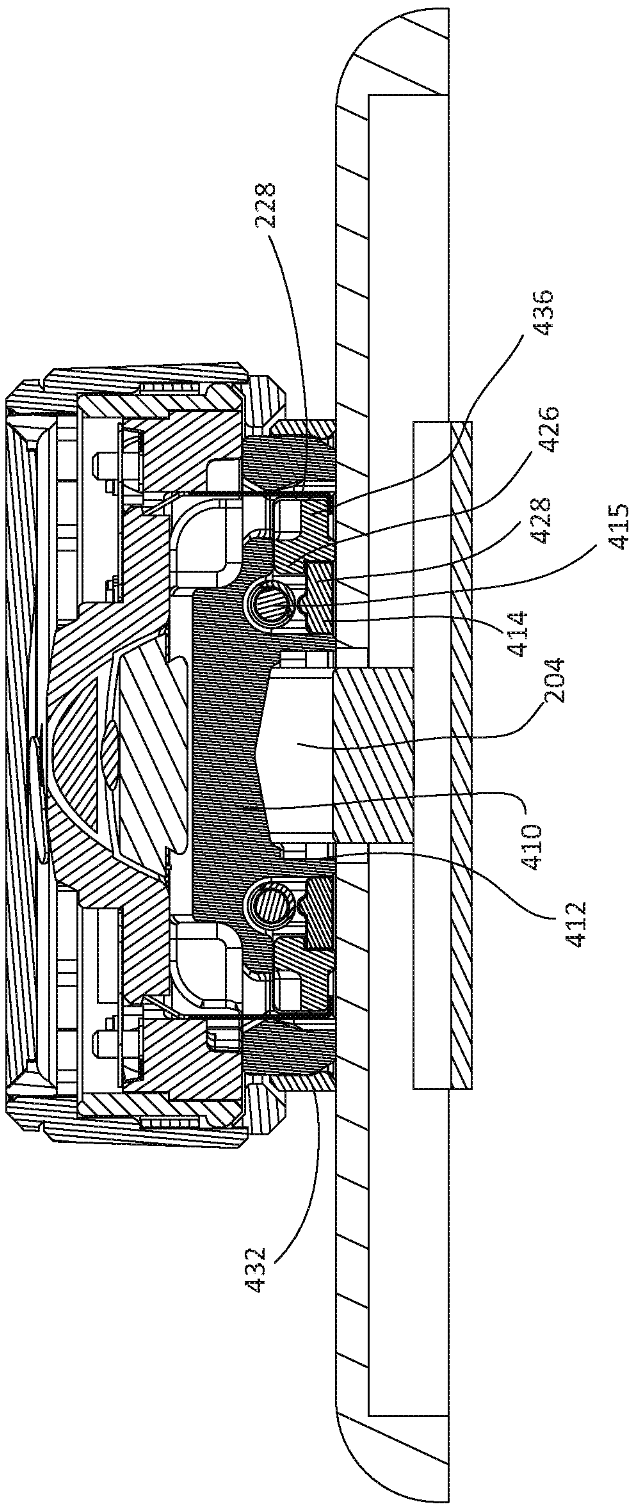
FIG. 8 is an upward-facing section view of the example retrofit remote control device illustrated in FIG. 2.

The remote control device 200 may include a mounting assembly 210 and a control unit 220 that may be attached to the mounting assembly 210. The mounting assembly 210 may be more generally referred to as a base portion of the remote control device 200. The control unit 220 may alternatively be referred to as a control module. It should be appreciated that other control units described herein may similarly be alternatively referred to as control modules. The control unit 220 may include a rotating portion that is rotatable with respect to the mounting assembly 210. For example, as shown, the control unit 220 includes an annular rotating portion 222 that is configured to rotate about the mounting assembly 210. The remote control device 200 may be configured such that the control unit 220 and the mounting assembly 210 are removably attachable to one another. FIG. 5 depicts the remote control device 200 with the control unit 220 detached from the mounting assembly 210.

The mounting assembly 210 may be configured to be fixedly attached to the actuator of a mechanical switch, such as the toggle actuator 204 of the light switch 202, and may be configured to maintain the actuator in the on position. For example, as shown the mounting assembly 210 may include a base 211 that defines a toggle actuator opening 212 that extends therethrough and that is configured to receive at least a portion of the toggle actuator 204. The base 211 may be configured to carry a screw 214 that, when driven inward, may advance into the toggle actuator opening 212 and abut the toggle actuator 204, thereby securing the base 211, and thus the mounting assembly 210, in a fixed position relative to the toggle actuator 204. With the mounting assembly 210 so fixed in position, the toggle actuator 204 may be prevented from being switched to the off position. In this regard, a user of the remote control device 200 may be unable to inadvertently switch the light switch 202 off when the remote control device 200 is mounted to the light switch 202. As shown, the base 211 may be configured such that the screw 214 enters a side of the toggle actuator opening 212 and abuts a side of the toggle actuator 204. It should be appreciated, however, that the base is not limited to the illustrated orientation of the screw 214 within the base 211. For example, in accordance with an alternative configuration of the base 211 (not shown) the base 211 may support the screw 214 such that the screw 214 enters the toggle actuator opening 212 from the bottom and abuts a lower surface of the toggle actuator 204.

The remote control device 200 may be configured to enable releasable attachment of the control unit 220 to the mounting assembly 210. For example, the mounting assembly 210 may include a release mechanism that is operatively coupled to the base 211 and that may be actuated to release the control unit from the mounting assembly 210. As shown, the mounting assembly 210 may include a sliding release tab 216 that may be actuated to release the control unit 220 from the mounting assembly 210.

Figure 10A:
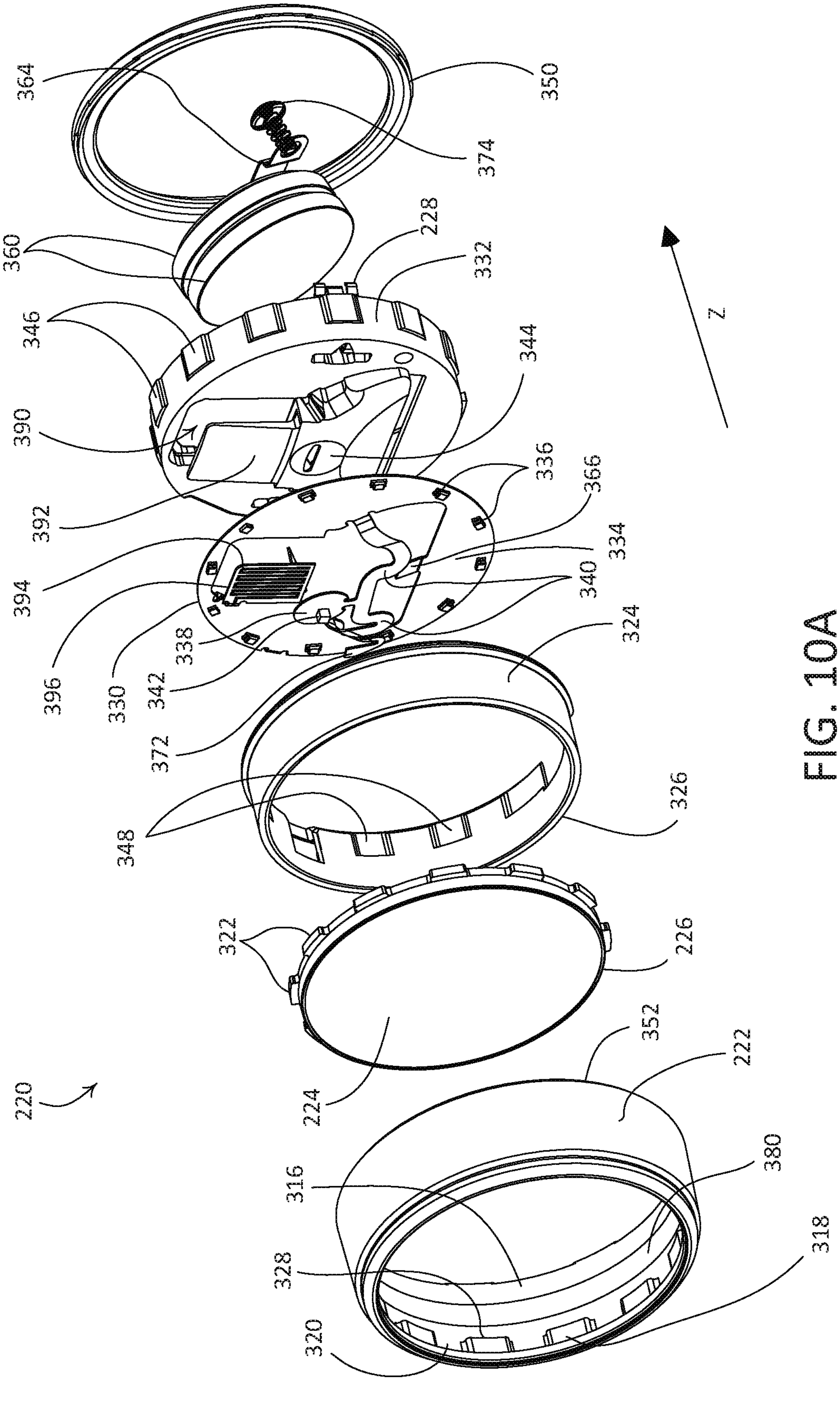
FIG. 10A is a front-facing exploded view of the control unit of the example retrofit remote control device illustrated in FIG. 2.
Figures 10B, 10C:
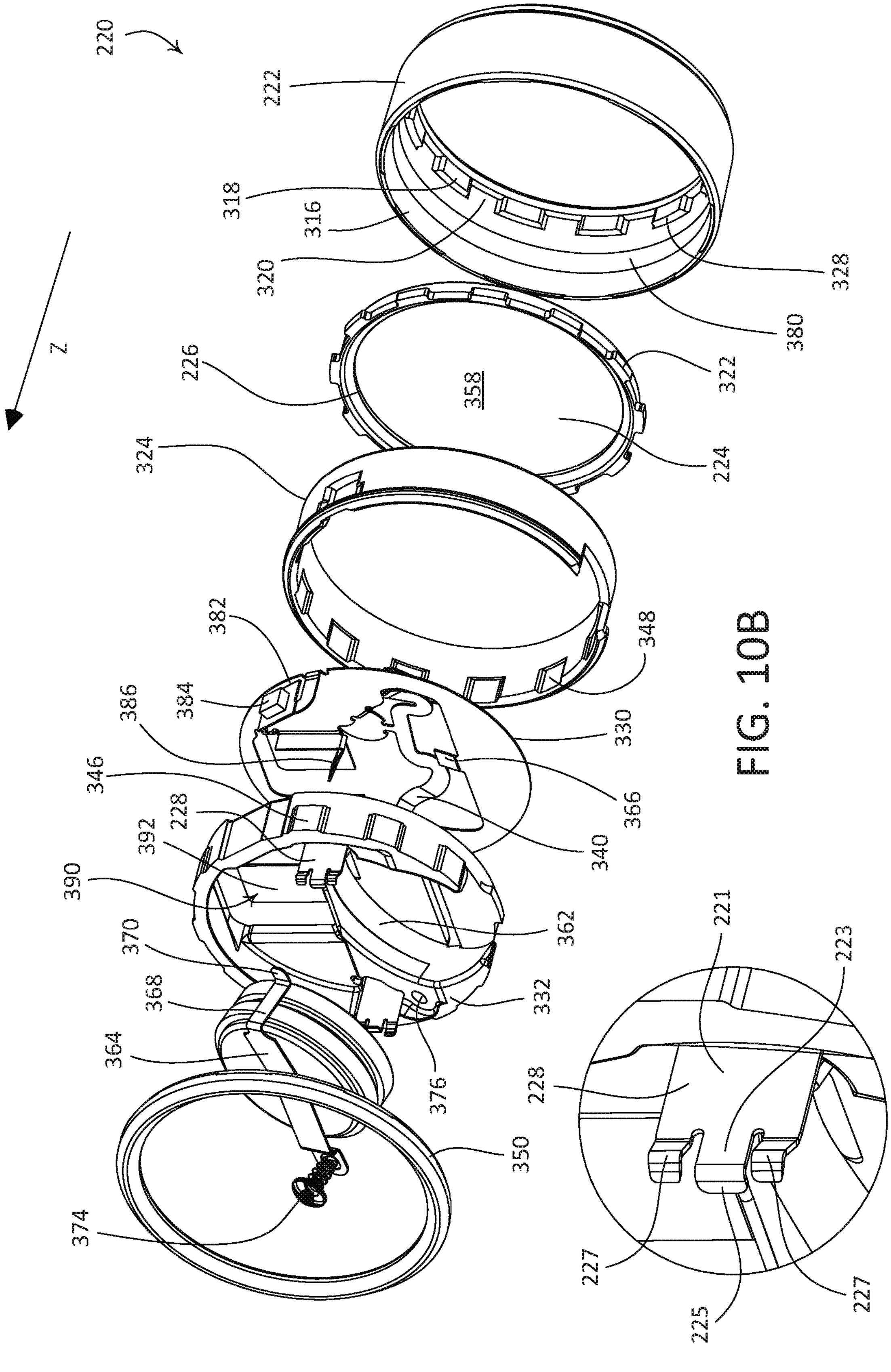
FIG. 10B is a rear-facing exploded view of the control unit of the example retrofit remote control device illustrated in FIG. 2.
FIG. 10C is an enlarged portion of the exploded view depicted in FIG. 10B, illustrating a second example configuration of the retention clip of the control unit.

The illustrated control unit 220 may include retention clips 228 that are configured to be captively retained by the release tab 216 of the mounting assembly 210 to secure the control unit 220 in an attached position relative to the mounting assembly 210. The retention clips 228 may protrude rearward from the control unit 220 (e.g., as shown in FIGS. 10A-10C). As shown, each retention clip 228 may include a plate like body 221. The retention clips 228 may be configured to be attached to the control unit 220. For example, a portion of the body 221 may be attached to (e.g., embedded within) the control unit 220. Alternatively, the retention clips 228 may be an integral component if the control unit 220 is formed monolithically. The retention clips 228 may be made of any suitable material, such as metal.

Figure 9A:
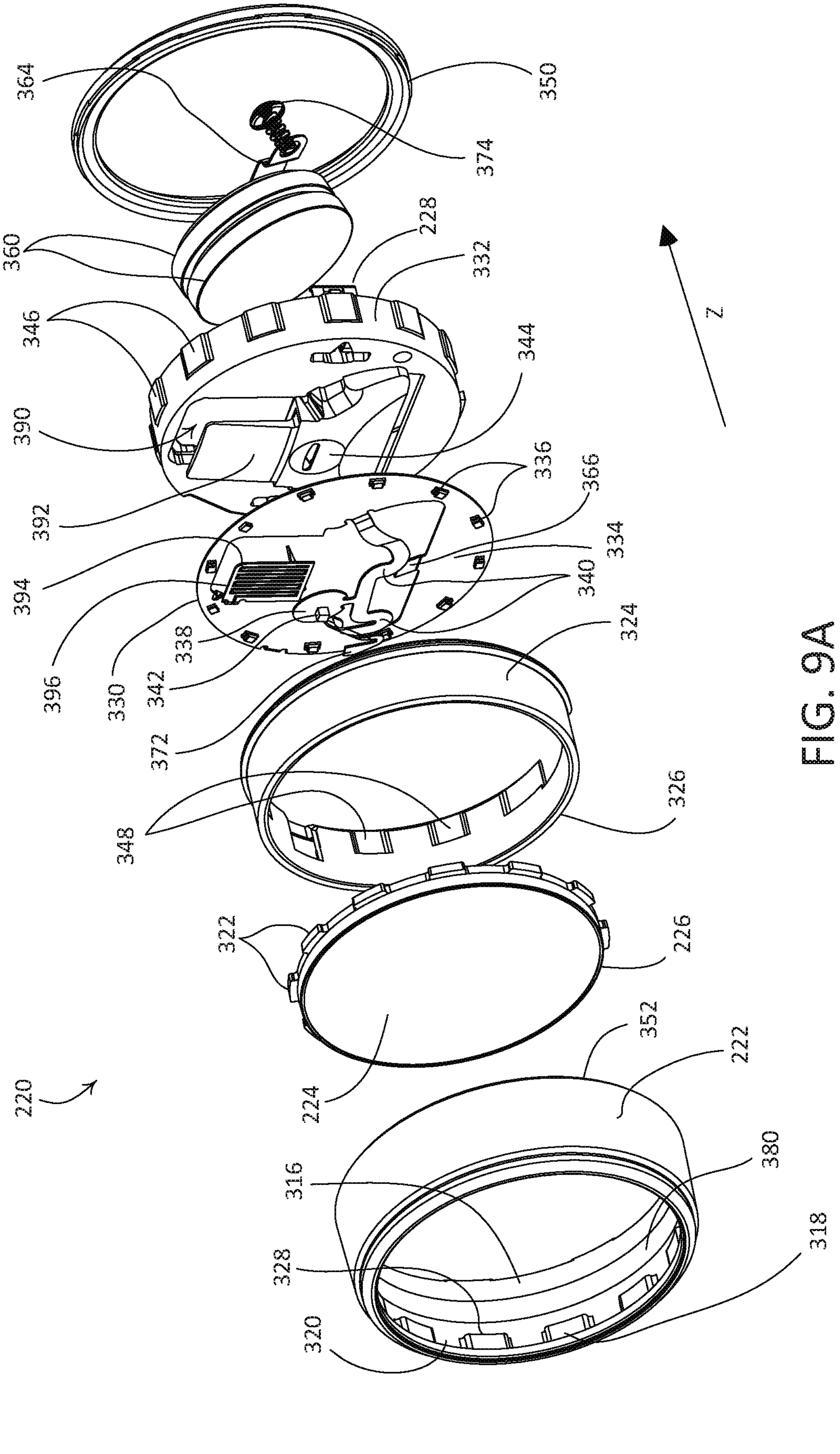
FIG. 9A is a front-facing exploded view of the control unit of the example retrofit remote control device illustrated in FIG. 2.
Figures 9B, 9C:
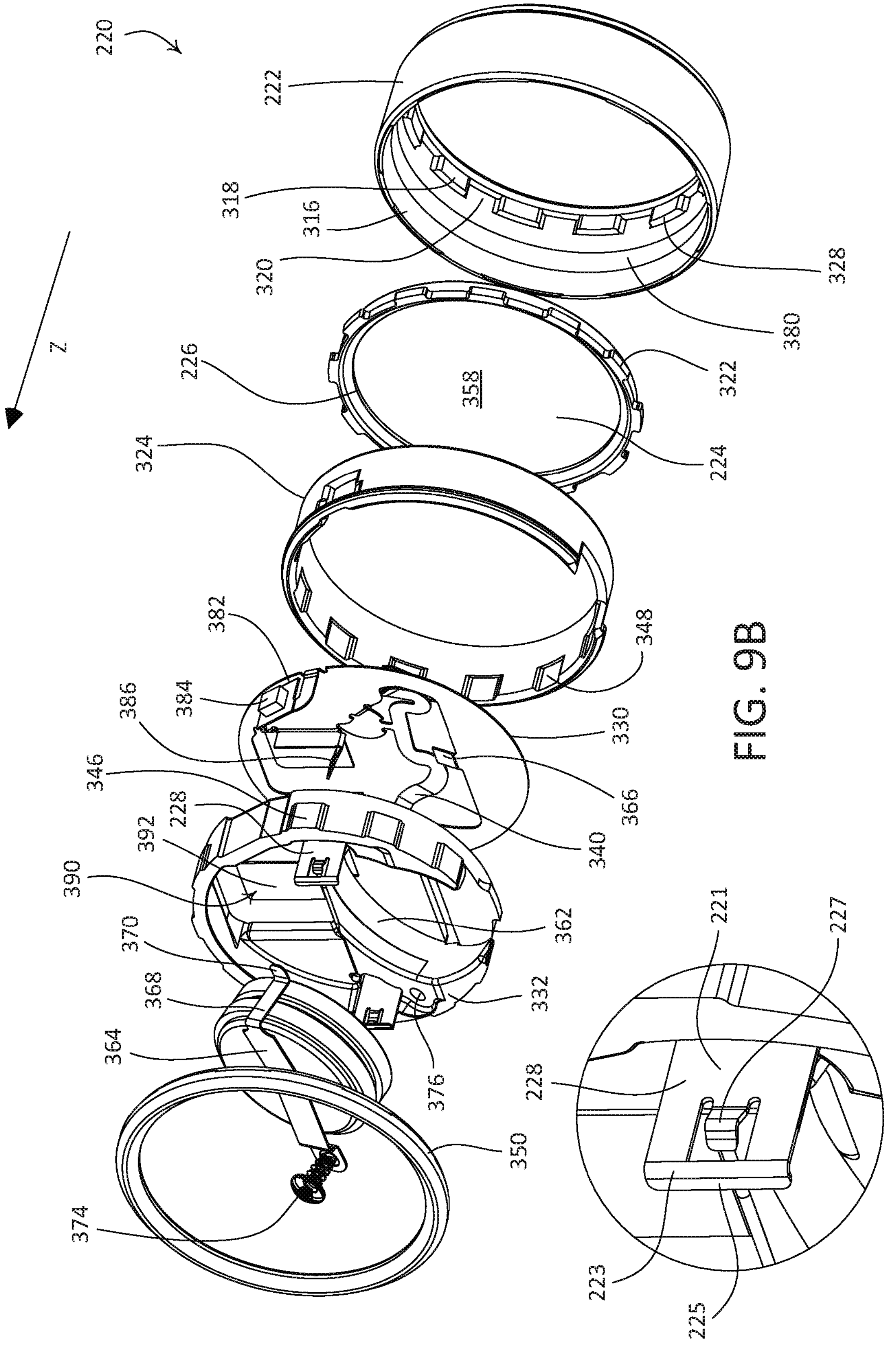
FIG. 9B is a rear-facing exploded view of the control unit of the example retrofit remote control device illustrated in FIG. 2.
FIG. 9C is an enlarged portion of the exploded view depicted in FIG. 9B, illustrating a first example configuration of a retention clip of the control unit.

FIGS. 9A-9C illustrate a first example configuration of the retention clips 228. As shown, the body 221 of each retention clip 228 may extend rearward from the control unit 220 and may define a retention tab 223. Each retention tab 223 may define a tab end 225 that may be angularly offset (e.g., at approximately 90 degrees) relative to a plane defined by the body 221. The retention tabs 223 of the retention clips 228 may be configured to engage with the release tab 216 to secure the control unit 220 to the mounting assembly 210. Each retention clip 228 may further define a resilient spring clip 227 that may be angled outward relative to the plane defined by the body 221. The spring clips 227 may be configured to engage with complementary features (not shown) of the mounting assembly 210 to further secure the control unit 220 to the mounting assembly 210. For example, the spring clips 227 may initially deflect upon contact with such features, and may resiliently snap back into place within the features when the control unit 220 moves into the attached position relative to the mounting assembly 210. The retention clips 228 may be configured such that the spring clips 227 are capable of maintaining the control unit 220 in an attached position relative to the mounting assembly 210 if the release tab 216 is omitted from the mounting assembly 210.

FIGS. 10A-10C illustrate a second example configuration of the retention clips 228. As shown, the body 221 of each retention clip 228 may extend rearward from the control unit 220 and may define a retention tab 223. Each retention tab 223 may define a tab end 225 that may be angularly offset (e.g., at approximately 90 degrees) relative to a plane defined by the body 221. The retention tabs 223 of the retention clips 228 may be configured to engage with the release tab 216 to secure the control unit 220 to the mounting assembly 210. Each retention clip 228 may further define a pair of resilient spring clips 227 that are angled outward relative to the plane defined by the body 221. The spring clips 227 may be configured to engage with complementary features (not shown) of the mounting assembly 210 to further secure the control unit 220 to the mounting assembly 210. For example, the spring clips 227 may initially deflect upon contact with such features, and may resiliently snap back into place within the features when the control unit 220 moves into the attached position relative to the mounting assembly 210. The retention clips 228 may be configured such that the spring clips 227 are capable of maintaining the control unit 220 in an attached position relative to the mounting assembly 210 if the release tab 216 is omitted from the mounting assembly 210.

The release tab 216 may be configured to engage with the retention clips 228 when the control unit 220 is attached to the mounting assembly 210, such that the control unit 220 is retained in the attached position relative to the mounting assembly 210. For example, as shown the release tab 216 may include locking members 218 that may be configured to prevent the retention clips 228 from being released from the mounting assembly 210 when the release tab 216 is in a locking position. The retention clips 228 may be released by the locking members 218 when the release tab 216 is actuated from the locking position to a release position. With the release tab 216 in the release position, the control unit 220 may be separated from the mounting assembly 210. The release position may be referred to as an activated position of the release tab 216. The release tab 216 may be spring biased, and may resiliently return to the locking position after the release tab 216 is actuated to the release position and subsequently released. In this regard, the locking position of the release tab 216 may be referred to as a rest position of the release tab 216. Alternatively, the release tab 216 may not be spring biased, such that the release tab 216 may be manually actuated to return the release tab 216 to the locking position.

The control unit 220 may be attached the mounting assembly 210 without requiring the release tab 216 to be operated to the release position. Stated differently, the control unit 220 may be attached to the mounting assembly 210 when the release tab 216 is in the locking position. For example, the retention clips 228 of the control unit 220 may be configured to cause the release tab 216 to move out of the way of the retention clips 228 as the control unit 220 is attached to the mounting assembly 210. The release tab 216 may then resiliently deflect into place behind complementary features of the retention clips 228, such as the retention tabs 223, thereby securing the control unit 220 to the mounting assembly 210 in an attached position.

Figure 3:
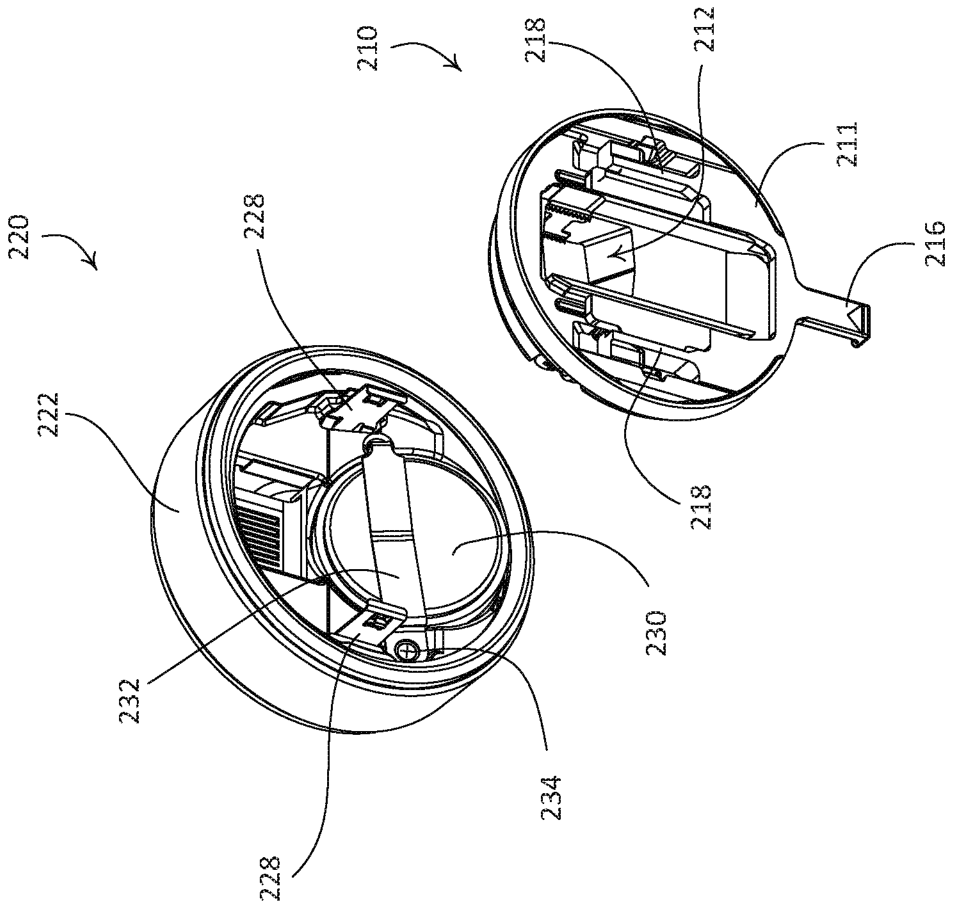
FIG. 3 is a rear perspective view of the example retrofit remote control device illustrated in FIG. 2, with the control unit detached from the mounting assembly.
Figure 2:
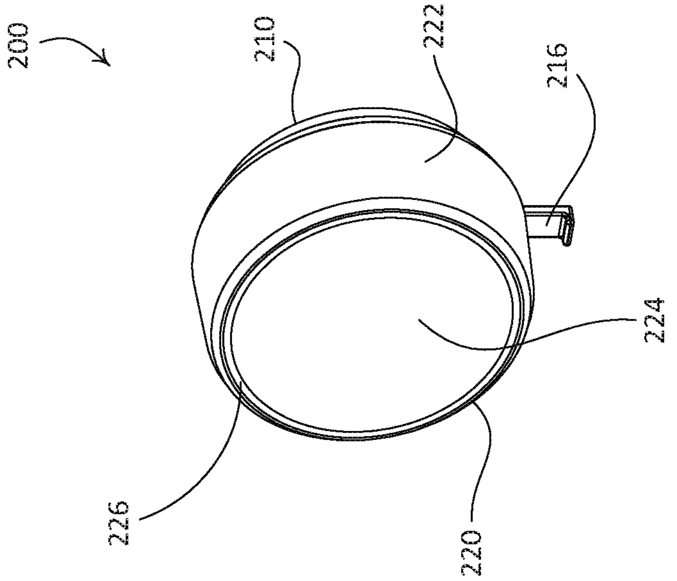
FIG. 2 is a front perspective view of an example retrofit remote control device that includes a control unit component and a mounting assembly component.
Figure 4:
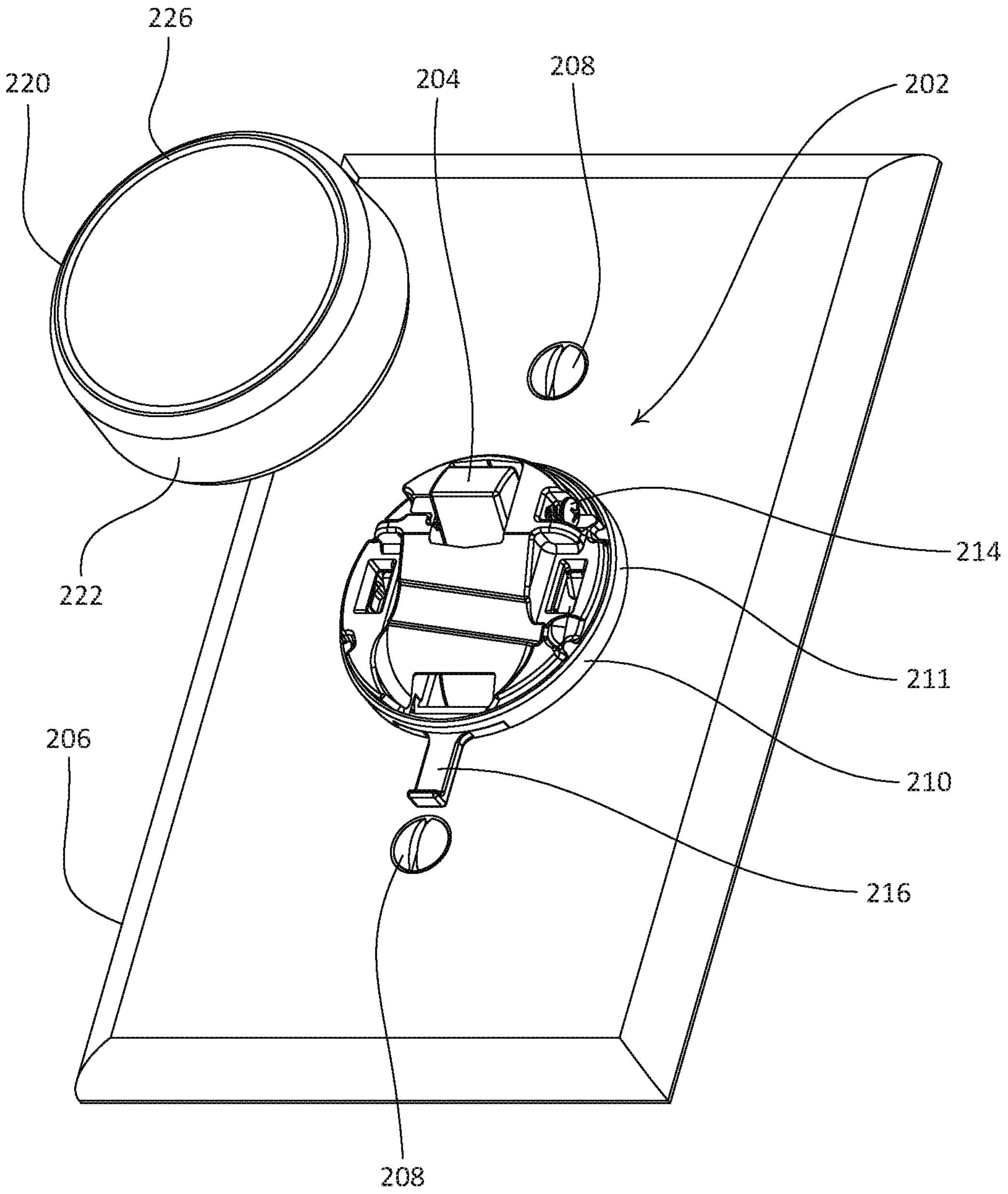
FIG. 4 is a front perspective view of the example retrofit remote control device illustrated in FIG. 2, with the mounting assembly mounted over the switch actuator of an installed light switch, and with the control unit detached from the mounting assembly.

The control unit 220 may be detached from the mounting assembly 210 (e.g., as shown in FIGS. 3-4), for instance to access one or more batteries 230 that may be used to power the control unit 220. As shown, the control unit 220 may be configured to retain one or more batteries 230, such as two batteries 230. The control unit 220 may include a battery retention strap 232 that may be configured to hold the batteries 230 in place. The battery retention strap 232 may be configured to operate as an electrical contact for the batteries 230. In an example of removing the batteries 230 from the control unit 220, the battery retention strap 232 may be loosened, for example by loosening a screw 234 to allow the batteries 230 to be removed and/or replaced.

Figure 6:
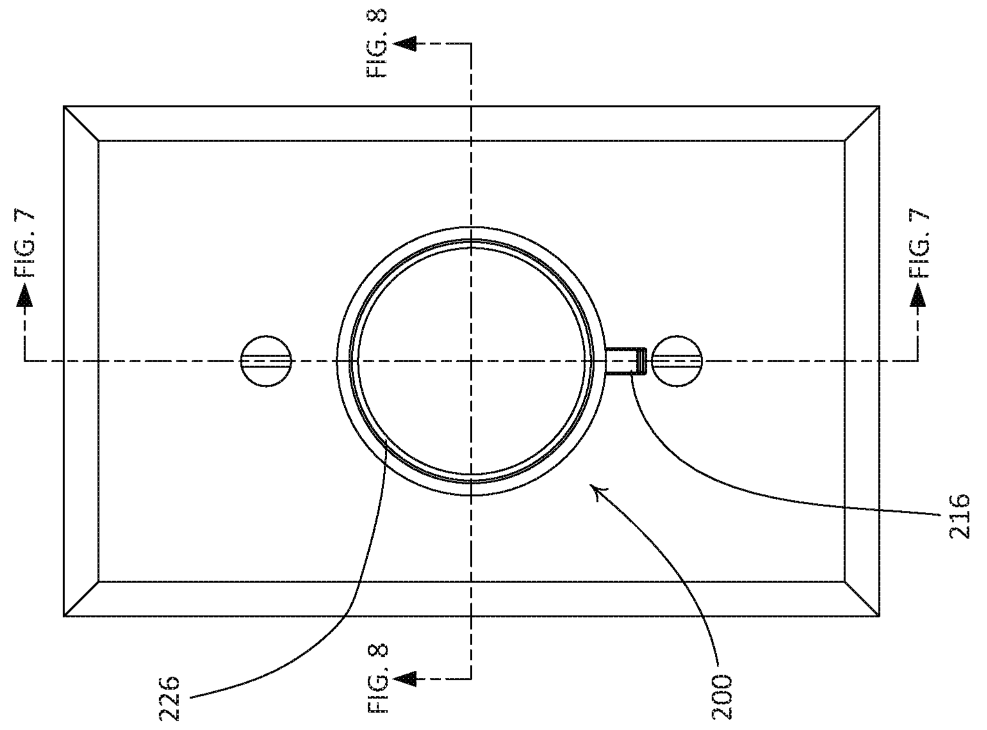
FIG. 6 is a front view of the example retrofit remote control device illustrated in FIG. 2, with the example retrofit remote control device mounted over the switch actuator of an installed light switch.

When the control unit 220 is attached to the mounting assembly 210 (e.g., as shown in FIGS. 5-6), the rotating portion 222 may be rotatable in opposed directions about the mounting assembly 210, for example in the clockwise or counter-clockwise directions. The mounting assembly 210 may be configured to be mounted over the toggle actuator 204 of the light switch 202 such that the application of rotational movement to the rotating portion 222 does not actuate the toggle actuator 204. The remote control device 200 may be configured to be mounted to the toggle actuator 204 both when a "switched up" position of the toggle actuator 204 corresponds to an on position of the light switch 202, and when a "switched down" position of the toggle actuator 204 corresponds to the on position of the light switch 202, while maintaining functionality of the remote control device 200.

The control unit 220 may include an actuation portion 224, which may be operated separately from or in concert with the rotating portion 222. As shown, the actuation portion 224 may include a circular surface within an opening defined by the rotating portion 222. In an example implementation, the actuation portion 224 may be configured to move inward toward the light switch 202 to actuate a mechanical switch (not shown) inside the control unit 220, for instance as described herein. The actuation portion 224 may be configured to return to an idle or rest position (e.g., as shown in FIG. 5) after being actuated. In this regard, the actuation portion 224 may be configured to operate as a toggle control of the control unit 220.

The remote control device 200 may be configured to transmit one or more wireless communication signals (e.g., RF signals 108) to one or more control devices (e.g., the control devices of the load control system 100, such as the controllable light source 110). The remote control device 200 may include a wireless communication circuit, e.g., an RF transceiver or transmitter (not shown), via which one or more wireless communication signals may be sent and/or received. The control unit 220 may be configured to transmit digital messages (e.g., including commands) in response to one or more actuations applied to the control unit 220, such as operation of the rotating portion 222 and/or the actuation portion 224. The digital messages may be transmitted to one or more devices associated with the remote control device 200, such as the controllable light source 110. For example, the control unit 220 may be configured to transmit a command via one or more RF signals 108 to raise the intensity of the controllable light source 110 in response to a clockwise rotation of the rotating portion 222 and a command to lower the intensity of the controllable light source in response to a counterclockwise rotation of the rotating portion 222. The control unit 220 may be configured to transmit a command to toggle the controllable light source 110 (e.g., from off to on or vice versa) in response to an actuation of the actuation portion 224. In addition, the control unit 220 may be configured to transmit a command to turn the controllable light source 110 on in response to an actuation of the actuation portion 224 (e.g., if the control unit 220 knows that the controllable light source 110 is presently off). The control unit 220 may be configured to transmit a command to turn the controllable light source 110 off in response to an actuation of the actuation portion 224 (e.g., if the control unit 220 knows that the controllable light source 110 is presently on).

The control unit 220 may include a light bar 226, for example, located between the rotating portion 222 and the actuation portion 224. For example, the light bar 226 may be define a full circle as shown in FIGS. 5 and 6. As shown, the light bar 226 may be attached to a periphery of the actuation portion 224, and may move with the actuation portion 224 when the actuation portion 224 is actuated. Alternatively, the light bar 226 may be attached to a periphery of the rotating portion 222. The remote control device 200 may provide feedback via the light bar 226, for instance while the rotating portion 222 is being rotated and/or after the remote control device 200 is actuated (e.g., the rotating portion 222 is rotated and/or the actuation portion 224 is actuated). The feedback may indicate, for example, that the remote control device 200 is transmitting one or more RF signals 108. To illustrate, the light bar 226 may be illuminated for a few seconds (e.g., 1-2 seconds) after the remote control device 200 is actuated, and then may be turned off (e.g., to conserve battery life). The light bar 226 may be illuminated to different intensities, for example depending on whether the rotating portion 222 is being rotated to raise or lower the intensity of the lighting load. The light bar 226 may be illuminated to provide feedback of the actual intensity of a lighting load being controlled by the remote control device 200 (e.g., the controllable light source 110).

As described herein, the remote control device 200 may comprise a battery (e.g., such as the battery 230) for powering at least the remote control device 200. The remote control device 200 may be configured to detect a low battery condition and provide an indication of the condition such that a user may be alerted to replace the battery.

Figure 11:
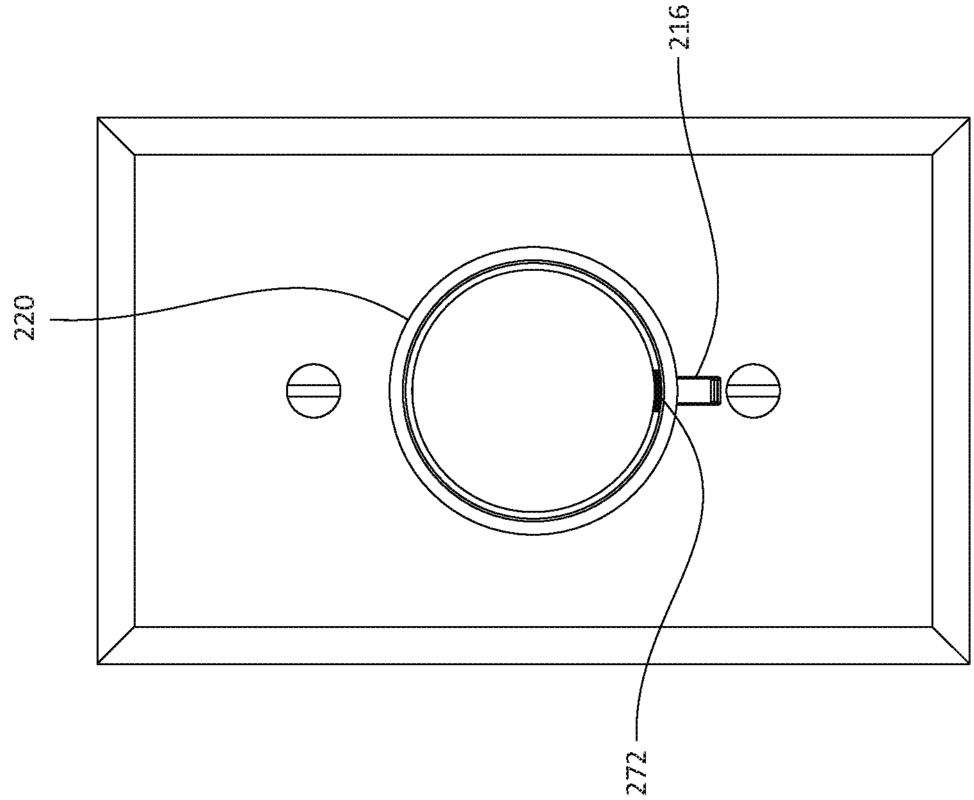
FIG. 11 is a front view of the example retrofit remote control device illustrated in FIG. 2, with the remote control device displaying a first example low-battery indication.
Figure 13:
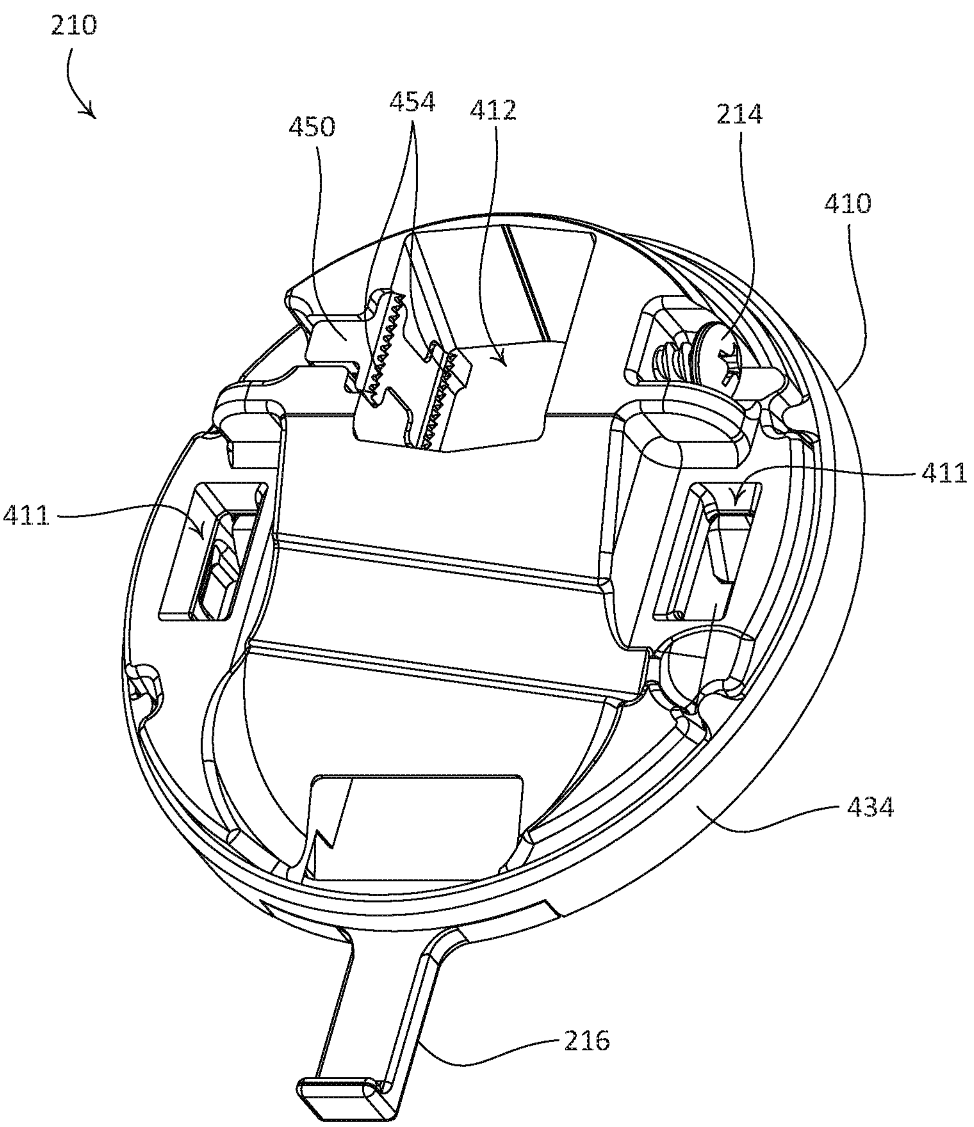
FIG. 13 is a front perspective view of the mounting assembly of the example retrofit remote control device illustrated in FIG. 2.
Figure 14C:
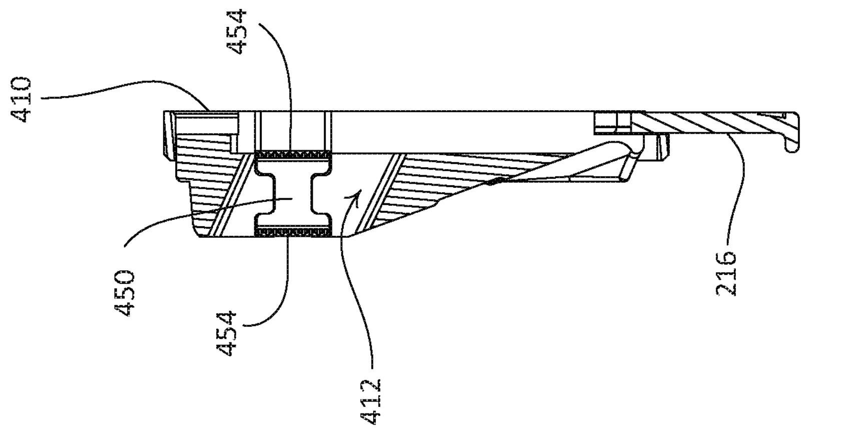
FIG. 14C is a left-facing section view of the mounting assembly of the example retrofit remote control device illustrated in FIG. 2.
Figure 14A:
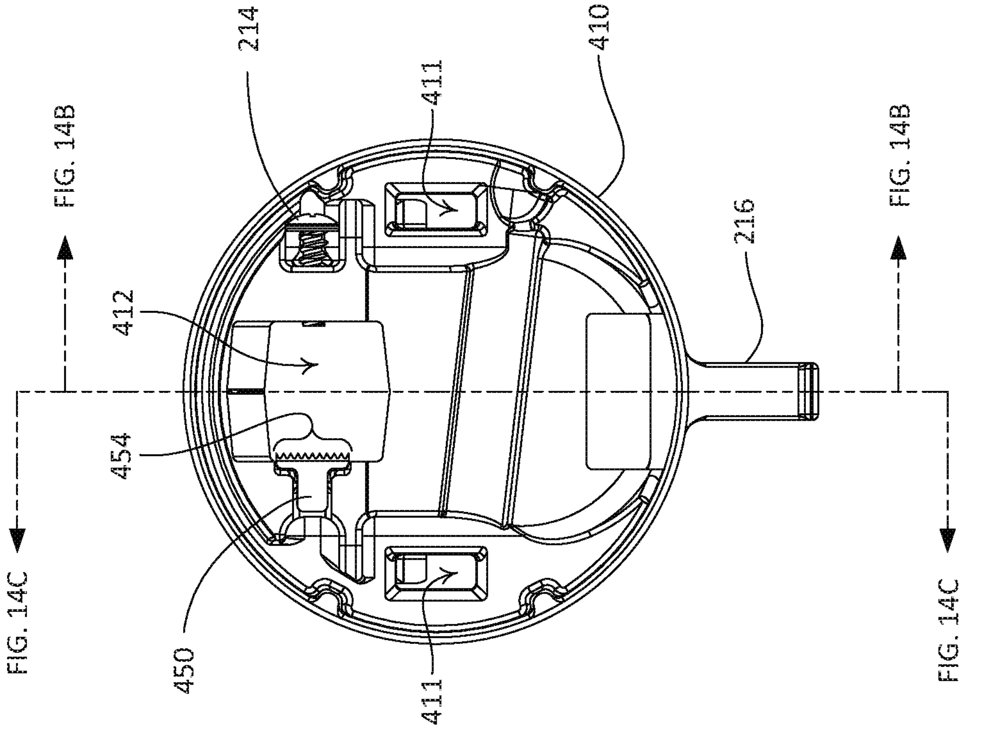
FIG. 14A is a front view of the mounting assembly of the example retrofit remote control device illustrated in FIG. 2.
Figure 14B:
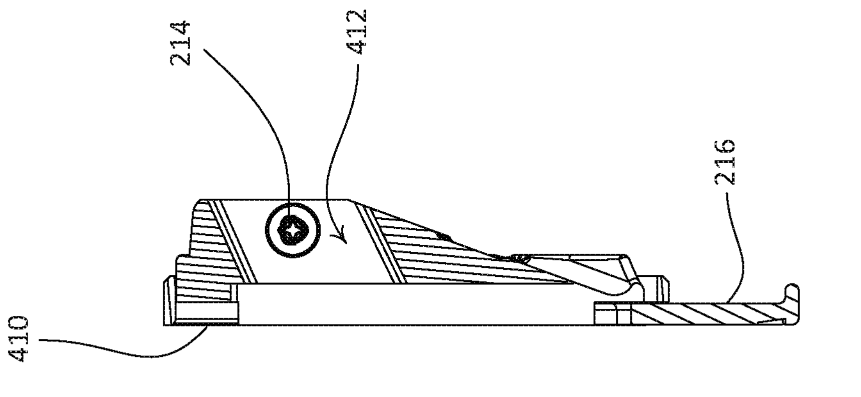
FIG. 14B is a right-facing section view of the mounting assembly of the example retrofit remote control device illustrated in FIG. 2.

Multiple levels of low battery indications may be provided, for example, depending on the amount of power remaining in the battery. For instance, the remote control device 200 may be configured to provide two levels of low battery indications. A first level of indication may be provided when remaining battery power falls below a first threshold (e.g., reaching 20% of full capacity or 80% of battery life). The first level of indication may be provided, for example, by illuminating and/or flashing a portion of the light bar 226 (e.g., a bottom portion 272 of the light bar 226), as shown in FIG. 11. To distinguish from the illumination used as user feedback and/or to attract a user's attention, the portion of the light bar 226 used to provide the first level of low battery indication may be illuminated in a different color (e.g., red) and/or in a specific pattern (e.g., flashing). The low battery indication may be provided via the light bar 226 regardless of whether the light bar 226 is being used to provide user feedback as described herein. For example, the low battery indication may be provided via the light bar 226 when the light bar 226 is not being used to provide user feedback (e.g., when the actuation portion 224 is not actuated and/or when the rotating portion 222 is not being rotated). The low battery indication may be provided when the light bar 226 is being used to provide user feedback. In such a case, the low battery indication may be distinguished from the user feedback because, for example, the low battery indication is illuminated in a different color (e.g., red) and/or in a specific pattern (e.g., flashing).

Figure 12:
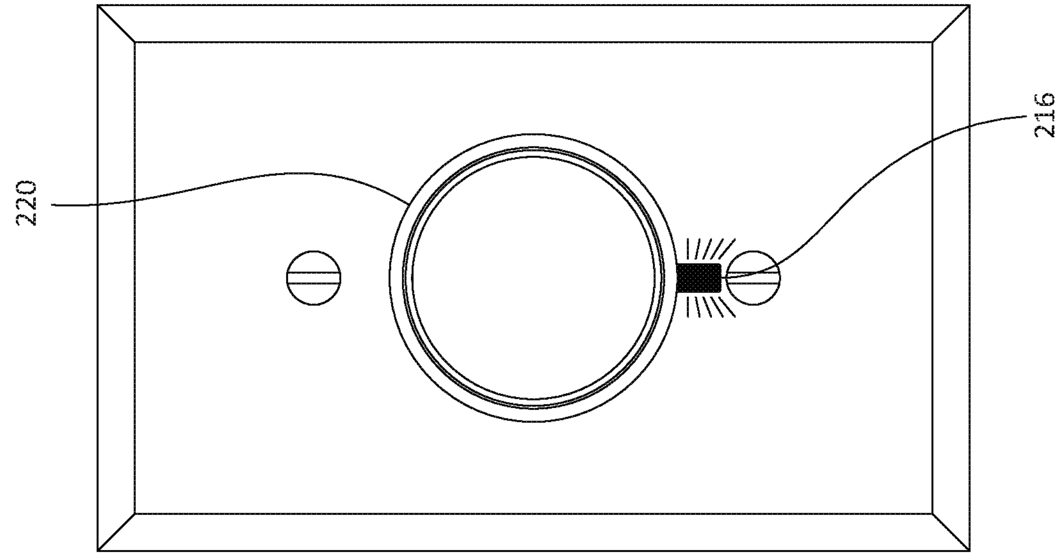
FIG. 12 is a front view of the example retrofit remote control device illustrated in FIG. 2, with the remote control device displaying a second example low-battery indication.

Additionally or alternatively, the first level of indication may be provided, for example, by illuminating and/or flashing the bottom portion 272 of the light bar 226, as well as the release tab 216, as shown in FIG. 12. The release tab 216, which may be used to remove the control unit 220 and obtain access to the battery, may be illuminated. The illumination may be generated by backlighting the release tab 216. For example, the release tab 216 may comprise a translucent (e.g., transparent, clear, and/or diffusive) material and may be illuminated by one or more light sources (e.g., LEDs) located above and/or to the side of the release tab 216 (e.g., inside the control unit 220). The illumination may be steady or flashed (e.g., in a blinking manner) such that the low battery condition may be called to a user's attention. Further, by illuminating the release tab 216, the mechanism for replacing the battery may be highlighted for the user. The user may actuate the release tab 216 (e.g., by pushing up toward the base 211 or pulling down away from the base 211) to remove the control unit 220 from the base 211. The user may then loosen the battery retention strap 232 to remove and replace the battery.

A second level of low battery indication may be provided when the remaining battery power falls below a second threshold. The second threshold may be set to represent a more urgent situation. For example, the threshold may be set at 5% of full capacity or 95% of the battery life. The second level of indication may be provided, for example, by illuminating and/or flashing one or both of the bottom portion 272 of the light bar 226 and the release tab 216, as shown in FIGS. 11 and 12. Since the battery may be critically low when the second level of low battery indication is generated, the remote control device 200 may be configured to not only provide the low battery indication but also take other measures to conserve battery power. For instance, the remote control device 200 may be configured to stop providing user feedback via the light bar 226 (e.g., to not illuminate the light bar).

As shown in FIGS. 9A-9B and 10A-10B, the light bar 226 may be attached to the actuation portion 224 around a periphery of the actuation portion 224. The rotating portion 222 may comprise an inner surface 316 that defines tabs 318 surrounding the circumference of the actuation portion 224. The tabs 318 may be separated by notches 320 that may be configured to receive engagement members 322 of the actuation portion 224 to thus engage the actuation portion 224 with the rotating portion 222. The control unit 220 may include a bushing 324 that is received within the rotating portion 222, such that an upper surface 326 of the busing 324 contacts corresponding lower surfaces 328 of the tabs 318 inside of the rotating portion 222.

When the actuation portion 224 is received within the opening of the rotating portion 222, the light bar 226 may be located between the actuation portion 224 and the rotating portion 222. When the rotating portion 222 is rotated, the actuation portion 224 and the light bar 226 may rotate in unison with the rotating portion 222. The engagement members 322 of the actuation portion 224 may be configured to move within the notches 320 of the rotating portion 222 in a direction Z (e.g., toward the mounting assembly 210), such that the actuation portion 224 (along with the light bar 226) is able to move in the direction Z.

The control unit 220 may further include an attachment portion 332 and a flexible printed circuit board (PCB) 330 that is arranged over the attachment portion 332. The flexible PCB 330 may include a main portion 334 on which most of the control circuitry of the control unit 220 (e.g., including a control circuit) may be mounted. The control unit 220 may comprise a plurality of light-emitting diodes (LEDs) 336 arranged around the perimeter of the flexible PCB 330 to illuminate the light bar 226. The flexible PCB 330 may include a switch tab 338 that is connected to the main portion 334 via flexible arms 340. The switch tab 338 may have a mechanical tactile switch 342 mounted thereto. The switch tab 338 of the flexible PCB 330 may be configured to rest on a switch tab surface 344 on the attachment portion 332. The attachment portion 332 may include engagement members 346 configured to be received within notches 348 defined by an inner surface of the bushing 324. The control unit 220 may include a ring 350. The ring 350 may be configured such that a subassembly that includes the attachment portion 332, the flexible PCB 330, and the bushing 324 may be seated in the ring 350, and the ring 350 may be configured to snap to a lower surface 352 of the rotating portion 222 when the control unit 220 is in an assembled configuration, such that the rotating portion 222, the actuation portion 224, the light bar 226, and the ring 350 may rotate about the subassembly, and about the mounting assembly 210 when the control unit 220 is attached to the mounting assembly 210. The retention clips 228, via which the control unit 220 may be attached to the mounting assembly 210, may be attached to the attachment portion 332. For example, the attachment portion 332 may define corresponding openings (not shown) that may be configured to receive a portion of the body 221 of a corresponding retention clip 228.

When the actuation portion 224 is pressed, the actuation portion 224 may move along the direction Z until an inner surface 358 of the actuation portion 224 actuates the mechanical tactile switch 342. The actuation portion 224 may be returned to an idle or rest position by the mechanical tactile switch 342.

The control unit 220 may comprise one or more batteries 360. As shown, the attachment portion 332 may define a battery recess 362 that is configured to receive two batteries 360. The control unit 220 may include a battery retention strap 364 that may hold the batteries 360 in place. The battery retention strap 364 may operate as a negative electrical contact for the batteries 360. The flexible PCB 330 may include a contact pad 366 that may operate as a positive electrical contact for the batteries 360. The battery retention strap 364 may include a leg 368 that ends in a foot 370 that may be electrically connected to a flexible pad 372 on the flexible PCB 330. The battery retention strap 364 may be held in place by a screw 374 received in an opening 376 defined by the attachment portion 332. When the screw 374 is loosened and removed from the opening 376, the flexible pad 372 may be configured to move (e.g., bend or twist) to allow the battery retention strap 364 to move out of the way of the batteries 360 to allow the batteries to be removed and/or replaced.

The control unit 220 may include a magnetic strip 380 that may be located on the inner surface 316 of the rotating portion 222. The magnetic strip 380 may extend around the circumference of the rotating portion 222. The flexible PCB 330 may include a rotational sensor pad 382 on which a rotational sensor, e.g., a Hall effect sensor integrated circuit 384 may be mounted. The rotational sensor pad 382 may be arranged perpendicular to the main portion 334 of the flexible PCB 330. The magnetic strip 380 may include a plurality of alternating positive and negative sections, and the Hall effect sensor integrated circuit 384 may include two sensor circuits that may be operable to detect the passing of the positive and negative sections of the magnetic strip 380 as the rotating portion 222 is rotated. Accordingly, the control circuit of the control unit 220 may be configured to determine the rotational speed and direction of rotation of the rotation portion 222 in response to the Hall effect sensor integrated circuit 384. The flexible PCB 330 may include a programming tab 386 to allow for programming of the control circuit of the control unit 220.

As shown in FIGS. 9A-9B and 10A-10B, the attachment portion 332 may comprise an actuator opening 390 that may be configured to receive at least a portion of the toggle actuator 204 of the light switch 202 when the control unit 220 is mounted to the mounting assembly 210. The attachment portion 332 may define a wall 392 that may prevent the toggle actuator 204 of the light switch 202 from extending into inner structure of the control unit 220 (e.g., if the toggle actuator 204 is particularly long). The flexible PCB 330 may include an antenna 394 on an antenna tab 396 that may lay against the wall 392 in the actuator opening 390.

Figure 15A:
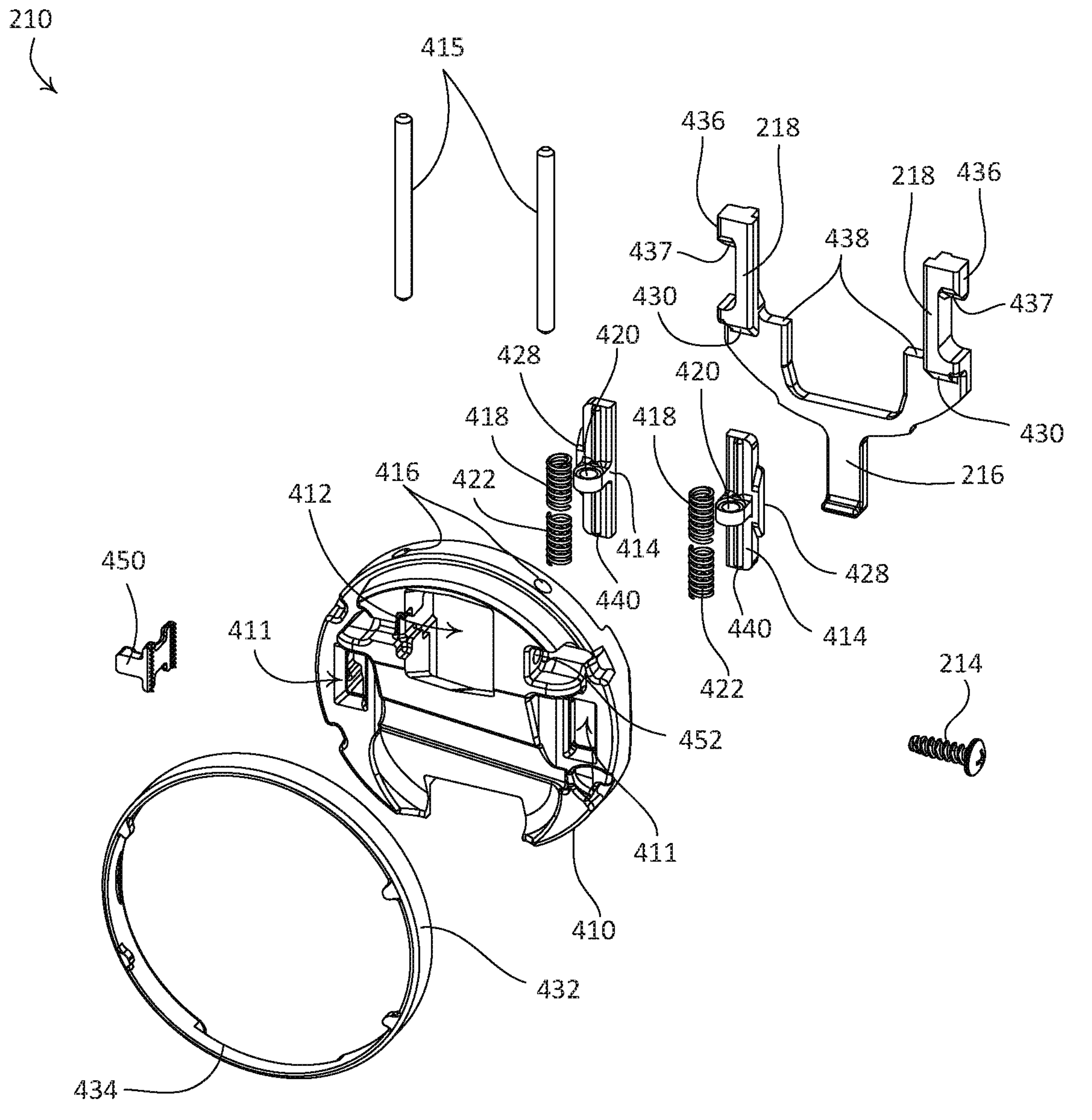
FIG. 15A is a front exploded view of the mounting assembly of the example retrofit remote control device illustrated in FIG. 2.
Figure 15B:
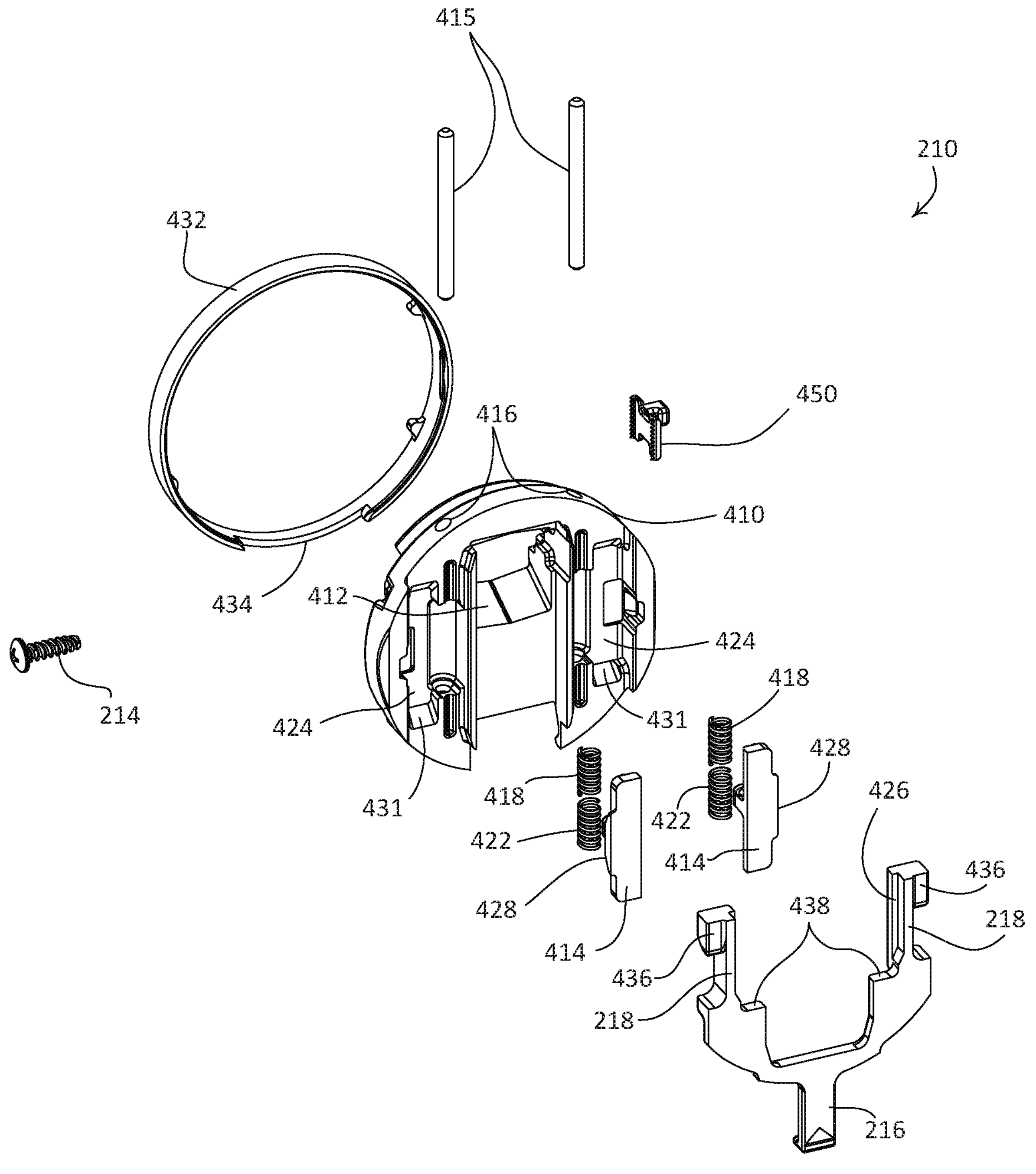
FIG. 15B is a rear exploded view of the mounting assembly of the example retrofit remote control device illustrated in FIG. 2.
Figure 16:
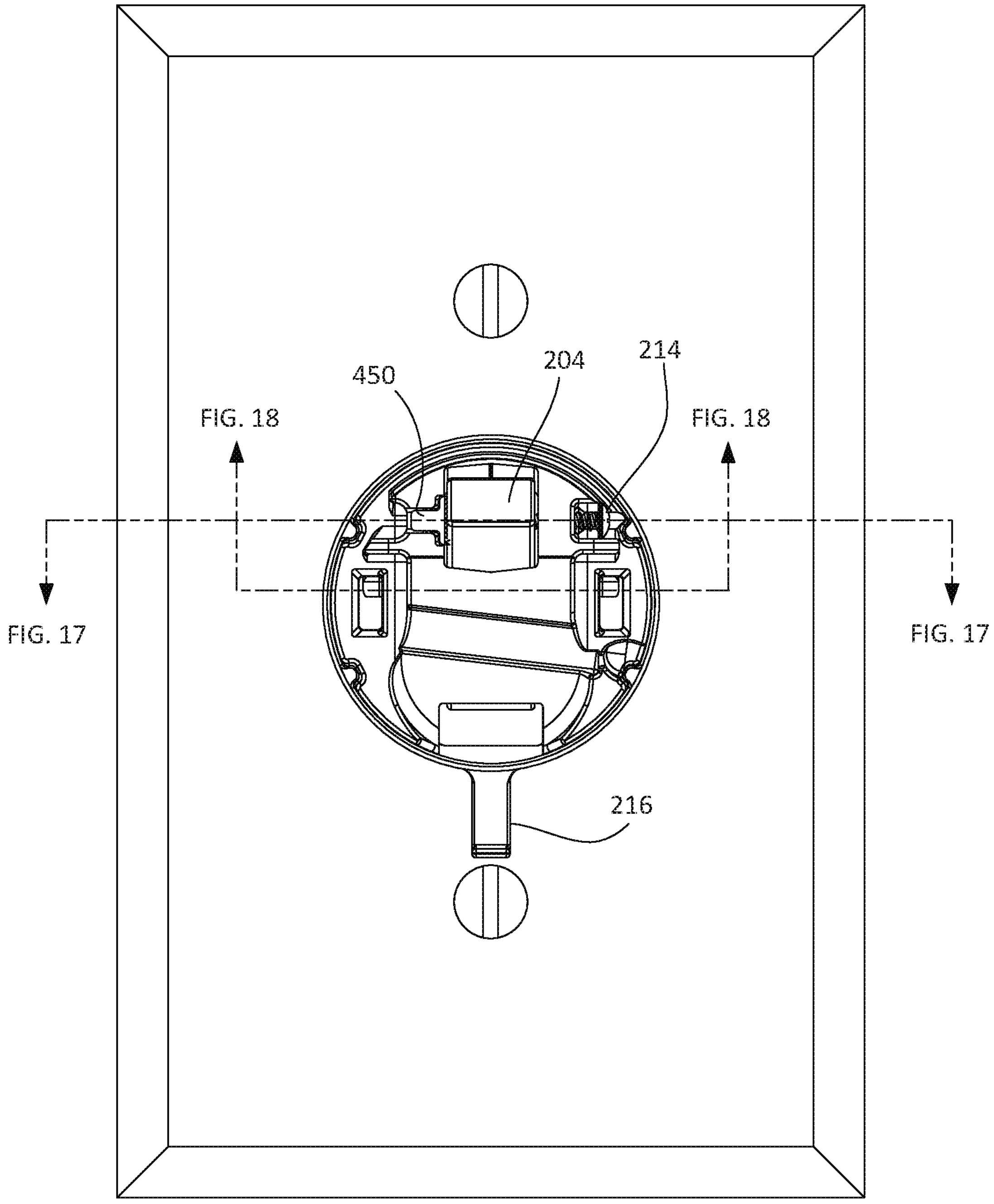
FIG. 16 is a front view of the example retrofit remote control device illustrated in FIG. 2, with the control unit (not shown) detached from the mounting assembly.
Figure 17:
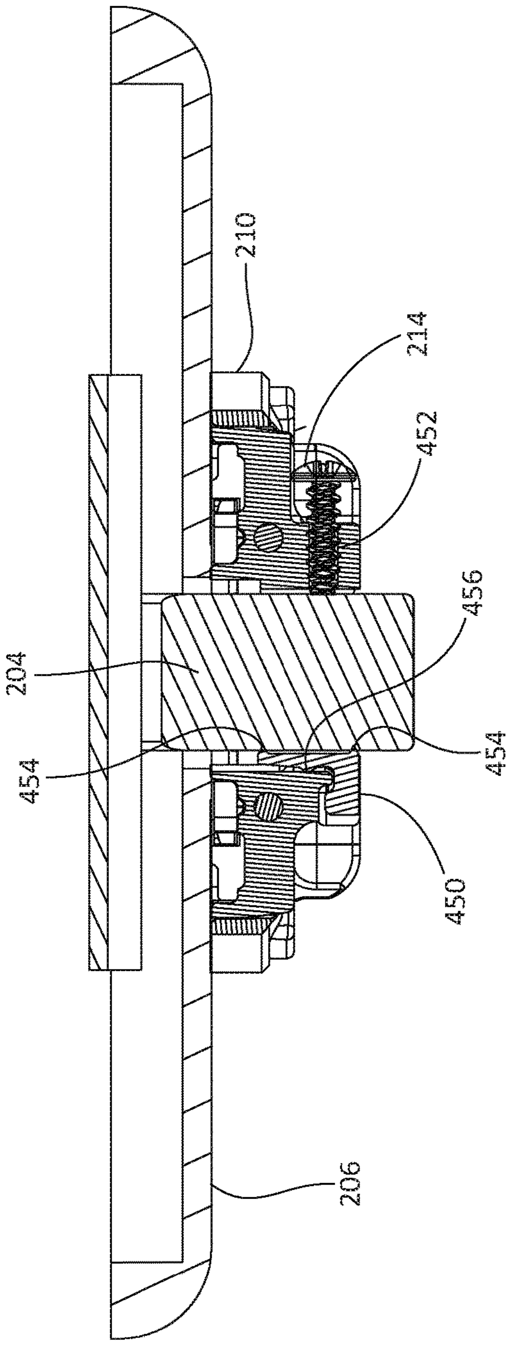
FIG. 17 is a downward-facing section view of the example retrofit remote control device illustrated in FIG. 2, with the control unit (not shown) detached from the mounting assembly.
Figure 18:
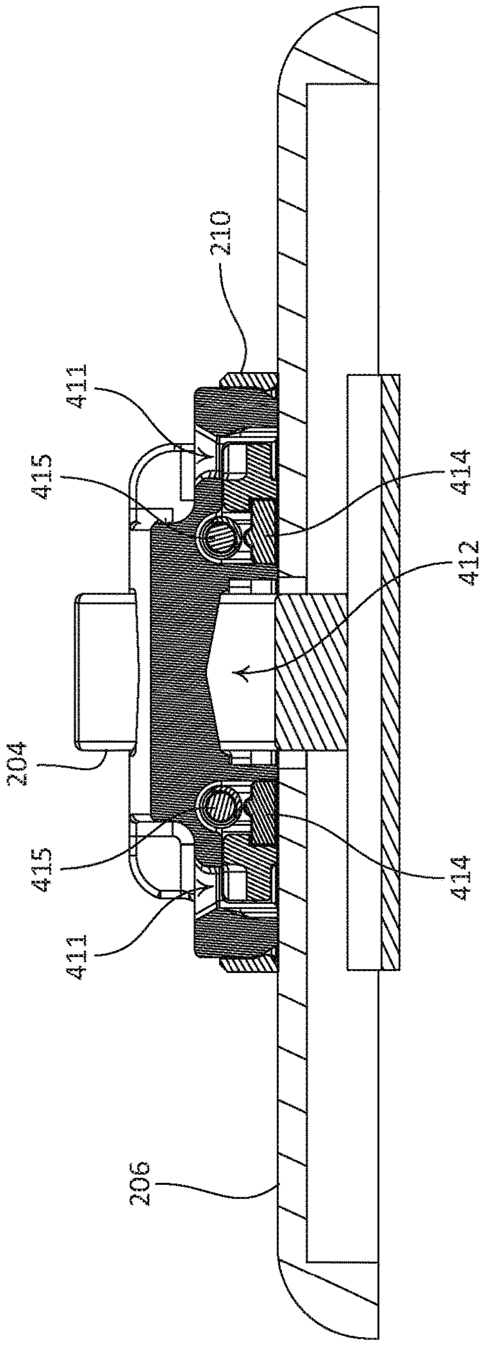
FIG. 18 is an upward-facing section view of the example retrofit remote control device illustrated in FIG. 2, with the control unit detached from the mounting assembly.

As shown in FIGS. 15A-15B, the mounting assembly 210 may include a base 410. As shown, the base 410 may define a toggle actuator opening 412 that extends therethrough, in which a portion of the toggle actuator 204 of the light switch 202 may be received. The base 410 may further define a pair of openings 411 that extend therethrough, and that may be configured to receive the retention clips 228 of the control unit 220 therein.

The locking members 218 may be configured to maintain the remote control device 200 in an assembled configuration, for instance with the control unit 220 secured to the mounting assembly 210 in an attached position. For example, as shown the locking members 218 of the release tab 216 may define tabs 436 that are configured to engage with the retention clips 228 when the control unit 220 is attached to the mounting assembly 210. As shown each tab 436 may define an angled surface 437 along which a corresponding one of the retention clips 228 may ride. In an example of attaching the control unit 220 to the mounting assembly 210, the retention clips 228 may be aligned with and inserted into corresponding openings 411 of the base 410. As the retention clips 228 are disposed into the openings 411 the retention clips 228 may contact the angled surfaces 437, thereby causing the tabs 436, and thus the release tab 216, to be biased upward from the locking position toward the release position. As the control unit 220 approaches the attached position relative to the mounting assembly 210, the retention clips 228 may ride along the angled surfaces 437 and may pass respective bottom edges thereof. The tabs 436 may then slide into secured positions in front of the tab ends 225 of the retention tabs 223 of the retention clips 228 as the release tab 216 is biased (e.g., spring-biased) back to the locking position. With the release tab 216 returned to the locking position, the tabs 436 may retain the retention clips 228 in position, thereby preventing the control unit 220 from becoming inadvertently detached from the mounting assembly 210.

Figure 19:
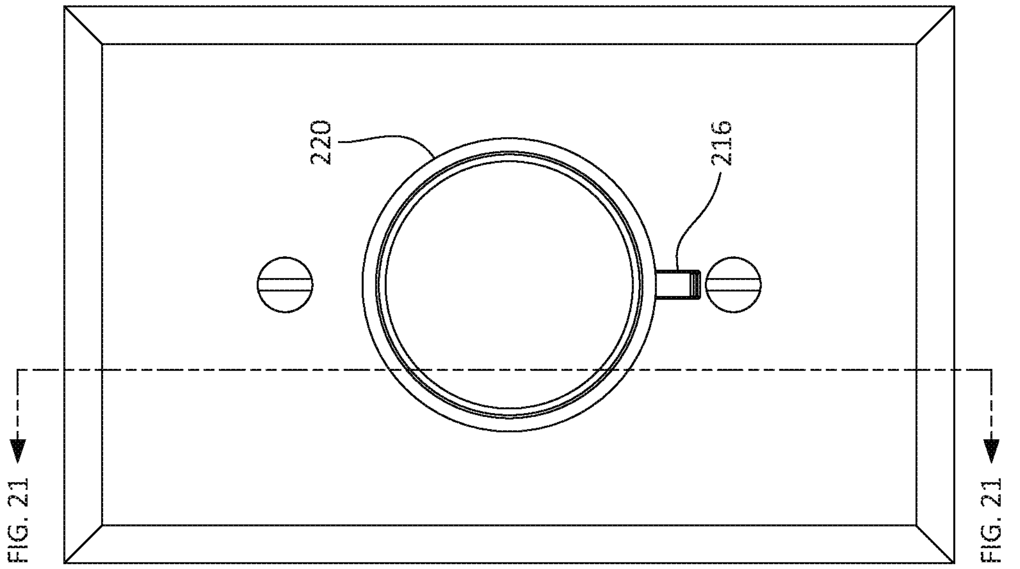
FIG. 19 is a front view of the example retrofit remote control device illustrated in FIG. 2, with a release tab of the mounting assembly in a rest, locking position.
Figure 21:
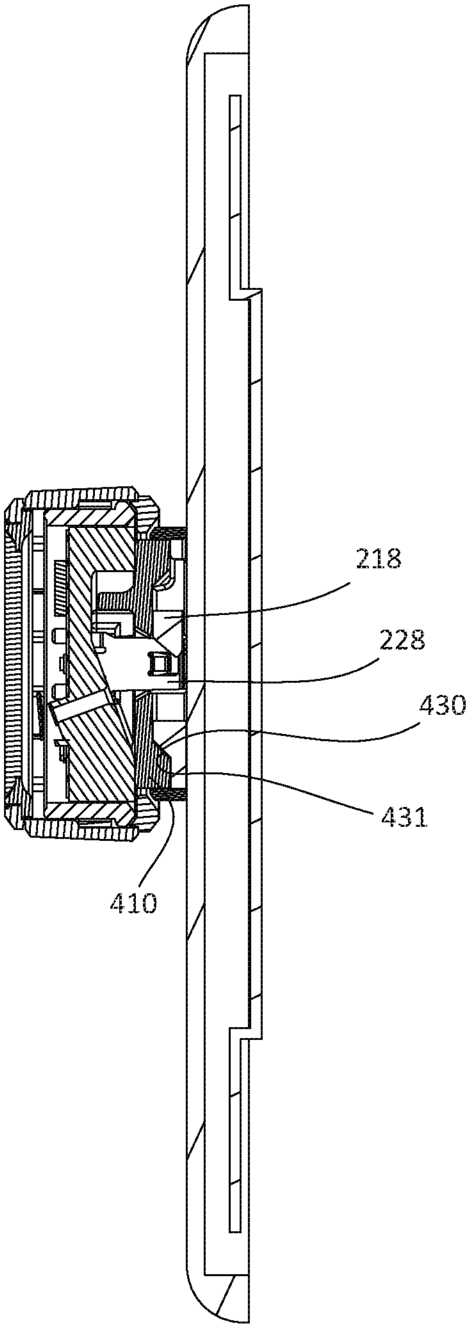
FIG. 21 is a left-facing section view of the example retrofit remote control device illustrated in FIG. 2, with the release tab in the rest position.

The mounting assembly 210 may be configured to align the tabs 436 of the release tab 216 with the openings 411 of the base 410 when the release tab 216 is in the locking position. For example, the release tab 216 may be spring-biased into the locking position. As shown, the release tab 216 may define abutment surfaces 438, for instance adjacent the locking members 218. The mounting assembly 210 may include sliding members 414 that may be configured to contact the abutment surfaces 438 to bias the release tab 216 into the locking position. The mounting assembly 210 may further include dowels 415 that may be received through openings 416 defined by the base 410, first springs 418, openings 420 in the sliding members 414, and second springs 422. The base 410 may define channels 424 that are configured to receive the locking members 218 of the release tab 216, such that flanges 426 of the release tab 216 are received under corresponding wings 428 defined by the sliding members 414. The wings 428 and flanges 426 may cooperate to hold the locking members 218 against the base 410. When the release tab 216 is in the locking position (e.g., as shown in FIGS. 19 and 21), the first springs 418 may apply forces to the locking members 218 such that lower surfaces 430 defined the locking members 218 abut corresponding end surfaces 431 defined by the channels 424. The mounting assembly 210 may include a ring 432 that defines a gap 434 through which the release tab 216 may be received such that the release tab extends below the control unit 220.

Figure 24:
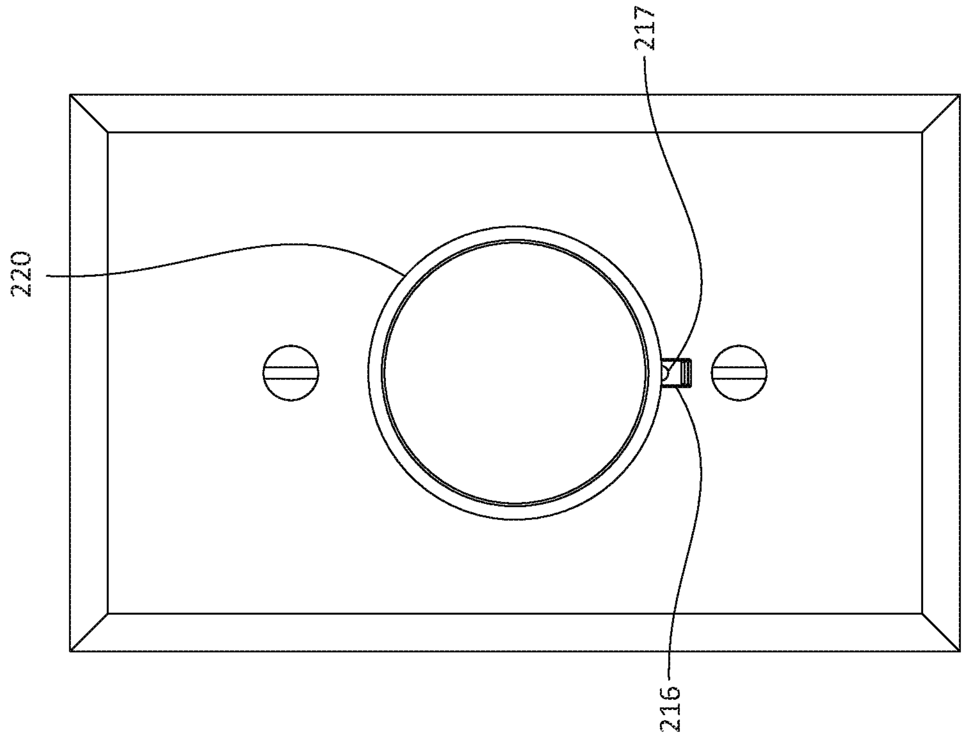
FIG. 24 is a front view of the example retrofit remote control device illustrated in FIG. 24, with the screw removed and the release tab operated to the release position.
Figure 23:
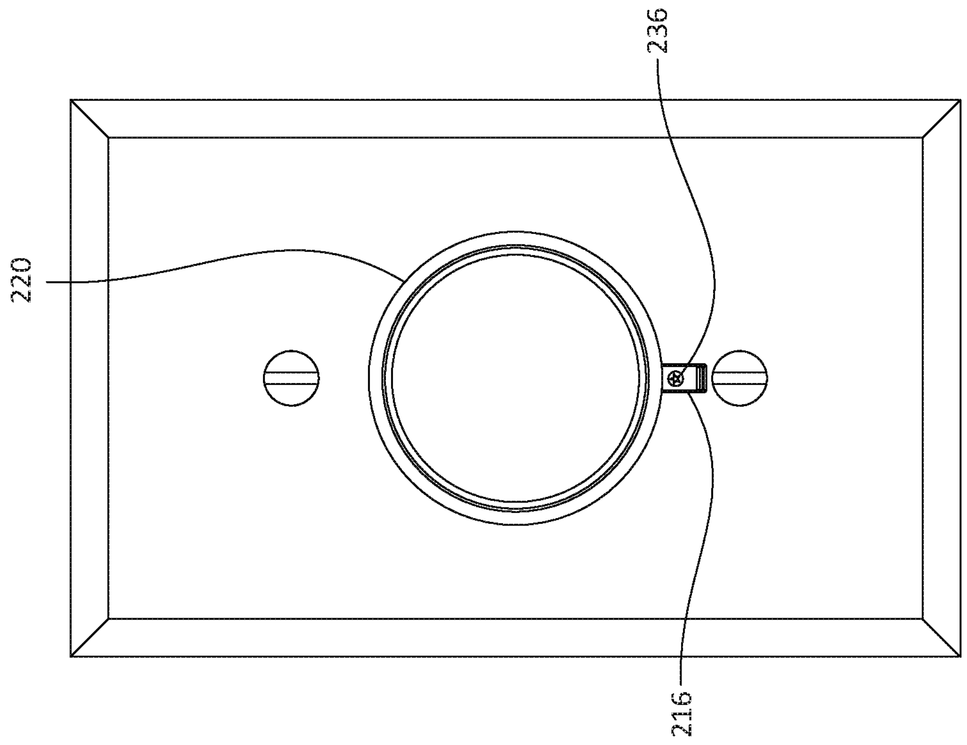
FIG. 23 is a front view of an example retrofit remote control device, with the release tab of the mounting assembly secured in the locking position via a screw.

The mounting assembly 210 may be configured such that the release tab 216 may secured in the locking position, for instance once the control unit 220 is attached to the mounting assembly 210. For example, the mounting assembly 210 may include a locking mechanism that enables the release tab 216 to be secured in the locking position. This may deter or prevent theft of the control unit 220. In accordance with an example configuration shown in FIGS. 23 and 24, the mounting assembly 210 may include a locking mechanism in the form of a screw 236 and an aperture 217 defined in the release tab 216 that extends therethrough. The screw 236 may be driven into the aperture 217 and into a corresponding aperture in the faceplate 206 (not shown), thereby securing the release tab 216 in the locking position. The screw 236 may be configured with an uncommon and/or proprietary drive opening, such that a specialized tool is required to remove the screw 236 in order to enable operation of the release tab 216. It should be appreciated that the mounting assembly 210 is not limited to the illustrated locking mechanism configuration including the screw 236 and aperture 217.

Figure 20:
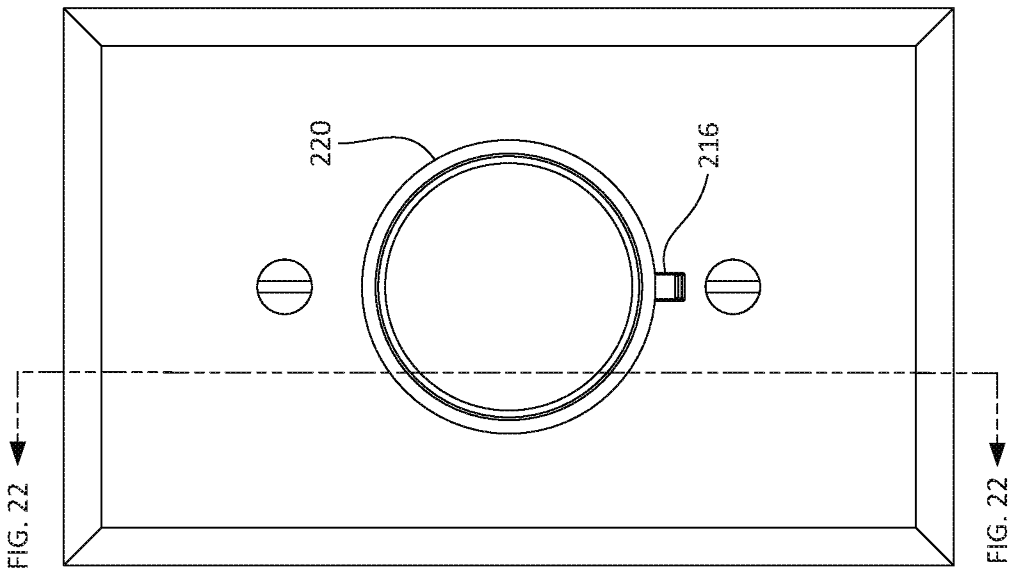
FIG. 20 is a front view of the example retrofit remote control device illustrated in FIG. 2, with the release tab in an activated, release position.
Figure 22:
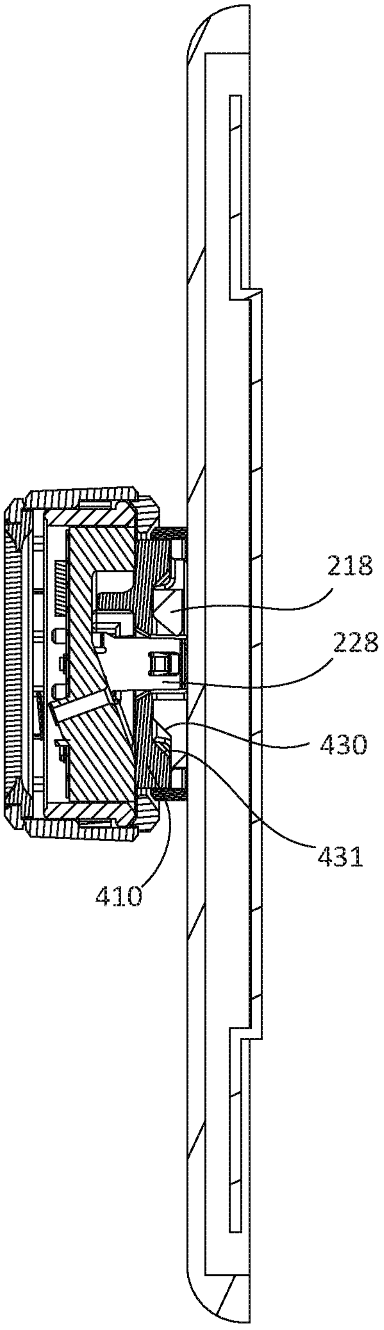
FIG. 22 is a left-facing section view of the example retrofit remote control device illustrated in FIG. 2, with the release tab in the activated position.

In an example operation of detaching the control unit 220 from the mounting assembly 210, the release tab 216 may be biased toward the control unit 220 to operate the release tab 216 into the release position (e.g., as shown in FIGS. 20 and 22). It should be appreciated that, if provided, the screw 236 may be removed prior to operation of the release tab 216. As the release tab 216 is operated to the release position, the tabs 436 of the locking members 218 may move upward, and the abutment surfaces 438 of the release tab 216 may contact corresponding abutment surfaces 440 of the sliding members 414, thereby compressing the first springs 418. As the release tab 216 approaches the release position, the locking members 218 may move upward, causing the tabs 436 to move out of the way of the retention clips 228, such that the retention clips 228 may be removed through the openings 411. When the retention clips 228 are not prevented from being disengaged from the mounting assembly 210 by the tabs 436, the control unit 220 may be detached from the mounting assembly 210 by pulling the control unit 220 away from the mounting assembly 210. When the release tab 216 is subsequently released, the first springs 418 may bias the release tab 216 from the release position back into the locking position, such that the tabs 436 are again aligned with the openings 411 of the base 410. It should be appreciated that for the sake of simplicity, the batteries 360 of the control unit 220 are not shown in FIGS. 21 and 22.

The mounting assembly 210 may be mounted to the toggle actuator 204 of the light switch 202 when the toggle actuator is in an up position (e.g., as shown in FIG. 4), or alternatively may be mounted to the toggle actuator 204 when the toggle actuator 204 is in a down position (e.g., opposite the position of the toggle actuator 204 shown in FIG. 4). Stated differently, the mounting assembly 210 may be mounted to the toggle actuator 204 of the light switch in a first orientation (e.g., as shown in FIG. 4), and in a second orientation in which the base 410 is rotated 180 degrees from what is shown in FIG. 4. To illustrate, in an example installation in which a single remote control device 200 is installed over a single-pole switch, the up position of the toggle actuator typically corresponds to “on” such that power is delivered to a connected electrical load, but the down position of the toggle actuator may correspond to “on” (e.g., if the switch is incorrectly installed upside down). In another example installation in which a single remote control device 200 is installed over a 3-way switch, either the up or down position of the toggle actuator may correspond to “on” such that power is delivered to the electrical load (e.g., depending on how the installation is wired). In still another example installation in which two remote control devices 200 are installed over respective 3-way switches, the up position of the toggle actuator may correspond to “on” for the first 3-way switch of the installation and the down position of the toggle actuator may correspond to “on” for the second 3-way switch of the installation (e.g., depending on how the installation is wired).

In accordance with the second orientation, the release tab 216 may be inverted, such that the release tab 216 still protrudes beyond the bottom of the control unit 220. The ring 432 may similarly be rotated 180 degrees, such that the gap 434 aligns with the release tab 216. When the mounting assembly 210 is mounted to the toggle actuator 204 in the second orientation, the second springs 422 may operate to bias the release tab from the release position back into the locking position.

It should be appreciated that the remote control device 200 is not limited to the illustrated retention and release mechanisms. For example, the mounting assembly 210 may alternatively be configured such that the release tab 216 may be pulled away from the control unit 220 to operate the release tab 216 from the locking position into the release position.

The mounting assembly 210 may include a retention member that is configured to engage with the toggle actuator 204, for instance within the toggle actuator opening 412. For example, as shown the mounting assembly 210 may include a clamp 450 that may be configured to extend into the toggle actuator opening 412, opposite the screw 214. The screw 214 may be received in an aperture 452 defined in the base 410. The clamp 450 may include a plurality of teeth 454 that may be configured to engage with (e.g., bite into) the toggle actuator 204 of the light switch 202 when the screw 214 is driven inward. Because the mounting assembly 210 is configured to engage with opposed side surfaces of the toggle actuator 204, adjustment of the mounting assembly 210 in a vertical (e.g., up and down) direction relative to the toggle actuator 204 may be possible when securing the mounting assembly 210 to the toggle actuator 204. The clamp 450 may be configured to define a protrusion 456 about which the clamp 450 may be configured to pivot, for example such that the clamp 450 is able to compensate for differing drafts on the toggle actuators of respective light switches to which the mounting assembly 210 may be mounted. The clamp 450 may be configured to attach the mounting assembly 210 to the toggle actuator 204 such that the mounting assembly 210 is not able to pivot about an axis defined by the screw 214, for instance when a downward force is applied to the control unit 220 when the control unit 220 is attached to the mounting assembly 210.

FIGS. 25-33 depict another example remote control device 500 (e.g., a battery-powered rotary remote control device) that may be deployed, for example, as the remote control device 120 of the load control system 100 shown in FIG. 1. The remote control device 500 may be configured to be mounted over a standard light switch (e.g., the toggle actuator 106 of the SPST maintained mechanical switch 104 shown in FIG. 1). For example, as shown the remote control device 500 may be installed over the toggle actuator 504 of an installed light switch 502 without removing a faceplate 506 that is mounted to the light switch 502 (e.g., via faceplate screws 508). As shown, the faceplate 506 defines an outer surface 505. The outer surface 505 may alternatively be referred to as a front surface of the faceplate 506.

Figure 26:
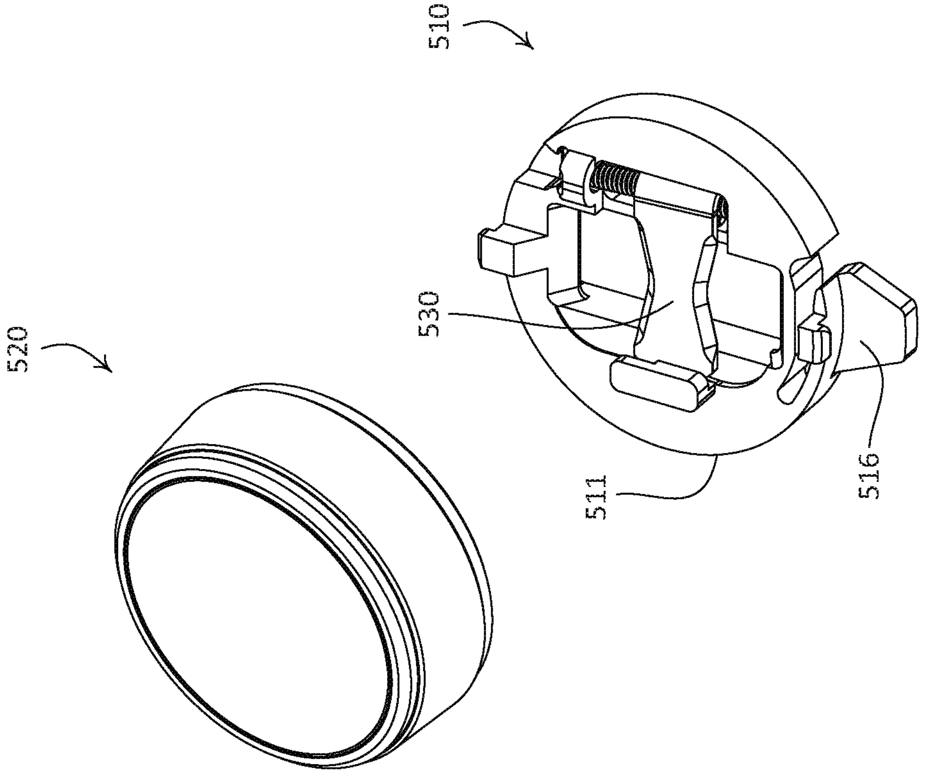
FIG. 26 is a front perspective view of the example retrofit remote control device illustrated in FIG. 25, with the control unit detached from the mounting assembly.
Figure 25:
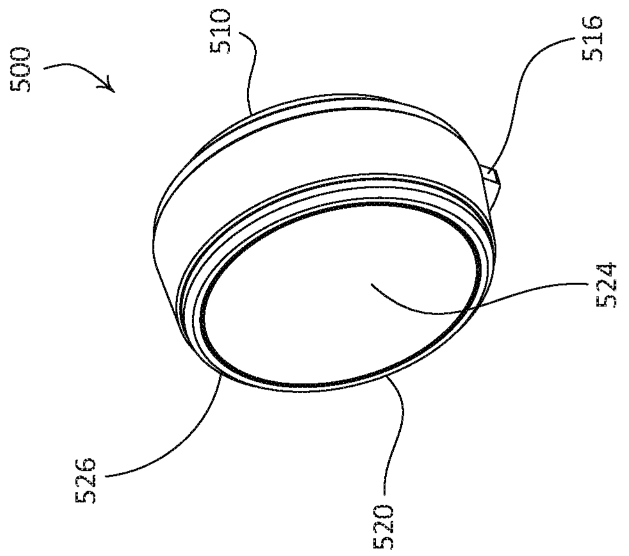
FIG. 25 is a front perspective view of another example retrofit remote control device that includes a control unit component and a mounting assembly component.
Figure 29:
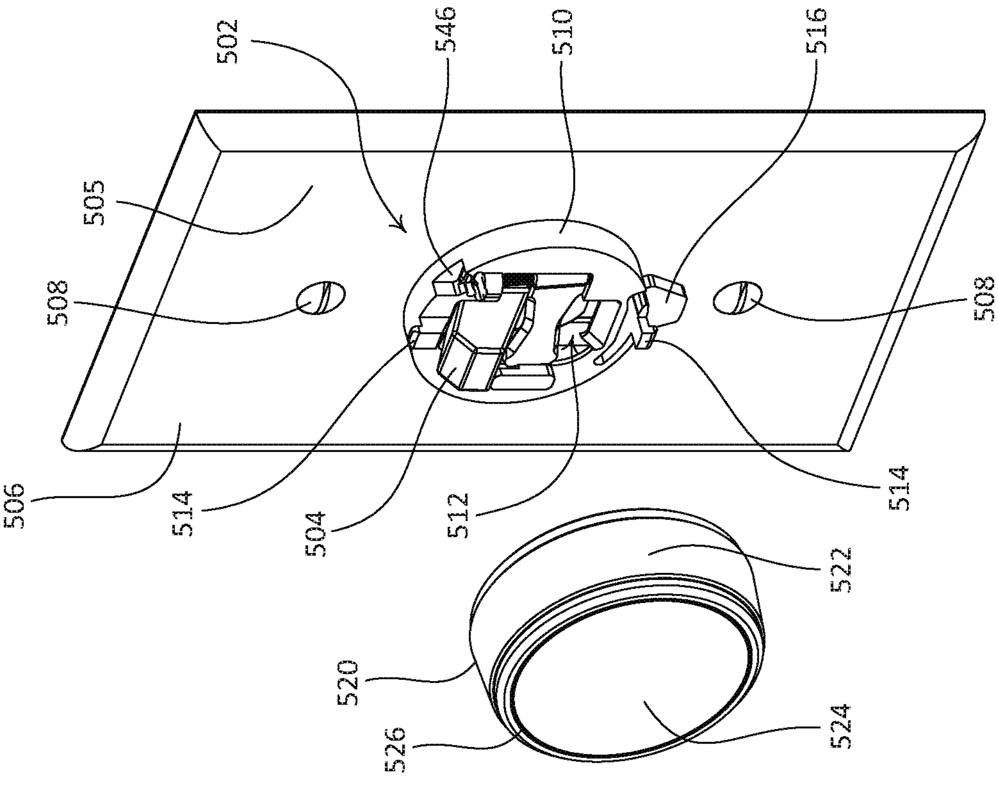
FIG. 29 is a front perspective view of the example retrofit remote control device illustrated in FIG. 25, with the mounting assembly mounted over the switch actuator of an installed light switch, and with the control unit detached from the mounting assembly.

The remote control device 500 may include a mounting assembly 510 and a control unit 520 that may be attached to the mounting assembly 510. The mounting assembly 510 may be more generally referred to as a base portion of the remote control device 500. The control unit 520 may include a rotating portion that is rotatable with respect to the mounting assembly 510. For example, as shown, the control unit 520 may include an annular rotating portion 522 that is configured to be rotatable relative to the mounting assembly 510 when the control unit 520 is attached to the mounting assembly 510. The remote control device 500 may be configured such that the control unit 520 and the mounting assembly 510 are removably attachable to one another. FIGS. 26 and 29 depict the remote control device 500 with the control unit 520 detached from the mounting assembly 510.

The mounting assembly 510 may be configured to be fixedly attached to the actuator of a mechanical switch, such as the toggle actuator 504 of the light switch 502, and may be configured to maintain the actuator in a current position, such as in the on position. For example, as shown the mounting assembly 510 may include a base 511 that defines a toggle actuator opening 512 that extends therethrough and that is configured to receive at least a portion of the toggle actuator 504. As shown, the toggle actuator opening 512 may be defined by an elongated slot 518 that extends through the base 511. The slot 518 may define a first end 517 and an opposed second end 519. The first and second ends 517, 519 of the slot 518 may be configured to slide along corresponding sides of the toggle actuator 504 of the light switch 502, or may be configured with respective edges that are configured to bite into corresponding sides of the toggle actuator 504.

The remote control device 500 may be configured to enable releasable attachment of the control unit 520 to the mounting assembly 510. The mounting assembly 510 may include one or more engagement features that are configured to engage with complementary engagement features of the control unit 520. For example, as shown the base 511 of the mounting assembly 510 may include resilient snap-fit connectors 514, and the control unit 520 may define corresponding recesses 515 that are configured to receive the snap-fit connectors 514. The mounting assembly 510 may include a release mechanism that is operable to cause the control unit 520 to be released from an attached position relative to the mounting assembly 510. As shown, the base 511 of the mounting assembly 510 may include a release tab 516 that may be actuated (e.g., pushed) to release the control unit 520 from the mounting assembly 510.

As shown, the release tab 516 may be connected to the base 511 of the mounting assembly 510 via a resilient, cantilevered spring arm 550, such that a gap 552 is defined between the base 511 and the spring arm 550. In operation, when the release tab 516 is pressed up toward the base 511, the spring arm 550 may deflect into the gap 552, allowing the lowermost snap-fit connector 514 adjacent to the release tab 516 to be removed from the corresponding lower recess 515 of the control unit 520, such that the control unit 520 may be released from the mounting assembly 510. When the control unit 520 is attached to the mounting assembly 510, the uppermost snap-fit connector 514 may first be positioned in the corresponding upper recess 515 of the control unit 520. The lower portion of the control unit 520 may then be pressed toward the base 511, such that the spring arm 550 deflects into the gap 552 until the lower snap-fit connector 514 is received into the lower recess 515 of the control unit 520, at which point the spring arm 550 may resiliently return to a rest position (e.g., as shown in FIGS. 29 and 30).

Figure 30:
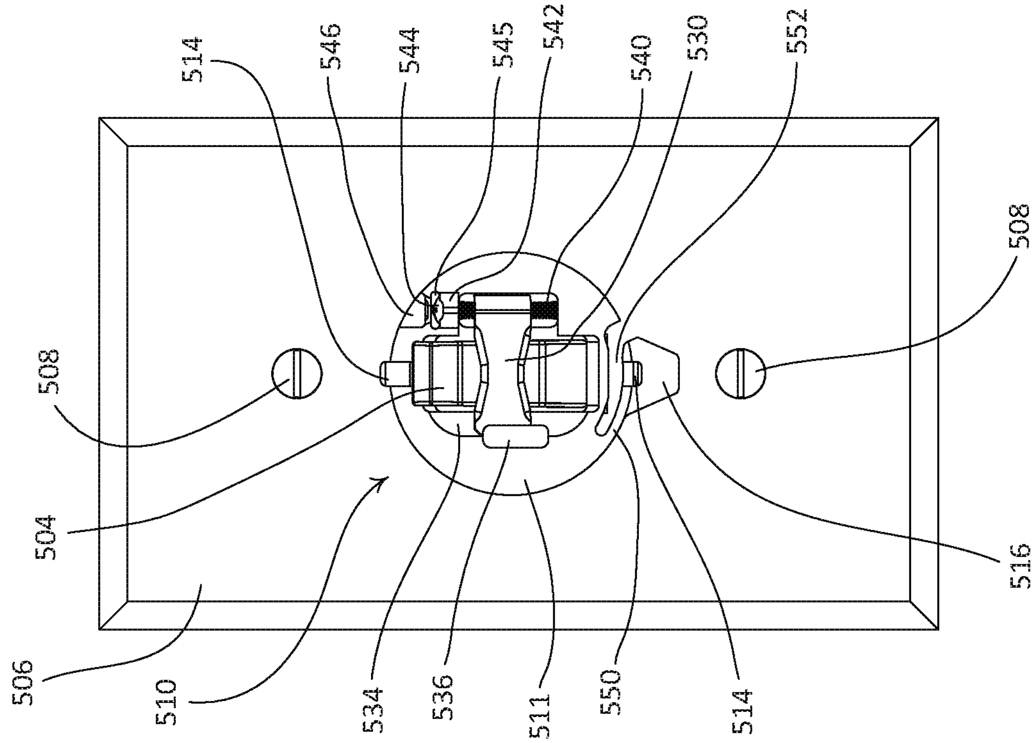
FIG. 30 is a front view of the example retrofit remote control device illustrated in FIG. 25, with the control unit (not shown) detached from the mounting assembly.

The mounting assembly 510 may be mounted to the toggle actuator 504 of the light switch 502 when the toggle actuator is in an up position (e.g., a "switched up" position as shown in FIGS. 29 and 30), or alternatively may be mounted to the toggle actuator 504 when the toggle actuator 504 is in a down position (e.g., a "switched down" position that is opposite the position of the toggle actuator 504 shown in FIGS. 29 and 30). To illustrate, in an example installation in which a single remote control device 500 is installed over a single-pole switch, the up position of the toggle actuator typically corresponds to "on" such that power is delivered to a connected electrical load but the down position of the toggle actuator may correspond to "on" (e.g., if the switch is incorrectly installed upside down). In another example installation in which a single remote control device 500 is installed over a 3-way switch, either the up or down position of the toggle actuator may correspond to "on" such that power is delivered to the electrical load (e.g., depending on how the installation is wired). In still another example installation in which two remote control devices 500 are installed over respective 3-way switches, the up position of the toggle actuator may correspond to "on" for the first 3-way switch of the installation and the down position of the toggle actuator may correspond to "on" for the second 3-way switch of the installation (e.g., depending on how the installation is wired).

The mounting assembly 510 may include an engagement mechanism that is configured to engage the toggle actuator 504, for example when the toggle actuator 504 is received in the toggle actuator opening 512. The engagement mechanism may be configured to engage the toggle actuator 504 such that the mounting assembly 510 is secured in position relative to the toggle actuator 504. For example, as shown the engagement mechanism may include a bar 530. The bar 530 may be operably coupled to the base 511, and may be configured to be moveable, for instance translatable, relative to the base 511. The bar 530 may be configured to be translated within the toggle actuator opening 512 such that the bar 530 engages with the toggle actuator 504, thereby fixedly attaching the mounting assembly 510 in position relative to the toggle actuator 504 of the light switch 502 when the toggle actuator 504 is in the up position or the down position. As shown, the bar 530 may extend across the toggle actuator opening 512 (e.g., across the slot 518) of the base 511, such that the base 511 defines a first opening 512A to receive the toggle actuator 504 when the toggle actuator 504 is in the up position and a second opening 512B to receive the toggle actuator 504 when the toggle actuator 504 is in the down position. In accordance with the illustrated orientation of the mounting assembly 510, the first opening 512A may be referred to as an upper opening of the base 511 and the second opening 512B may be referred to as a lower opening of the base 511.

The illustrated bar 530 defines a first end 532 and an opposed second end 538. The first end 532 of the bar 530 may be configured to slide within a channel 534 defined by the base 511. As shown, the base 511 may define a flange 536 that is configured to retain the first end 532 of the bar 530 in the channel 534. The second end 538 of the bar 530 may define a threaded sleeve 539 that is configured to receive a screw 540. The base 511 may be configured to capture the screw 540 such that the screw 540 is freely rotatable relative to the base 511. For example, the base 511 may define a collar 542 that retains a first non-treaded portion of a shaft of the screw 540, a recess 545 that is configured to capture a head 544 of the screw 540, and an aperture (not shown) that is configured to support a tip portion (not shown) of the screw 540. In this regard, the base 511 may be configured to support opposed ends of the screw 540 such that the screw 540 may be rotated relative to the base 511 without causing translation of the screw 540 relative to the base 511.

As shown, the base 511 may define a recess 546 that is configured to allow a tool, such as a screwdriver, to access the head 544 of the screw 540 to rotate the screw 540. As shown, the base 511 may be configured to support the screw 540 such that the screw 540 is angled slightly with respect to outer surface 505 of the faceplate 506 (e.g., approximately 5°). Stated differently, the base 511 may support the screw 540 such that an axis of rotation of the screw 540 is angularly offset relative to a plane defined by the outer surface 505 of the faceplate 506 of the light switch 502. This may make it easier for a user to access the head 544 of the screw with a screwdriver. Alternatively, the base 511 may be configured to support the screw 540 such that the screw 540 is parallel or substantially parallel with respect to the outer surface 505 of the faceplate 506. Stated differently, the base 511 may support the screw 540 such that the axis of rotation of the screw 540 is parallel relative to a plane defined by the outer surface 505 of the faceplate 506 of the light switch 502.

Rotating the screw 540 in a first direction (e.g., clockwise) may cause the bar 530 to translate upward along the screw 540 toward the first end 517 of the slot 518 such that the bar 530 contacts a first side of the toggle actuator 504 of the light switch 502, for instance when the toggle actuator 504 is in the up position. Rotating the screw 540 in a second direction (e.g., counter-clockwise) may cause the bar 530 to translate downward along the screw 540 toward the second end 519 of the slot 618 such that the bar 530 contacts an opposed second side the toggle actuator 504, for instance when the toggle actuator 504 is in the down position.

The bar 530 may be configured to mechanically grip the toggle actuator 504. For example, as shown, the bar 530 may define an upper edge 548 that faces the first end 517 of the slot 518 and that is configured to bite into a corresponding lower surface of the toggle actuator 504 when the toggle actuator 504 is in the up position, and may define a lower edge 549 that faces the second end 519 of the slot 518 and that is configured to bite into a corresponding upper surface of the toggle actuator 504 when the toggle actuator 504 is in the down position. Because the mounting assembly 510 is configured to engage with opposed upper and lower surfaces of the toggle actuator 504, adjustment of the mounting assembly 510 in a lateral (e.g., side-to-side) direction relative to the toggle actuator 504 may be possible when securing the mounting assembly 510 to the toggle actuator 504. For example, as shown the upper and lower edges 548, 549 of the bar 530 may be beveled inward from the opposed ends 532, 538 of the bar 530, such that the upper and lower edges 548, 549 may cause the mounting assembly 510 to laterally self-center on the toggle actuator 504 of the light switch 502 as the bar 530 makes contact with the toggle actuator 504. The bar 530 may be made of any suitable material, such as metal.

When the bar 530 is contacting (e.g., gripping) the toggle actuator 504 of the light switch 502 in either the up position or the down position, the base 511, and thus the mounting assembly 510, may be secured in a fixed position relative to the toggle actuator 504, and the toggle actuator 504 may be prevented from being switched to the off position. In this regard, a user of the remote control device 500 may be unable to inadvertently switch the light switch 502 off when the remote control device 500 is mounted over the light switch 502.

Figure 28:
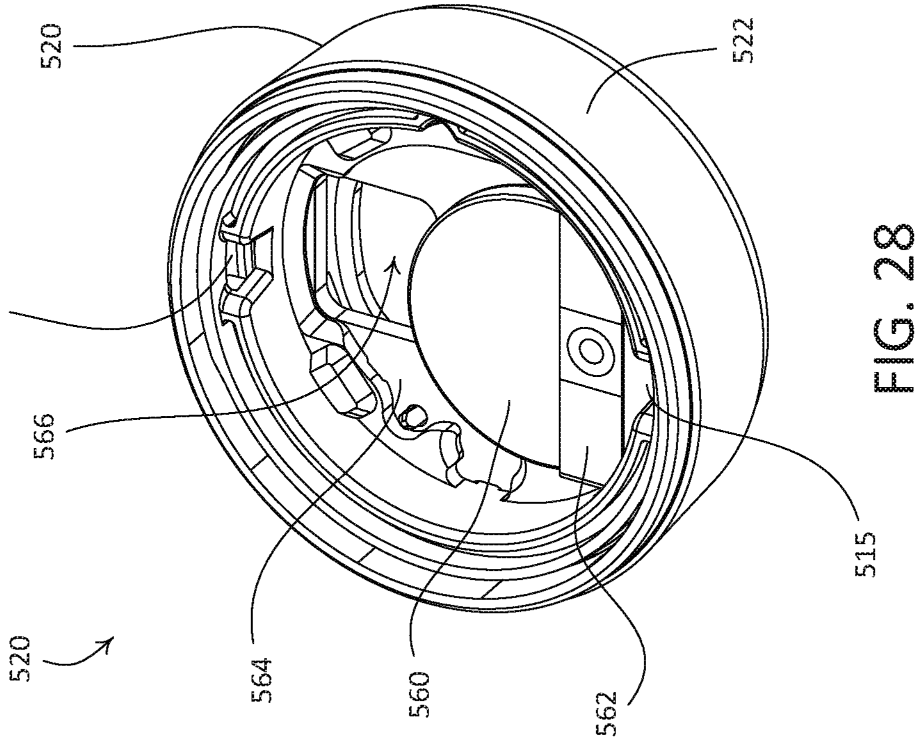
FIG. 28 is a rear perspective view of the control unit of the example retrofit remote control device illustrated in FIG. 25.
Figure 27:
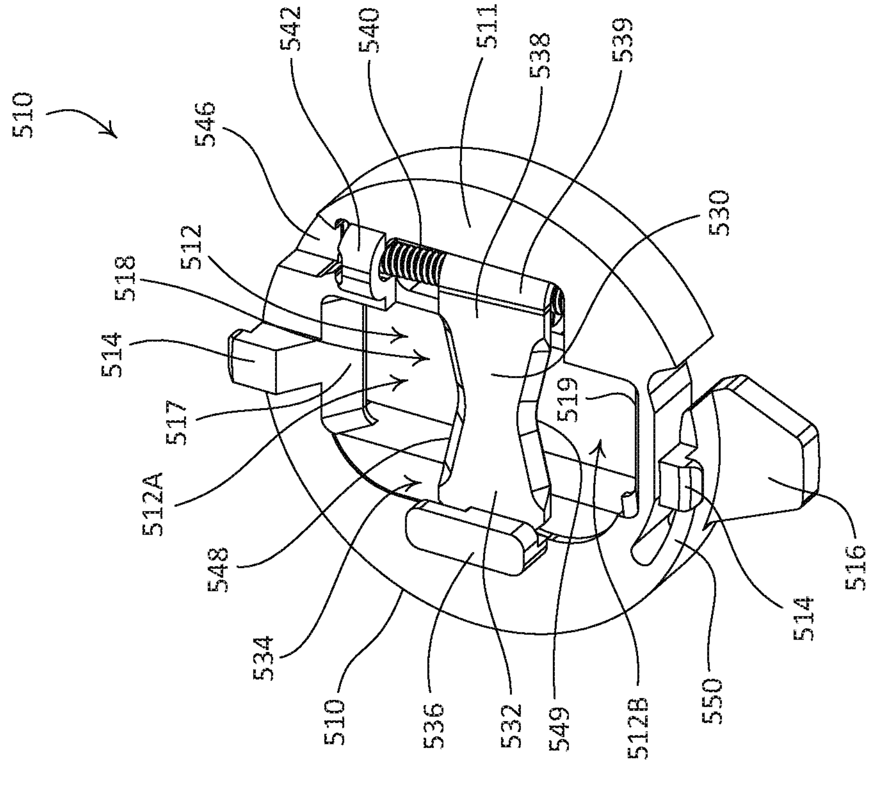
FIG. 27 is a front perspective view of the mounting assembly of the example retrofit remote control device illustrated in FIG. 25.
Figure 33:
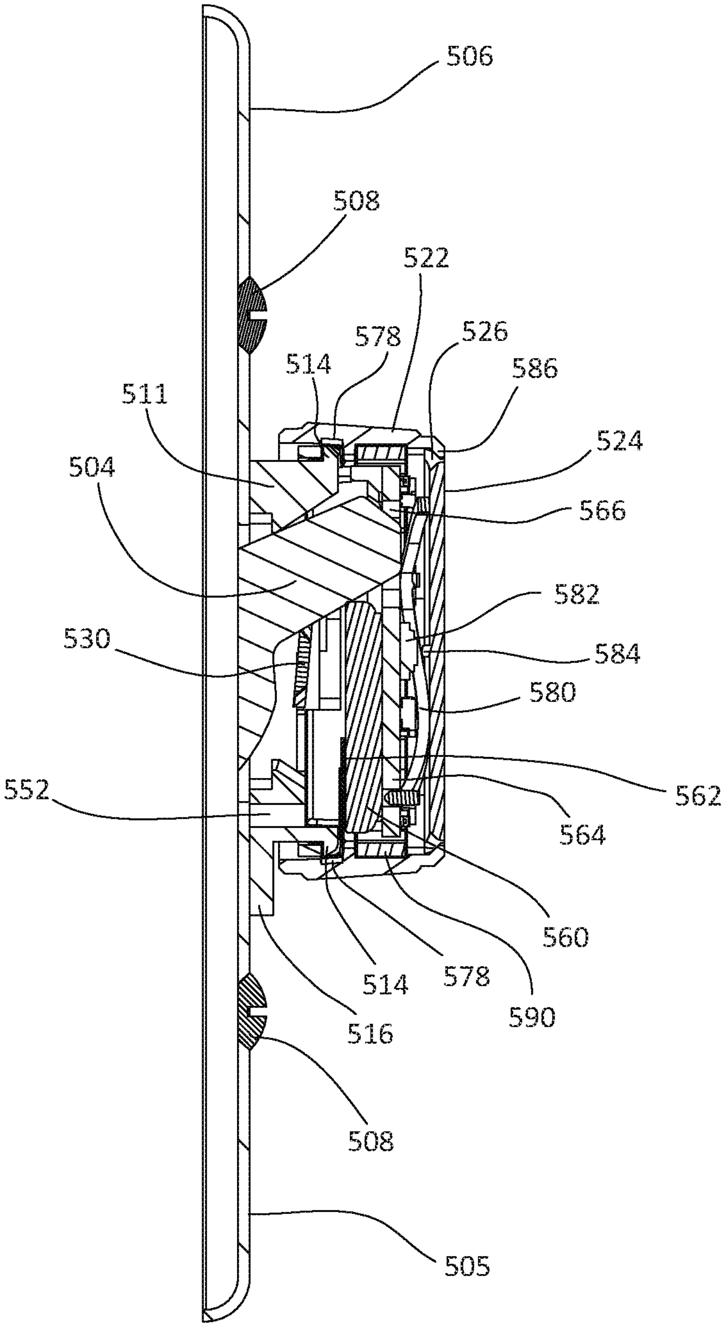
FIG. 33 is a right-facing section view of the example retrofit remote control device illustrated in FIG. 25.

The control unit 520 may be detached from the mounting assembly 510 (e.g., as shown in FIG. 29), for instance to access one or more batteries 560 that may be used to power the control unit 520. For example, the control unit 520 may include a single battery 560 as shown in FIG. 28. As shown in FIG. 33, for example, the control unit 520 may be configured such that the battery 560 is located in space within the control unit 520 that is not occupied by the toggle actuator 504. The control unit 520 may include a battery retention strap 562 that may be configured to hold the battery 560 in place between the battery retention strap 562 and a printed circuit board (PCB) 564 of the control unit 520. The battery retention strap 562 may be configured to operate as a first electrical contact for the battery 560. A second electrical contact may be located on a rear-facing surface of the PCB 564. In an example of removing the battery 560 from the control unit 520, the control unit 520 may be detached from the mounting assembly 510, for instance as described herein, and the battery 560 may be slid out from between the battery retention strap 562 and the PCB 564. The PCB 564 may define an actuator opening 566 that extends therethrough and that may be configured to receive at least a portion of the toggle actuator 504 of the light switch 502 when the control unit 520 is mounted to the mounting assembly 510.

Figure 31:
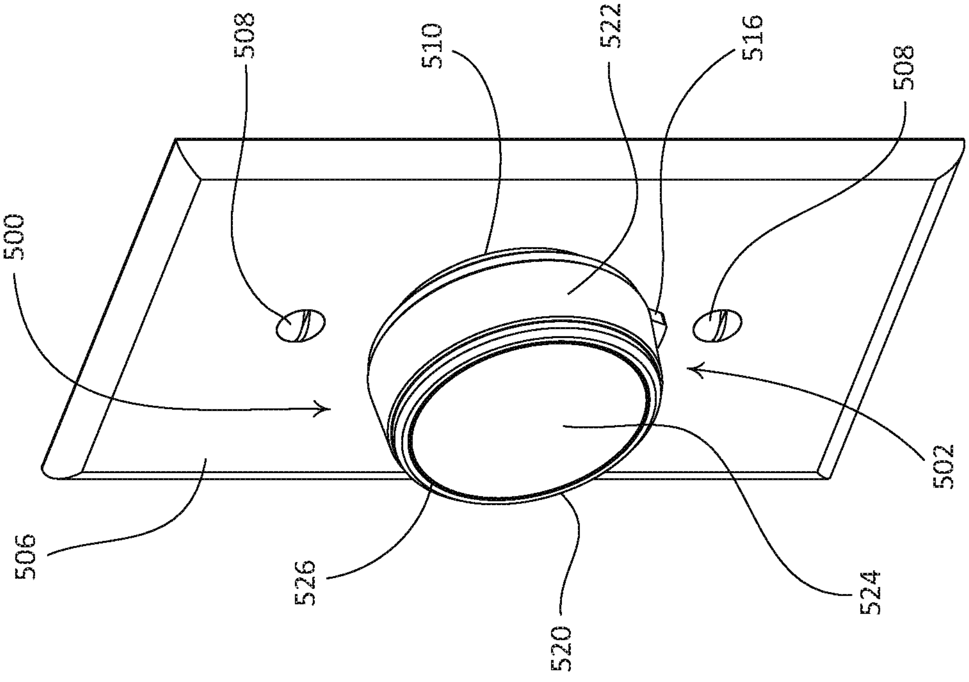
FIG. 31 is a front perspective view of the example retrofit remote control device illustrated in FIG. 25, with the example retrofit remote control device mounted over the switch actuator of an installed light switch.

When the control unit 520 is attached to the mounting assembly 510 (e.g., as shown in FIG. 31), the rotating portion 522 may be rotatable in opposed directions about the mounting assembly 510. The mounting assembly 510 may be configured to be mounted over the toggle actuator 504 of the light switch 502 such that the application of rotational movement to the rotating portion 522 does not actuate the toggle actuator 504. The control unit 520 may include an actuation portion 524, which may be operated separately from or in concert with the rotating portion 522. As shown, the actuation portion 524 may include a circular surface within an opening 570 defined by the rotating portion 522. In an example implementation, the actuation portion 524 may be configured to move inward toward the light switch 502 to actuate a mechanical switch located inside the control unit 520, for instance as described herein. The actuation portion 524 may be configured to return to an idle or rest position (e.g., as shown in FIG. 31) after being actuated. In this regard, the actuation portion 524 may be configured to operate as a toggle control of the control unit 520.

The remote control device 500 may be configured to transmit one or more wireless communication signals (e.g., RF signals 108) to one or more control devices (e.g., the control devices of the load control system 100, such as the controllable light source 110). The remote control device 500 may include a wireless communication circuit, for example an RF transceiver or transmitter (not shown), via which one or more wireless communication signals may be sent and/or received. The control unit 520 may be configured to transmit digital messages (e.g., including commands) in response to one or more actuations applied to the control unit 520, such as operation of the rotating portion 522 and/or the actuation portion 524. The digital messages may be transmitted to one or more devices associated with the remote control device 500, such as the controllable light source 110. For example, the control unit 520 may be configured to transmit a command via one or more RF signals 108 to raise the intensity of the controllable light source 110 in response to a clockwise rotation of the rotating portion 522 and a command to lower the intensity of the controllable light source in response to a counterclockwise rotation of the rotating portion 522. The control unit 520 may be configured to transmit a command to toggle the controllable light source 110 (e.g., from off to on or vice versa) in response to an actuation of the actuation portion 524. In addition, the control unit 520 may be configured to transmit a command to turn the controllable light source 110 on in response to an actuation of the actuation portion 524 (e.g., if the control unit 520 knows that the controllable light source 110 is presently off). The control unit 520 may be configured to transmit a command to turn the controllable light source 110 off in response to an actuation of the actuation portion 524 (e.g., if the control unit 520 knows that the controllable light source 110 is presently on).

Figure 32:
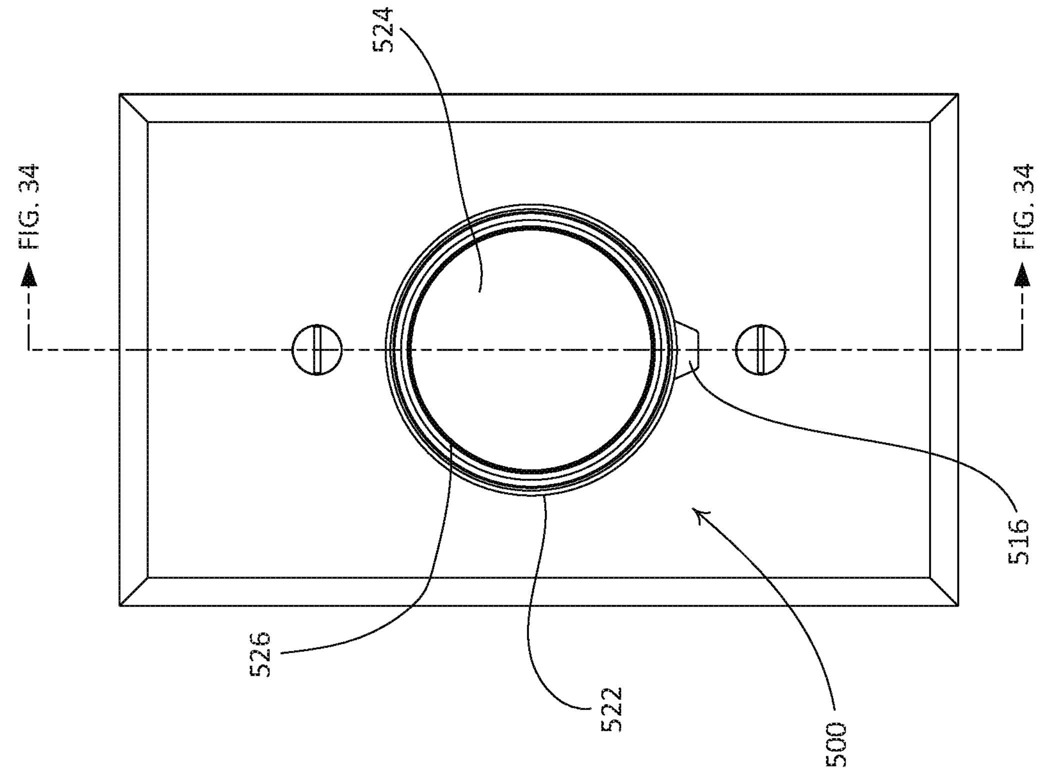
FIG. 32 is a front view of the example retrofit remote control device illustrated in FIG. 25, with the example retrofit remote control device mounted over the switch actuator of an installed light switch.

The control unit 520 may include a light bar 526. The light bar 526 may be located, for example, between the rotating portion 522 and the actuation portion 524. As shown, the light bar 526 may define a full circle geometry as shown in FIGS. 31 and 32. As shown, the light bar 526 may be attached to a periphery of the actuation portion 524, and may move with the actuation portion 524 when the actuation portion 524 is actuated. Alternatively, the light bar 526 may be attached to a periphery of the rotating portion 522. The remote control device 500 may provide feedback via the light bar 526, for instance while the rotating portion 522 is being rotated and/or after the remote control device 500 is actuated (e.g., the rotating portion 522 is rotated and/or the actuation portion 524 is actuated). The feedback may indicate, for example, that the remote control device 500 is transmitting one or more RF signals 108. To illustrate, the light bar 526 may be illuminated for a few seconds (e.g., 1-2 seconds) after the remote control device 500 is actuated, and then may be turned off (e.g., to conserve battery life). The light bar 526 may be illuminated to different intensities, for example depending on whether the rotating portion 522 is being rotated to raise or lower the intensity of the lighting load. The light bar 526 may be illuminated to provide feedback of an actual intensity of a lighting load being controlled by the remote control device 500 (e.g., the controllable light source 110).

The remote control device 500 may be configured to detect a low battery condition and provide an indication of the condition such that a user may be alerted to replace the battery 560. For example, the remote control device 500 may be configured to provide an indication of a low-battery condition in a similar manner as the remote control device 200 discussed herein (e.g., as shown in FIGS. 11 and 12).

Figure 34:
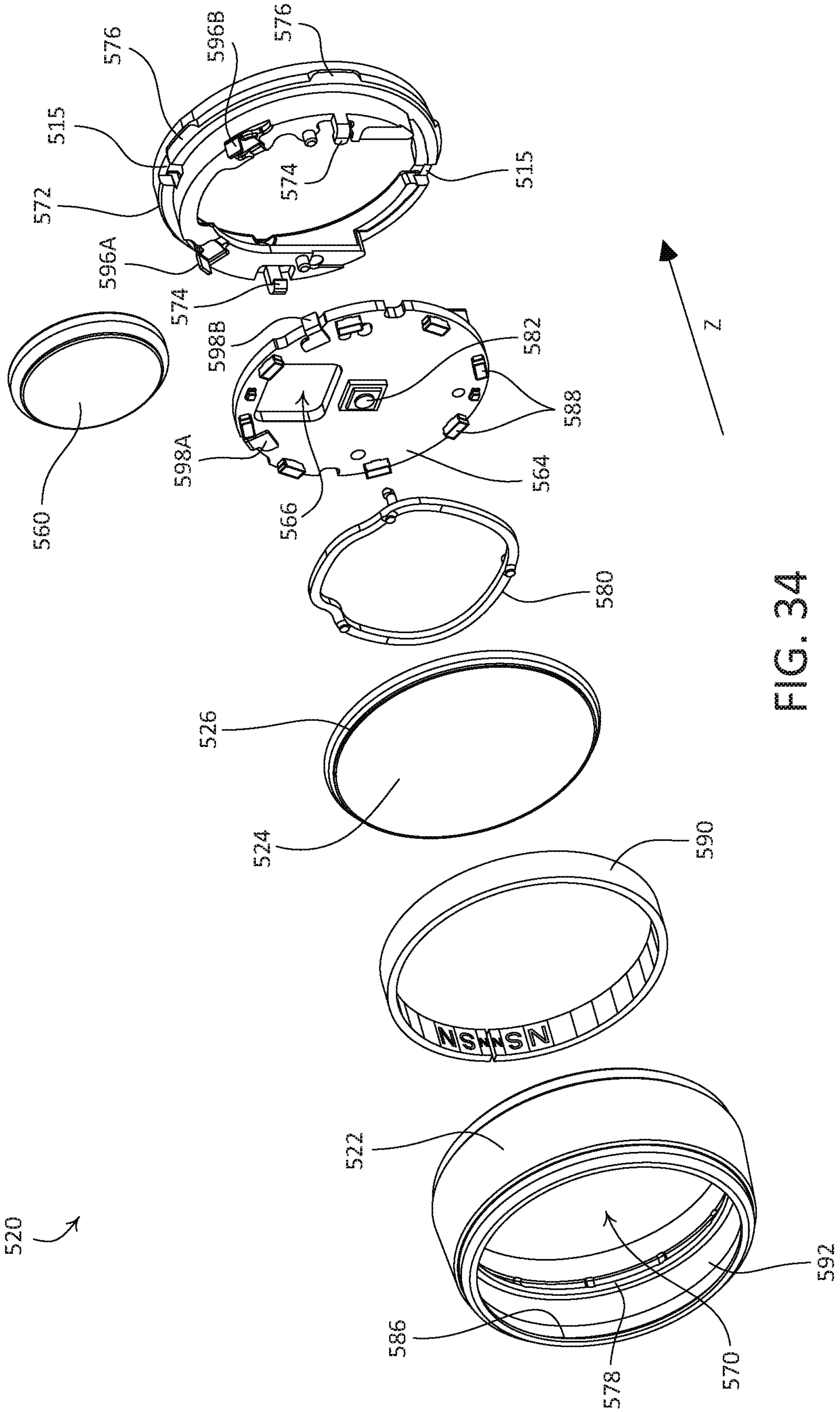
FIG. 34 is a front-facing exploded view of the control unit of the example retrofit remote control device illustrated in FIG. 25.
Figure 35:
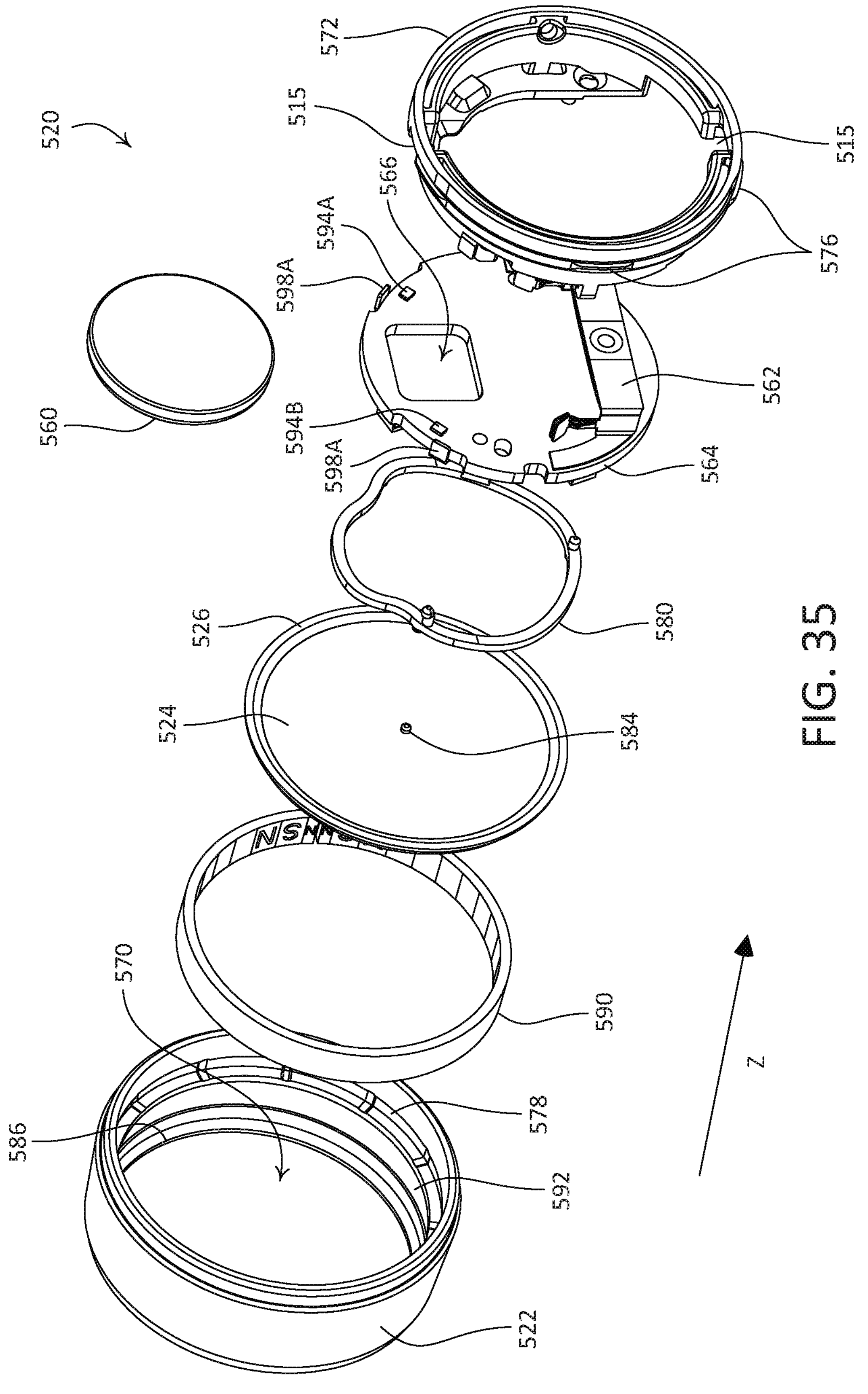
FIG. 35 is a rear-facing exploded view of the control unit of the example retrofit remote control device illustrated in FIG. 25.

As shown in FIGS. 34 and 35, the light bar 526 may be attached to the actuation portion 524 around a periphery of the actuation portion 524. The actuation portion 524 may be received within the opening 570 of the rotating portion 522 and may float freely in the opening 570. When the actuation portion 524 is received within the opening 570 of the rotating portion 522, the light bar 526 may be located between the actuation portion 524 and the rotating portion 522 such that the light bar 526 is visible to a user of the remote control device 500.

The PCB 564 may include a mechanical tactile switch 582 that may be mounted to a front-facing surface of the PCB 564. Control circuitry of the control unit 520 may be mounted to the PCB 564, for example to the one or both of the front-facing and rear-facing surfaces. As shown, the control unit 520 may include a plurality of light-emitting diodes (LEDs) 588 arranged around a perimeter of the PCB 564. The LEDs 588 may be configured to illuminate the light bar 526.

The control unit 520 may include an attachment portion 572 that is configured to carry one or more components of the control unit 520, such as the PCB 564. For example, as shown the PCB 564 may be attached to the attachment portion 572 via snap-fit connectors 574. The attachment portion 572 may include a plurality of tabs 576 arranged around a circumference of the attachment portion 572. The tabs 576 may be configured to be received within corresponding channels 578 defined by the rotating portion 522, to thereby couple the rotating portion 522 to the attachment portion 572 and allow for rotation of the rotating portion 522 around the attachment portion 572. As shown, the attachment portion 572 may define the recesses 515. When the control unit 520 is connected to the mounting assembly 510, the snap-fit connectors 514 of the mounting assembly 510 may be received in the recesses 515 of the attachment portion 572. The attachment portion 572 and the PCB 564 may remain fixed in position relative to the mounting assembly 510 as the rotating portion 522 is rotated around the attachment portion 572. When the control unit 520 is attached to the mounting assembly 510, a portion of the toggle actuator 504 of the light switch 502 may be received in the actuator opening 566 of the PCB 564, such that the rotating portion 522 rotates about the toggle actuator 504 when operated.

The control unit 520 may include a resilient return spring 580 that may be located between the actuation portion 524 and the PCB 564. The return spring 580 may be configured to be attached to the PCB 564. As shown in FIG. 35, the actuation portion 524 may define a projection 584 that extends rearward from an inner surface of the actuation portion 524. When a force is applied to the actuation portion 524 (e.g., when the actuation portion 524 is pressed by a user of the remote control device 500), the actuation portion 524, and thus the light bar 526, may move in the direction Z until the projection 584 actuates the mechanical tactile switch 582. The return spring 580 may compress under application of the force. When application of the force is ceased (e.g., the user no longer presses the actuation portion 524), the return spring 580 may decompress, thereby to biasing the actuation portion 524 forward such that the actuation portion 524 abuts a rim 586 of the rotating portion 522. In this regard, the return spring 580 may operate to return the actuation portion 524 from an activated (e.g., pressed) position to a rest position.

The control unit 520 may include a magnetic strip 590 that may be disposed along an inner surface 592 of the rotating portion 522. The magnetic strip 590 may extend around an inner circumference of the rotating portion 522. The control unit 520 may include one or more rotational sensors 594A, 594B that may be mounted on the PCB 564. For example, the rotational sensors 594A, 594B may each comprise a Hall effect sensor integrated circuit. The magnetic strip 590 may include a plurality of alternating positive and negative sections, and the rotational sensors 594A, 594B may be operable to detect passing of the positive and negative sections of the magnetic strip 590 as the rotating portion 522 is rotated about the attachment portion 572. The control circuit of the control unit 520 may be configured to determine a rotational speed and/or direction of rotation of the rotating portion 522 in response to the rotational sensors 594A, 594B. Each rotational sensor 594A, 594B may be located adjacent to one or more magnetic flux pipe structures 596A, 596B, 598A, 598B. Each magnetic flux pipe structure 596A, 596B, 598A, 598B may be configured to conduct and direct respective magnetic fields generated by the magnetic strip 590 toward corresponding rotational sensors 594A, 594B. As shown, the magnetic flux pipe structures 596A, 596B may be connected to the attachment portion 572 and the magnetic flux pipe structures 598A, 598B may be mounted to the PCB 564.

FIGS. 36-46 depict another example remote control device 600 (e.g., a battery-powered rotary remote control device) that may be deployed, for example, as the remote control device 120 of the load control system 100 shown in FIG. 1. The remote control device 600 may be configured to be mounted over a toggle actuator of a standard light switch (e.g., the toggle actuator 106 of the SPST maintained mechanical switch 104 shown in FIG. 1). For example, as shown the remote control device 600 may be installed over the toggle actuator 604 of an installed light switch 602 without removing a faceplate 606 that is mounted to the light switch 602 (e.g., via faceplate screws 608). As shown, the faceplate 606 defines an outer surface 605. The outer surface 605 may alternatively be referred to as a front surface of the faceplate 606.

Figure 37:
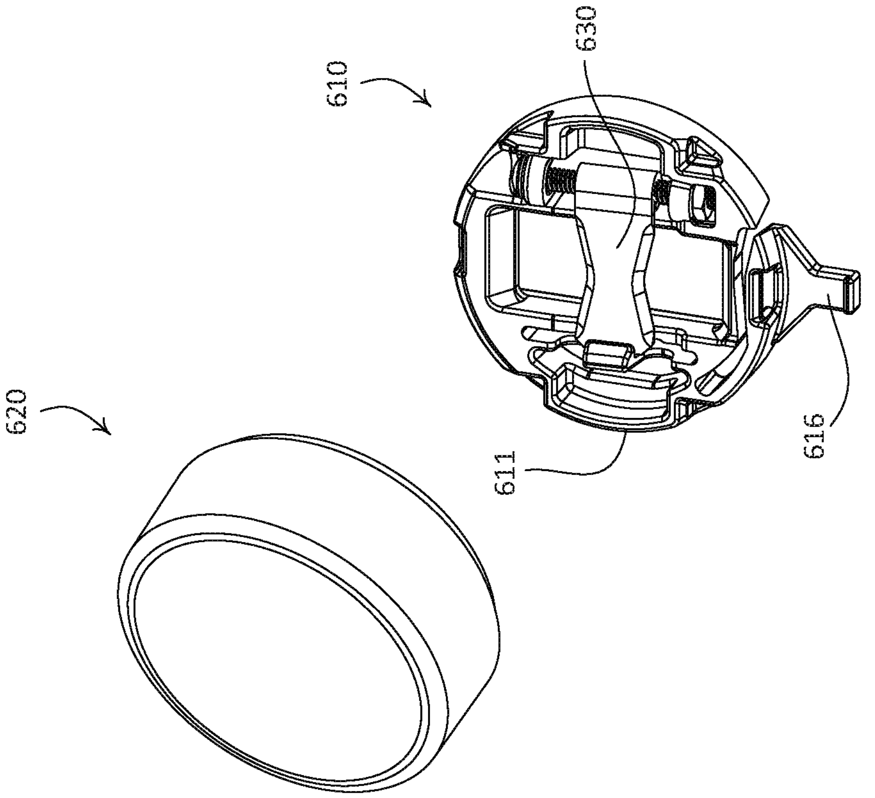
FIG. 37 is a front perspective view of the example retrofit remote control device illustrated in FIG. 36, with the control unit detached from the mounting assembly.
Figure 40:
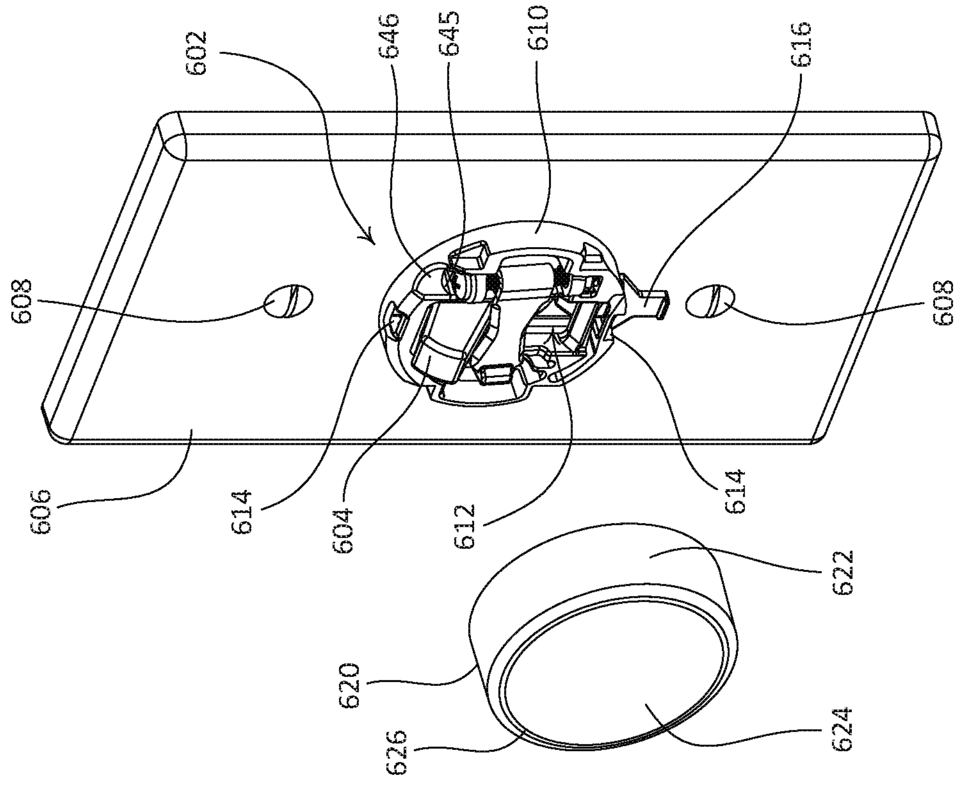
FIG. 40 is a front perspective view of the example retrofit remote control device illustrated in FIG. 36, with the mounting assembly mounted over the switch actuator of an installed light switch, and with the control unit detached from the mounting assembly.
Figure 42:
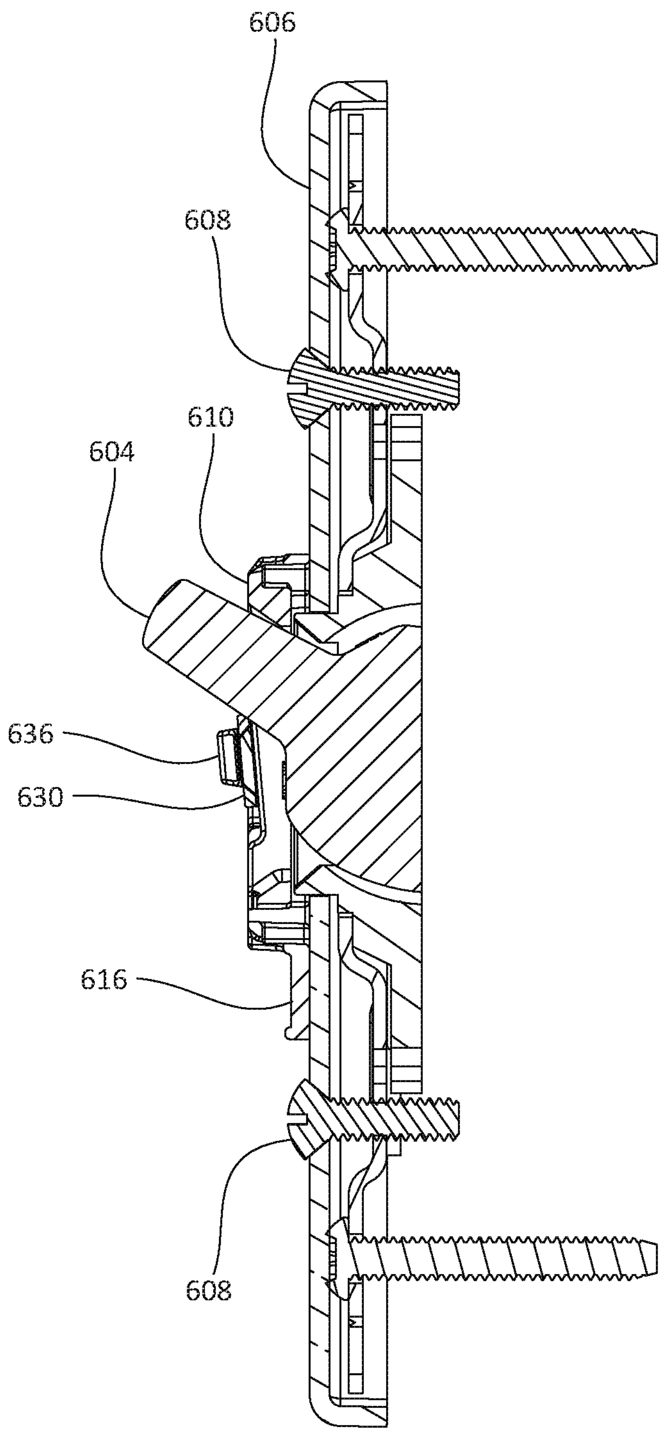
FIG. 42 is a left-facing section view of the example retrofit remote control device illustrated in FIG. 36, with the control unit (not shown) detached from the mounting assembly.

The remote control device 600 may include a mounting assembly 610 and a control unit 620 that may be attached to the mounting assembly 610. The mounting assembly 610 may be more generally referred to as a base portion of the remote control device 600. The control unit 620 may include a rotating portion that is rotatable with respect to the mounting assembly 610. For example, as shown, the control unit 620 may include an annular rotating portion 622 that is configured to be rotatable relative to the mounting assembly 610 when the control unit 620 is attached to the mounting assembly 610. The remote control device 600 may be configured such that the control unit 620 and the mounting assembly 610 are removably attachable to one another. FIGS. 37 and 40 depict the remote control device 600 with the control unit 620 detached from the mounting assembly 610.

The mounting assembly 610 may be configured to be fixedly attached to the actuator of a mechanical switch, such as the toggle actuator 604 of the light switch 602, and may be configured to maintain the actuator in a current position, such as in the on position. For example, as shown the mounting assembly 610 may include a base 611 that defines a toggle actuator opening 612 that extends therethrough and that is configured to receive at least a portion of the toggle actuator 604. As shown, the toggle actuator opening 612 may be defined by an elongated slot 618 that extends through the base 611. The slot 618 may define a first end 617 and an opposed second end 619. The first and second ends 617, 619 of the slot 618 may be configured to slide along corresponding sides of the toggle actuator 604 of the light switch 602, or may be configured with respective edges that are configured to bite into corresponding sides of the toggle actuator 604.

The remote control device 600 may be configured to enable releasable attachment of the control unit 620 to the mounting assembly 610. The mounting assembly 610 may include one or more engagement features that are configured to engage with complementary engagement features of the control unit 620. For example, as shown the control unit 620 may include resilient snap-fit connectors 615, and the base 611 of the mounting assembly 610 may define corresponding recesses 614 that are configured to receive the snap-fit connectors 615. The mounting assembly 610 may include a release mechanism that is operable to cause the control unit 620 to be released from an attached position relative to the mounting assembly 610. As shown, the base 611 of the mounting assembly 610 may include a release tab 616 that may be actuated (e.g., pushed) to release the control unit 620 from the mounting assembly 610.

As shown, the release tab 616 may be connected to the base 611 of the mounting assembly 610 via a resilient, cantilevered spring arm 650, such that a gap 652 is defined between the base 611 and the spring arm 650. In operation, when the release tab 616 is pressed up toward the base 611, the spring arm 650 may deflect into the gap 652, allowing the lowermost recess 614 adjacent to the release tab 616 to disengage from the corresponding lower snap-fit connector 615 of the control unit 620, such that the control unit 620 may be released from the mounting assembly 610. When the control unit 620 is attached to the mounting assembly 610, the uppermost snap-fit connector 615 may first be positioned in the corresponding upper recess 614 of the mounting assembly 610. The lower portion of the control unit 620 may then be pressed toward the base 611, such that the spring arm 650 deflects into the gap 652 until the lower snap-fit connector 615 is received into the lower recess 614 of the mounting assembly 610, at which point the spring arm 650 may resiliently return to a rest position (e.g., as shown in FIGS. 40 and 41).

Figure 41:
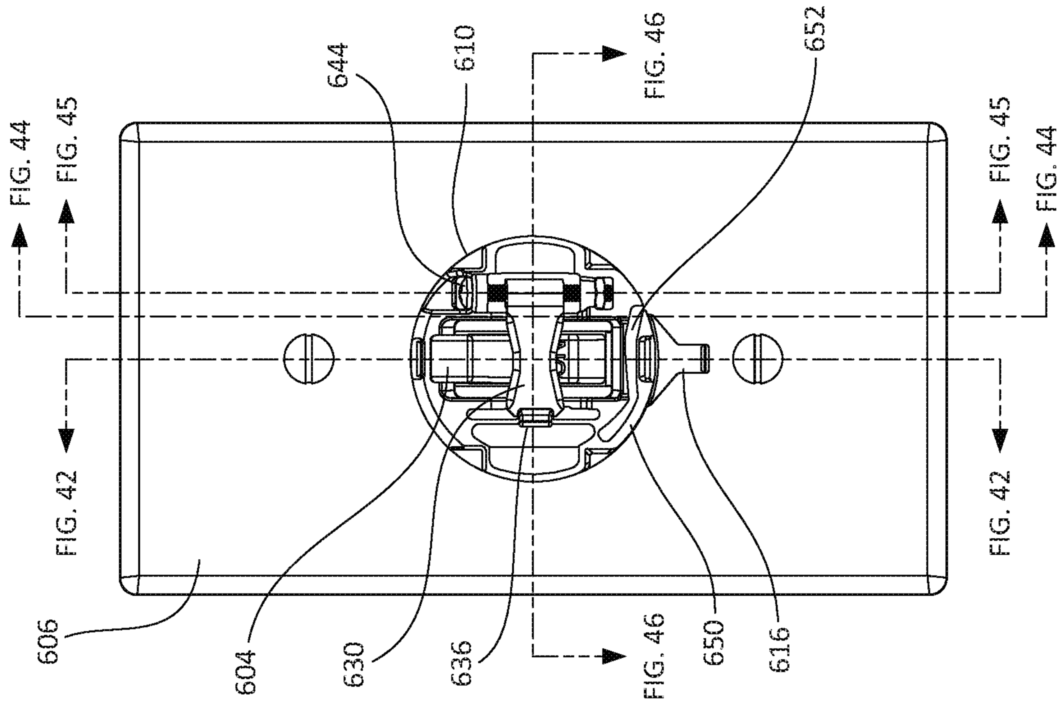
FIG. 41 is a front view of the example retrofit remote control device illustrated in FIG. 36, with the control unit (not shown) detached from the mounting assembly.

The mounting assembly 610 may be mounted to the toggle actuator 604 of the light switch 602 when the toggle actuator is in an up position (e.g., a "switched up" position as shown in FIGS. 40 and 41), or alternatively may be mounted to the toggle actuator 604 when the toggle actuator 604 is in a down position (e.g., a "switched down" position that is opposite the position of the toggle actuator 604 shown in FIGS. 40 and 41). To illustrate, in an example installation in which a single remote control device 600 is installed over a single-pole switch, the up position of the toggle actuator typically corresponds to "on" such that power is delivered to a connected electrical load but the down position of the toggle actuator may correspond to "on" (e.g., if the switch is incorrectly installed upside down). In another example installation in which a single remote control device 600 is installed over a 3-way switch, either the up or down position of the toggle actuator may correspond to "on" such that power is delivered to the electrical load (e.g., depending on how the installation is wired). In still another example installation in which two remote control devices 600 are installed over respective 3-way switches, the up position of the toggle actuator may correspond to "on" for the first 3-way switch of the installation and the down position of the toggle actuator may correspond to "on" for the second 3-way switch of the installation (e.g., depending on how the installation is wired).

The mounting assembly 610 may include an engagement mechanism that is configured to engage the toggle actuator 604, for example when the toggle actuator 604 is received in the toggle actuator opening 612. The engagement mechanism may be configured to engage the toggle actuator 604 such that the mounting assembly 610 is secured in position relative to the toggle actuator 604. For example, as shown the engagement mechanism may include a bar 630. The bar 630 may be operably coupled to the base 611, and may be configured to be moveable, for instance translatable, relative to the base 611. The bar 630 may be configured to be translated within the toggle actuator opening 612 such that the bar 630 engages with the toggle actuator 604, thereby fixedly attaching the mounting assembly 610 in position relative to the toggle actuator 604 of the light switch 602 when the toggle actuator 604 is in the up position or the down position. As shown, the bar 630 may extend across the toggle actuator opening 612 (e.g., across the slot 618) of the base 611, such that the base 611 defines a first opening 612A to receive the toggle actuator 604 when the toggle actuator 604 is in the up position and a second opening 612B to receive the toggle actuator 604 when the toggle actuator 604 is in the down position. In accordance with the illustrated orientation of the mounting assembly 610, the first opening 612A may be referred to as an upper opening of the base 611 and the second opening 612B may be referred to as a lower opening of the base 611.

The illustrated bar 630 defines a first end 632 and an opposed second end 638. The first end 632 of the bar 630 may be configured to slide within a channel 634 defined by the base 611. The base 611 may define a flange 636 that is configured to retain the first end 632 of the bar 630 in the channel 634. As shown, the flange 636 may be configured as a snap-fit connector. The second end 638 of the bar 630 may define a threaded sleeve 639 that is configured to receive a screw 640. The base 611 may be configured to capture the screw 640 such that the screw 640 is freely rotatable relative to the base 611. For example, the base 611 may define a first collar 642 that retains a first non-treaded portion of a shaft of the screw 640, a recess 645 that is configured to capture a head 644 of the screw 640, and a second collar 643 that is configured to capture a nut 641 treaded onto the tip portion of the screw 640. In this regard, the base 611 may be configured to support opposed ends of the screw 640 such that the screw 640 may be rotated relative to the base 611 without causing translation of the screw 640 relative to the base 611.

Figure 46:
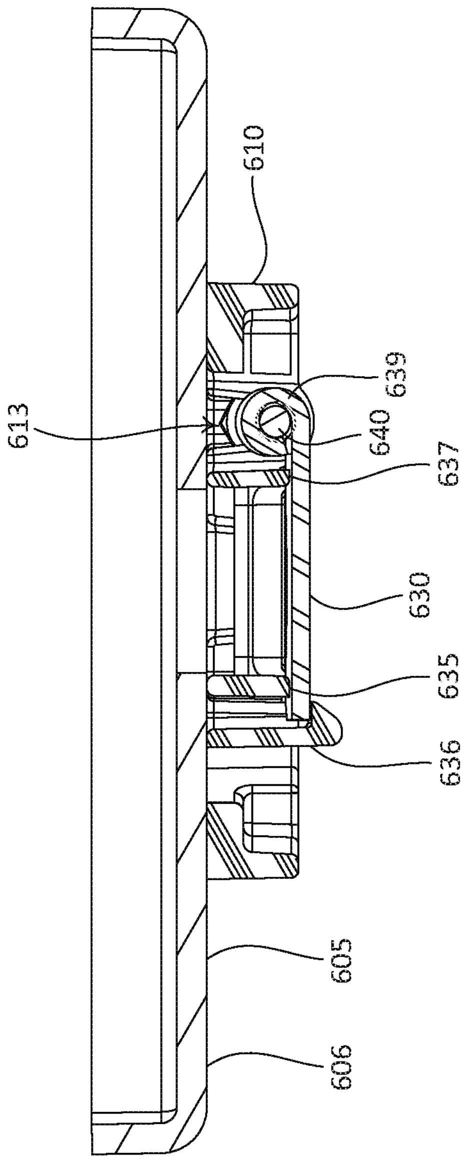
FIG. 46 is a downward-facing section view of the example retrofit remote control device illustrated in FIG. 36, with the control unit (not shown) detached from the mounting assembly.

The base 611 may be configured to receive a subassembly that includes the bar 630, the screw 640, and the nut 641. For example, the base 611 may define an opening 613 that extends therethrough. As shown, the opening 613 may be located adjacent to the toggle actuator opening 612, between the first and second collars 642, 643. The mounting assembly 610 may be assembled by passing the first end 632 of the bar 630 through the opening 613 from the rear side of the base 611 until the screw 640 and nut 641 are received in the first and second collars 642, 643, respectively. The bar 630 may then be pivoted about the second end 638 until the first end 632 snaps into place behind the snap-fit connector of the flange 636 (e.g., as shown in FIG. 46). The base 611 may define one or more surfaces along which the bar 630 may translate when the screw 640 is rotated. For example, as shown the base may define a first rail 635 that extends along a first side of the toggle actuator opening 612. The first rail 635 may at least partially define the channel 634. The base 611 may further define a second rail 637 that extends along an opposed second side of the toggle actuator opening 612.

As shown, the base 611 may define a recess 646 that is configured to allow a tool, such as a screwdriver, to access the head 644 of the screw 640 to rotate the screw 640. As shown, the base 611 may be configured to support the screw 640 such that the screw 640 is angled slightly with respect to the outer surface 605 of the faceplate 606 (e.g., approximately 5°). Stated differently, the base 611 may support the screw 640 such that an axis of rotation of the screw 640 is angularly offset relative to a plane defined by the outer surface 605 of the faceplate 606 of the light switch 602. This may make it easier for a user to access the head 644 of the screw with a screwdriver. Alternatively, the base 611 may be configured to support the screw 640 such that the screw 640 is parallel or substantially parallel with respect to the outer surface 605 of the faceplate 606. Stated differently, the base 611 may support the screw 640 such that the axis of rotation of the screw 640 is parallel relative to a plane defined by the outer surface 605 of the faceplate 606 of the light switch 602.

Rotating the screw 640 in a first direction (e.g., clockwise) may cause the bar 630 to translate upward along the screw 640 toward the first end 617 of the slot 618 such that the bar 630 contacts a first side 601 of the toggle actuator 604 of the light switch 602, for instance when the toggle actuator 604 is in the up position. Rotating the screw 640 in a second direction (e.g., counter-clockwise) may cause the bar 630 to translate downward along the screw 640 toward the second end 619 of the slot 618 such that the bar 630 contacts an opposed second side 603 of the toggle actuator 604, for instance when the toggle actuator 604 is in the down position. The blade may slide along one or both of the first and second rails 635, 637 when the screw 640 is rotated.

The bar 630 may be configured to mechanically grip the toggle actuator 604. For example, as shown, the bar 630 may define an upper edge 648 that faces the first end 617 of the slot 618 and that is configured to bite into a corresponding lower surface of the toggle actuator 604 when the toggle actuator 604 is in the up position, and may define a lower edge 649 that faces the second end 619 of the slot 618 and that is configured to bite into a corresponding upper surface of the toggle actuator 604 when the toggle actuator 604 is in the down position. Because the mounting assembly 610 is configured to engage with opposed upper and lower surfaces of the toggle actuator 604, adjustment of the mounting assembly 610 in a lateral (e.g., side-to-side) direction relative to the toggle actuator 604 may be possible when securing the mounting assembly 610 to the toggle actuator 604. For example, as shown the upper and lower edges 648, 649 of the bar 630 may be beveled inward from the opposed ends first and second 632, 638 of the bar 630, such that the upper and lower edges 648, 649 may cause the mounting assembly 610 to laterally self-center on the toggle actuator 604 of the light switch 602 as the bar 630 makes contact with the toggle actuator 604. The bar 630 may be made of any suitable material, such as metal.

Figure 43:
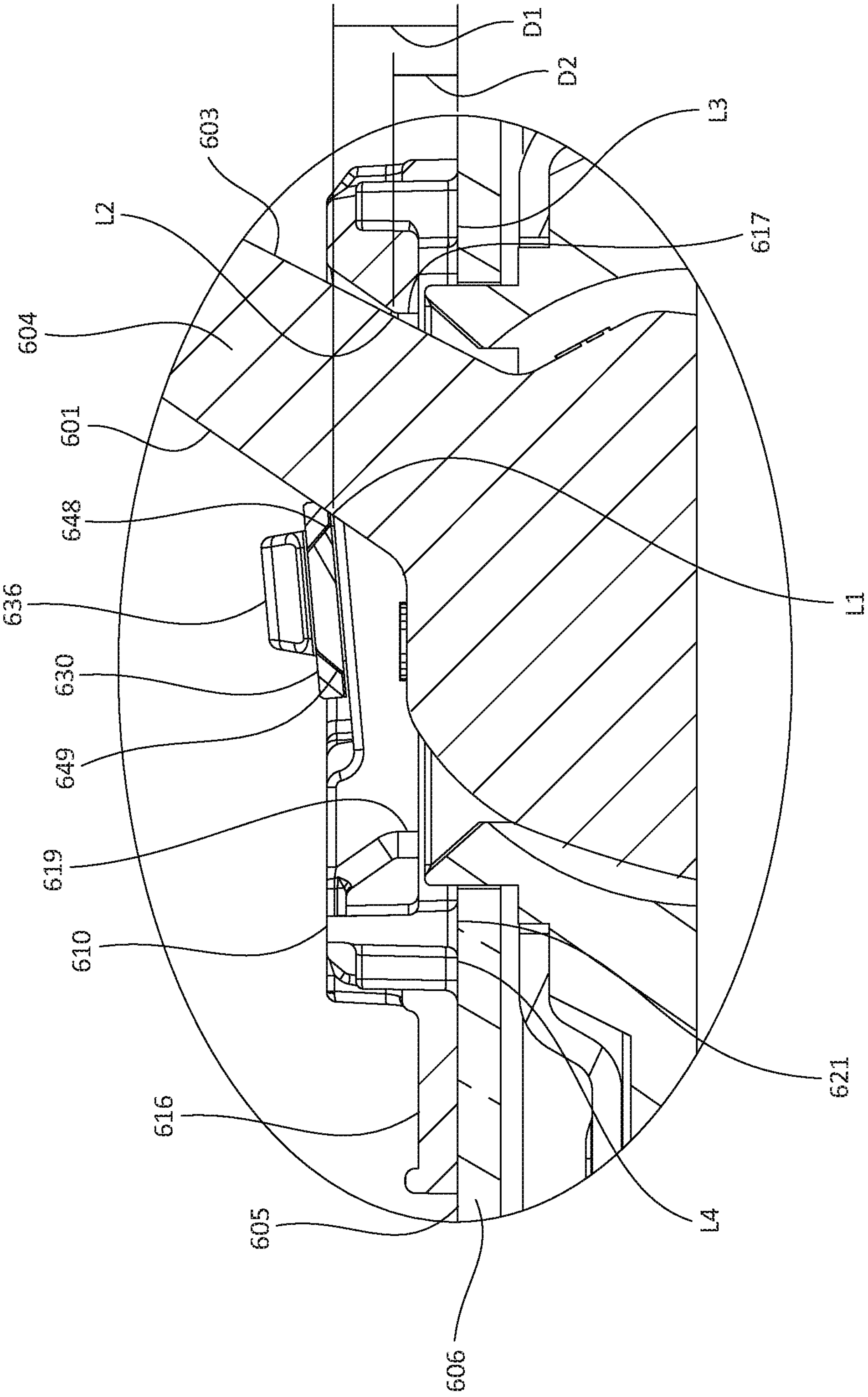
FIG. 43 is an enlarged portion of the section view depicted in FIG. 42, illustrating interaction between the mounting assembly, the switch actuator of the installed light switch, and the faceplate of the installed light switch.
Figure 44:
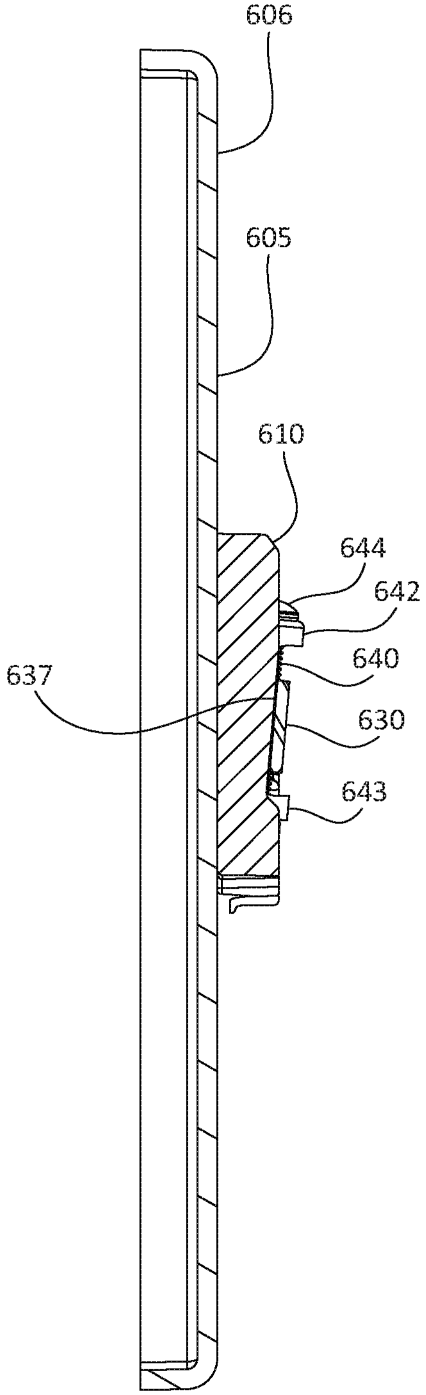
FIG. 44 is a right-facing section view of the example retrofit remote control device illustrated in FIG. 36, with the control unit (not shown) detached from the mounting assembly.
Figure 45:
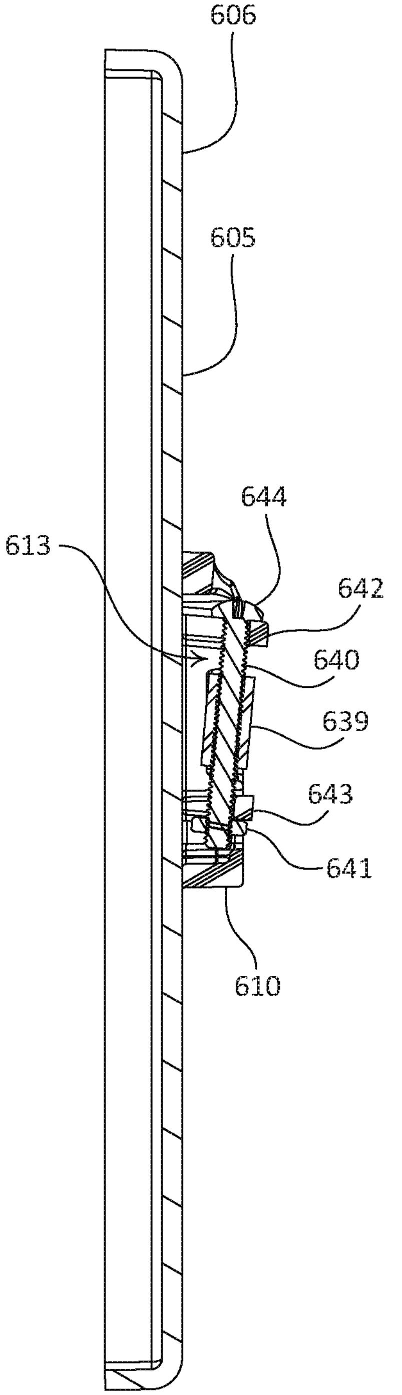
FIG. 45 is a right-facing section view of the example retrofit remote control device illustrated in FIG. 36, with the control unit (not shown) detached from the mounting assembly.

When the bar 630 is contacting (e.g., gripping) the toggle actuator 604 of the light switch 602 in either the up position or the down position, the base 611, and thus the mounting assembly 610, may be secured in a fixed position relative to the toggle actuator 604, and the toggle actuator 604 may be prevented from being switched to the off position. In this regard, a user of the remote control device 600 may be unable to inadvertently switch the light switch 602 off when the remote control device 600 is mounted over the light switch 602. For example, as shown in FIG. 43, as the bar 630 is translated toward the toggle actuator 604, the upper edge 648 of the bar 630 may contact the first side 601 of the toggle actuator 604 near a first location L1. As the bar 630 biases against the first side 601 of the toggle actuator 604, the second side 603 of the toggle actuator 604 may make contact with and bias against the base 611 at the first end 617 of the slot 618 near a second location L2. Engagement of the bar 630 with the toggle actuator 604 and of the toggle actuator 604 with the base 611 may secure the mounting assembly 610 in a mounted position relative to the toggle actuator 604, and may maintain the toggle actuator 604 in the "on" position.

As shown, the first location L1 may be spaced from the outer surface 605 of the faceplate 606 through a first distance D1, and the second location L2 may be spaced from the outer surface 605 of the faceplate 606 through a second distance D1 that is shorter than the first distance D1. This may create a moment about the toggle actuator 604 that may cause a lower surface 621 of the base 611 to be biased against the outer surface 605 of the faceplate 606, for example near a third location L3, which may actively bias the toggle actuator 604 toward the "on" position, thereby contributing to maintaining the toggle actuator 604 in the "on" position, and/or may cause the base 611 to lie flush against the outer surface 605 of the faceplate 606. Additionally, engagement of the upper edge 648 of the bar 630 with the toggle actuator 604 (e.g., the bar 630 biting into the toggle actuator 604) may cause the lower surface 621 of the base 611 to be biased against the outer surface 605 of the faceplate 606, for example near a fourth location L4, which may in turn contribute to causing the base 611 to lie flush against the outer surface 605 of the faceplate 606.

Figure 39:
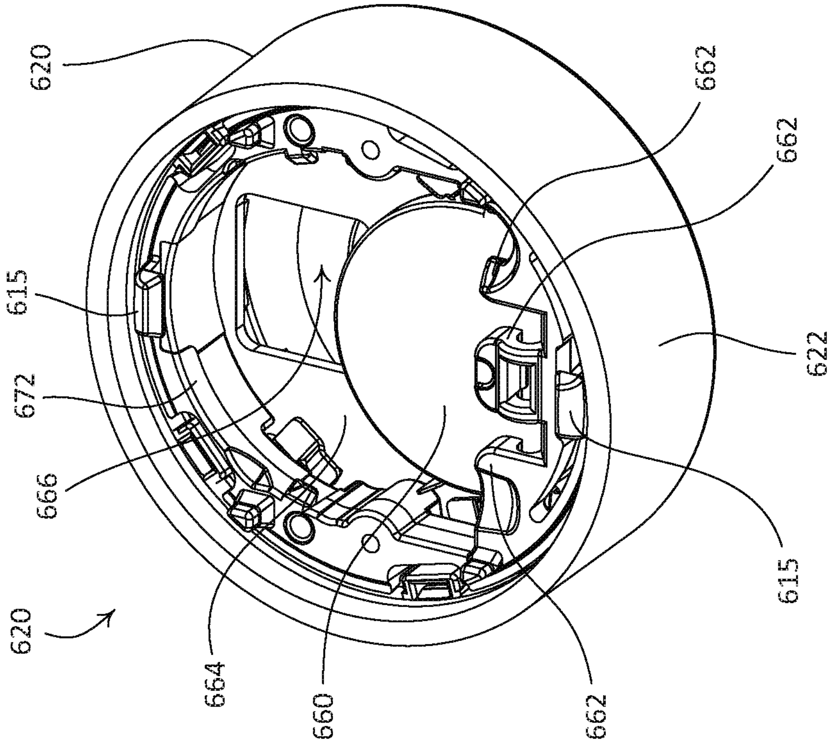
FIG. 39 is a rear perspective view of the control unit of the example retrofit remote control device illustrated in FIG. 36.
Figure 38:
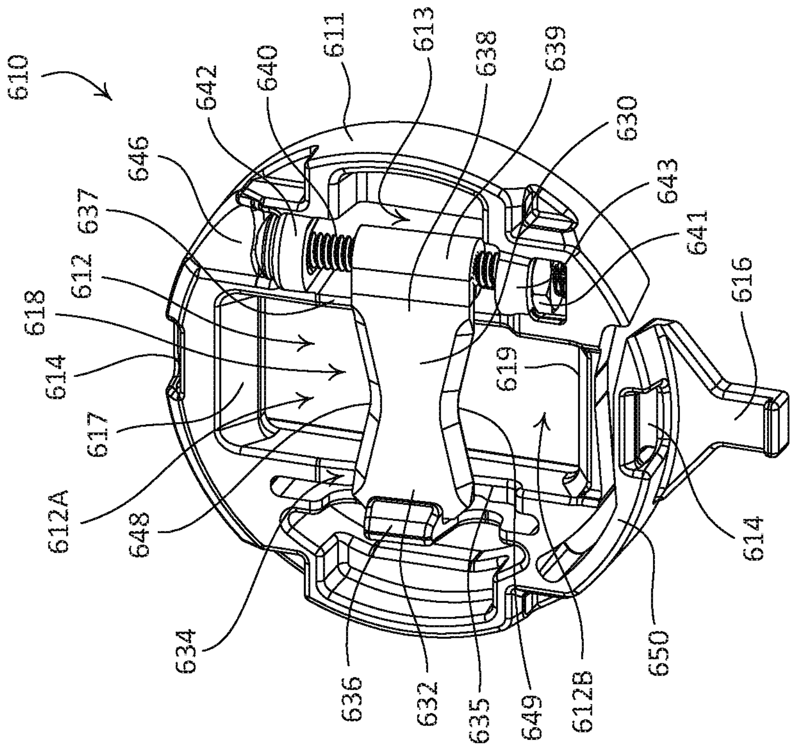
FIG. 38 is a front perspective view of the mounting assembly of the example retrofit remote control device illustrated in FIG. 36.

The control unit 620 may be detached from the mounting assembly 610 (e.g., as shown in FIG. 40), for instance to access one or more batteries 660 that may be used to power the control unit 620. For example, the control unit 620 may include a single battery 660 as shown in FIG. 39. As shown in FIG. 39, for example, the control unit 620 may be configured such that the battery 660 is located in space within the control unit 620 that is not occupied by the toggle actuator 604. The control unit 620 may include one or more battery retention members 662 that may be configured to hold the battery 660 in place between the one or more battery retention members 662 and a printed circuit board (PCB) 664 of the control unit 620. In an example of removing the battery 660 from the control unit 620, the control unit 620 may be detached from the mounting assembly 610, for instance as described herein, and the battery 660 may be slid out from between the battery retention members 662 and the PCB 664. The PCB 664 may define an actuator opening 666 that extends therethrough and that may be configured to receive at least a portion of the toggle actuator 604 of the light switch 602 when the control unit 620 is mounted to the mounting assembly 610.

Figure 36:
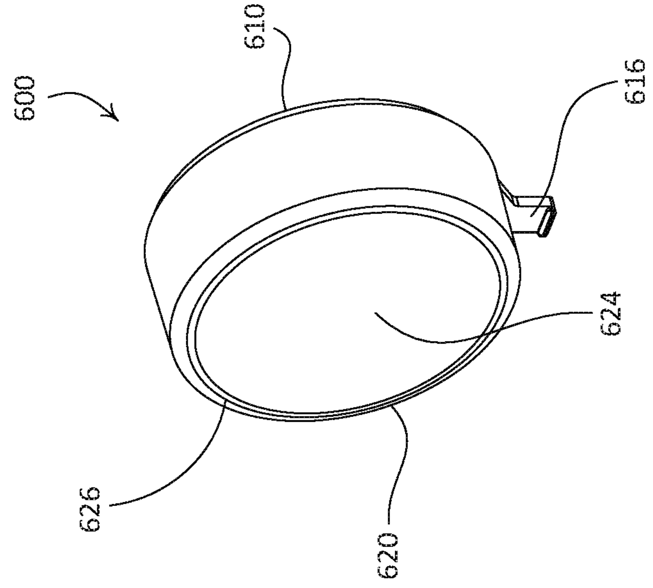
FIG. 36 is a front perspective view of another example retrofit remote control device that includes a control unit component and a mounting assembly component.

When the control unit 620 is attached to the mounting assembly 610 (e.g., as shown in FIG. 36), the rotating portion 622 may be rotatable in opposed directions about the mounting assembly 610. The mounting assembly 610 may be configured to be mounted over the toggle actuator 604 of the light switch 602 such that the application of rotational movement to the rotating portion 622 does not actuate the toggle actuator 604. The control unit 620 may include an actuation portion 624, which may be operated separately from or in concert with the rotating portion 622. The control unit 620 may be configured such that the actuation portion 624 operates similarly, for example, to the actuation portion 524 of the control unit 520.

The remote control device 600 may be configured to transmit one or more wireless communication signals (e.g., RF signals 108) to one or more control devices (e.g., the control devices of the load control system 100, such as the controllable light source 110). The remote control device 600 may include a wireless communication circuit, for example an RF transceiver or transmitter (not shown), via which one or more wireless communication signals may be sent and/or received. The control unit 620 may be configured to transmit digital messages (e.g., including commands) in response to one or more actuations applied to the control unit 620, such as operation of the rotating portion 622 and/or the actuation portion 624. The digital messages may be transmitted to one or more devices associated with the remote control device 600, such as the controllable light source 110. For example, the control unit 620 may be configured to transmit a command via one or more RF signals 108 to raise the intensity of the controllable light source 110 in response to a clockwise rotation of the rotating portion 622 and a command to lower the intensity of the controllable light source in response to a counterclockwise rotation of the rotating portion 622. The control unit 620 may be configured to transmit a command to toggle the controllable light source 110 (e.g., from off to on or vice versa) in response to an actuation of the actuation portion 624. In addition, the control unit 620 may be configured to transmit a command to turn the controllable light source 110 on in response to an actuation of the actuation portion 624 (e.g., if the control unit 620 knows that the controllable light source 110 is presently off). The control unit 620 may be configured to transmit a command to turn the controllable light source 110 off in response to an actuation of the actuation portion 624 (e.g., if the control unit 620 knows that the controllable light source 110 is presently on).

It should be appreciated that various components of the control unit 620 that are not shown may be configured similarly, for example, to corresponding components of the control unit 520 (e.g., as shown in FIGS. 34 and 35), such that the control unit 620 may function as does the control unit 520. For example, the remote control device 600 may provide feedback via a light bar 626 of the control unit 620. The remote control device 600 may be configured to detect a low battery condition and provide an indication of the condition such that a user may be alerted to replace the battery 660, for example by providing an indication of a low-battery condition in a similar manner as the remote control device 200 discussed herein. The control unit 620 may include an attachment portion 672 that is configured to carry one or more components of the control unit 620, such as the PCB 664. The attachment portion 672 may be configured, for example, similarly to the attachment portion 572 of the control unit 520. For example, when the control unit 620 is attached to the mounting assembly 610, a portion of the toggle actuator 604 of the light switch 602 may be received in the actuator opening 666 of the PCB 664, such that the rotating portion 622 rotates about the toggle actuator 604 when operated.

FIGS. 47A-48B depict another example mounting assembly 710 that may be a component of another example remote control device (e.g., a battery-powered rotary remote control device) that may be deployed, for example, as the remote control device 120 of the load control system 100 shown in FIG. 1. The mounting assembly 710 may be more generally referred to as a base portion of such a remote control device. The mounting assembly 710 may be configured to be mounted over a toggle actuator of a standard light switch (e.g., the toggle actuator 106 of the SPST maintained mechanical switch 104 shown in FIG. 1). For example, as shown the mounting assembly 710 may be installed over the toggle actuator 704 of an installed light switch 702 without removing a faceplate 706 that is mounted to the light switch 702 (e.g., via faceplate screws 708).

The mounting assembly 710 may be configured to be fixedly attached to the actuator of a mechanical switch, such as the toggle actuator 704 of the light switch 702, and may be configured to maintain the actuator in the on position. For example, as shown the mounting assembly 710 may include a base 711 that defines a toggle actuator opening 712 that extends therethrough and that is configured to receive at least a portion of the toggle actuator 704. The base 711 may be configured to carry a screw 714 that, when driven inward, may advance into the toggle actuator opening 712 and abut the toggle actuator 704, thereby securing the base 711, and thus the mounting assembly 710, in a fixed position relative to the toggle actuator 704. With the mounting assembly 710 so fixed in position, the toggle actuator 704 may be prevented from being switched to the off position. As shown, the base 711 may be configured such that the screw 714 enters a side of the toggle actuator opening 712 and abuts a side of the toggle actuator 704. It should be appreciated, however, that the base is not limited to the illustrated orientation of the screw 714 within the base 711. The mounting assembly 710 may be configured to be mounted to the toggle 704 with the toggle actuator 704 in a first orientation in which the toggle actuator is in an up position, and in a second orientation in which the toggle actuator 704 is in a down position, while maintaining the functionality of the remote control device.

The mounting assembly 710 may include a retention member that is configured to engage with the toggle actuator 704, for instance within the toggle actuator opening 712. For example, as shown the mounting assembly 710 may include a clamp 750 that may be configured to extend into the toggle actuator opening 712, opposite the screw 714. The screw 714 may be received in an aperture 752 defined in the base 711. The clamp 750 may include one or more features that are configured to engage with the toggle actuator 704. For example, as shown, the clamp 750 may include first and second fangs 754 that may be configured to engage with (e.g., bite into) the toggle actuator 704 of the light switch 702 when the screw 714 is driven inward. Because the mounting assembly 710 is configured to engage with opposed side surfaces of the toggle actuator 704, adjustment of the mounting assembly 710 in a vertical (e.g., up and down) direction relative to the toggle actuator 704 may be possible when securing the mounting assembly 710 to the toggle actuator 704. The clamp 750 may be attached to the base 711 via a screw 756. The clamp 750 may attached such that the clamp may pivot relative to the base 711 about an axis of the screw 756 as one of the first or second fangs 754 makes contact with the toggle actuator, which may enable the clamp 750 to compensate for differing drafts on the toggle actuators of respective light switches to which the mounting assembly 710 may be mounted. The clamp 750 may be configured to attach the mounting assembly 710 to the toggle actuator 704 such that the mounting assembly 710 is not able to pivot about an axis defined by the screw 714, for instance when a downward force is applied to a control unit (not shown) that is attached to the mounting assembly 710.

A remote control device that includes the mounting assembly 710 may be configured to enable releasable attachment of a control unit (e.g., a control unit similar to the control unit 520 of the remote control device 500) to the mounting assembly 710. The mounting assembly 710 may include one or more engagement features that are configured to engage with complementary engagement features of such a control unit (not shown). For example, as shown the base 711 of the mounting assembly 710 may include resilient snap-fit connectors 716. A control unit (not shown) that is configured to be releasably attachable to the mounting assembly 710 may define corresponding recesses that are configured to receive the snap-fit connectors 716.

The mounting assembly 710 may include a release mechanism that is operable to cause a control unit to be released from an attached position relative to the mounting assembly 710. As shown, the base 711 of the mounting assembly 710 may include a release tab 718 that may be actuated (e.g., pushed inward) to release a control unit from the mounting assembly 710. The mounting assembly 710 may further include a retention tab 720. The retention tab may alternatively be referred to as a retention snap. As shown, the release tab 718 and the retention tab 720 may each include a corresponding one of the snap-fit connectors 716.

As shown, the release tab 718 may be connected to the base 711 of the mounting assembly 710 via a first resilient, cantilevered spring arm 722, such that a gap 724 into which the release tab 718 may be deflected is defined between the base 711 and the first spring arm 722. The release tab 718 may define an actuation surface 719 that is recessed relative to a circumferential outer surface 713 of the base 711. The retention tab 720 may be suspended in a pocket 726 defined by the base 711 of the mounting assembly 710, and connected to the base 711 via a second resilient, cantilevered spring arm 728, such that a gap 730 into which the retention tab 720 may be deflected is defined between the base 711 and the second spring arm 728. As shown, the retention tab 720 may be spaced inward from the outer surface 713 of the base 711.

In operation, the release tab 718 may be operated (e.g., pressed inward) to cause a control unit to be released from the mounting assembly 710. When the release tab 718 is pressed inward toward the base 711, the first spring arm 722 may deflect into the gap 724, allowing the respective snap-fit connector 716 supported by the release tab 718 to disengage from the control unit. The base 711 may be configured such that the actuation surface 719 is spaced inward from the outer surface 713 of the base 711 such that a tool is required to actuate the first release tab 718. When the release tab 718 is pressed inward toward the base 711, the control unit may be moved (e.g., laterally) such that the respective snap-fit connector 716 supported by the retention tab 720 may be disengaged from the control unit.

Figure 47B:
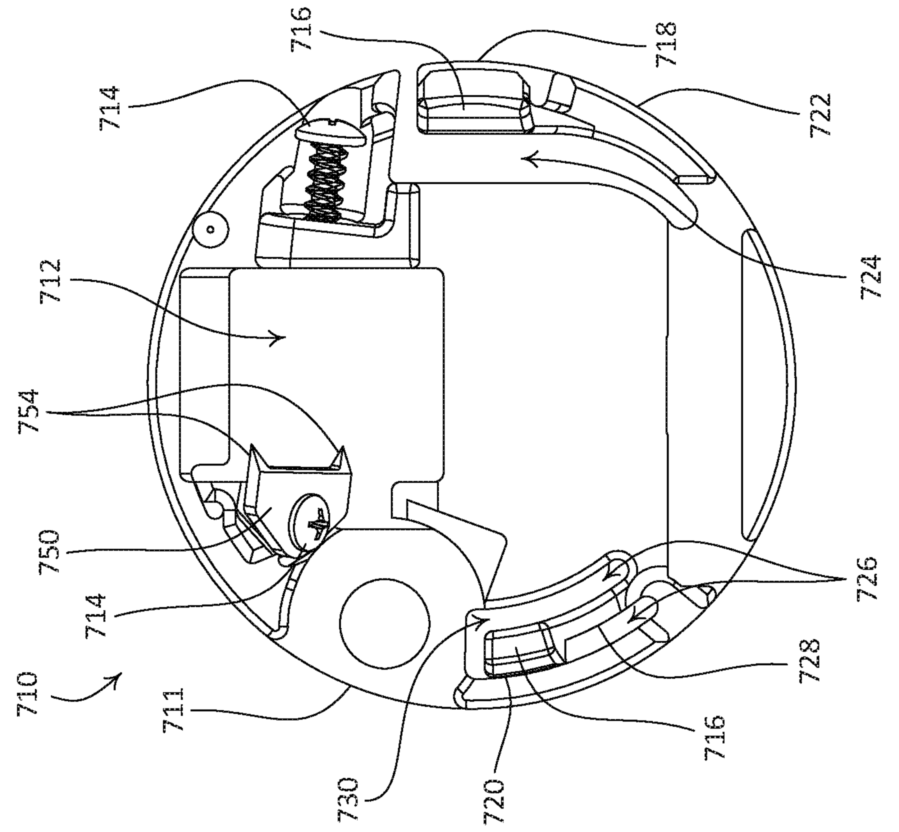
FIG. 47B is a front view of the mounting assembly illustrated in FIG. 47A.
Figure 47A:
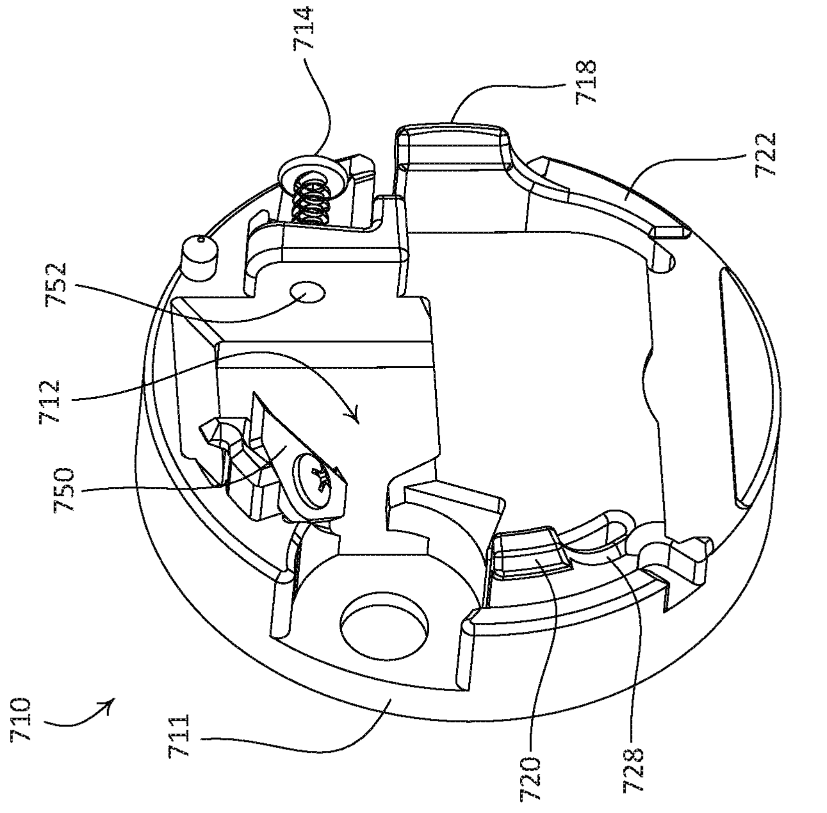
FIG. 47A is a front perspective view of a mounting assembly component of another example retrofit remote control device.
Figure 48B:
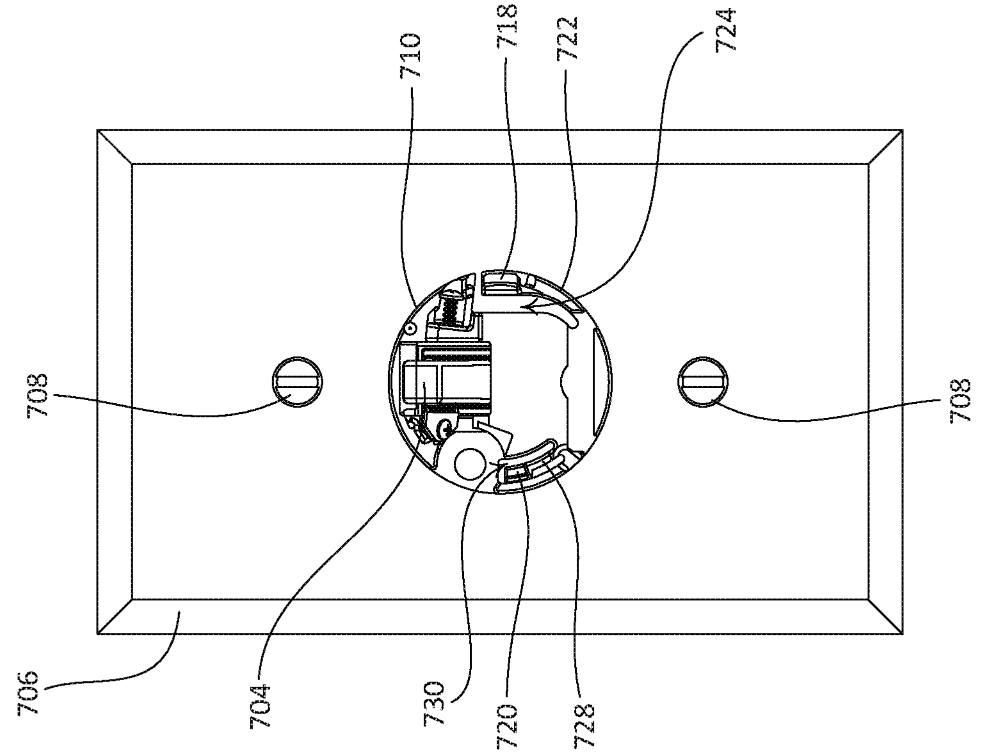
FIG. 48B is a front view of the mounting assembly illustrated in FIG. 47A, with the mounting assembly mounted over the switch actuator of an installed light switch.
Figure 48A:
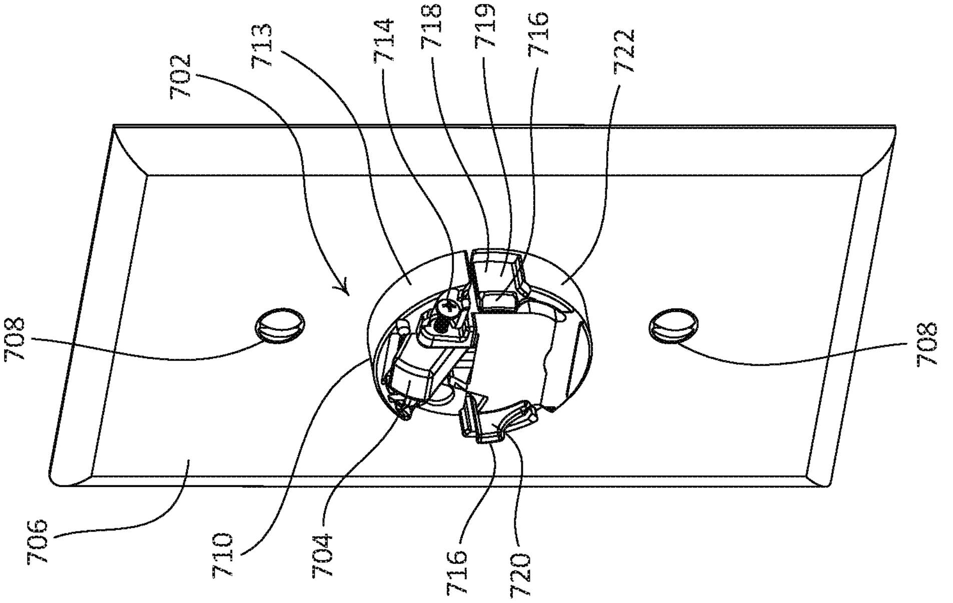
FIG. 48A is a front perspective view of the mounting assembly illustrated in FIG. 47A, with the mounting assembly mounted over the switch actuator of an installed light switch.

In an example of attaching a control unit to the mounting assembly 710, the snap-fit connectors 716 may be aligned with corresponding recesses of the control unit. The control unit may then be pressed toward the base 711, such that one or both of the first and second spring arms 722, 728 deflect into the gaps 724, 730, respectively, until the snap-fit connectors 716 of the release tab 718 and the retention tab 720 are received in and snap into place within the corresponding recesses of the mounting control unit, at which point the first and second spring arms 722, 728 may resiliently return to corresponding rest positions (e.g., as shown in FIGS. 47A-47B).

Figure 49B:
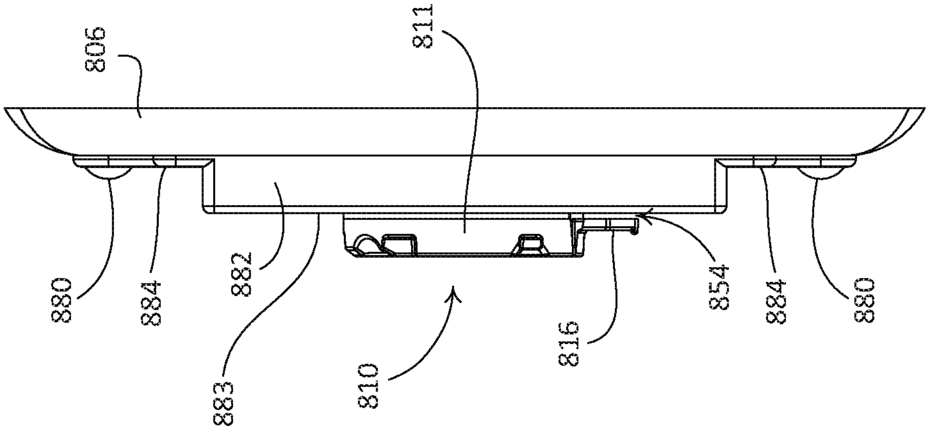
FIG. 49B is a right side view of the mounting assembly illustrated in FIG. 49A.
Figure 49A:
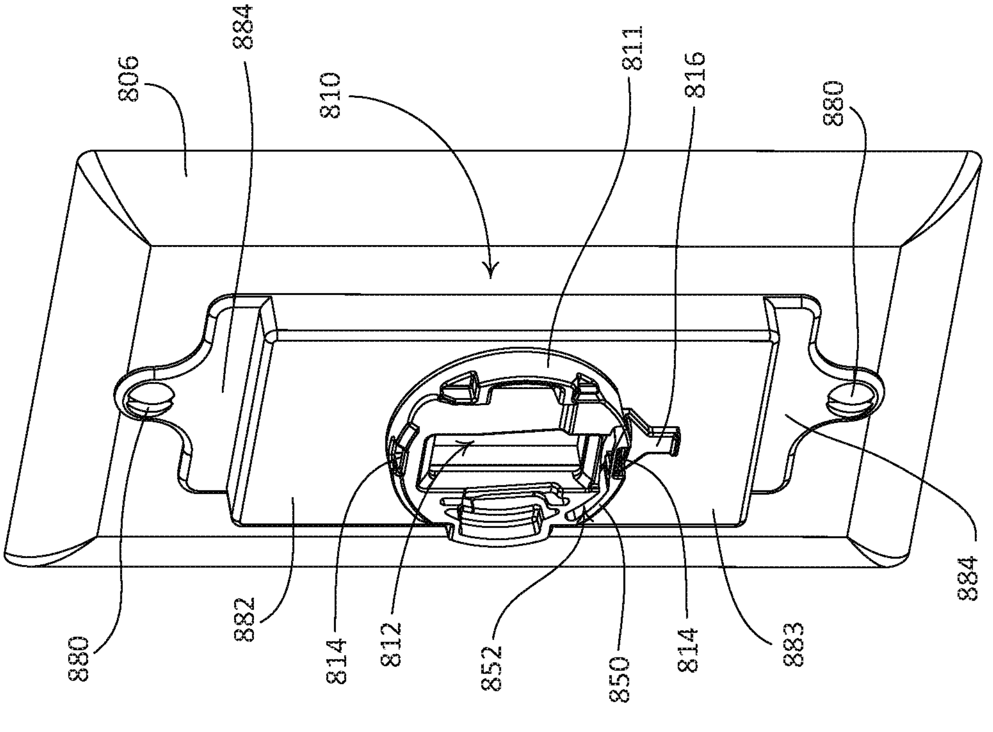
FIG. 49A is a front perspective view of a mounting assembly component of another example retrofit remote control device.

FIGS. 49A-49B depict another example mounting assembly 810 that may be a component of another example remote control device (e.g., a battery-powered rotary remote control device) that may be deployed, for example, as the remote control device 120 of the load control system 100 shown in FIG. 1. The mounting assembly 810 may be more generally referred to as a base portion of such a remote control device. The mounting assembly 810 may be configured to be mounted over a toggle actuator (not shown) of a standard light switch (not shown), such as, for example, the toggle actuator 106 of the SPST maintained mechanical switch 104 and/or the toggle actuators 204, 504, 604, 704 of the light switches 202, 502, 602, 702, respectively.

The mounting assembly 810 may be configured to be fixedly attached to the light switch via faceplate screws 880 that mount a faceplate 806 to the light switch. The mounting assembly 810 may comprise a raised portion 882 and flange portions 884. As shown, the flange portions 884 may extend from opposed upper and lower ends of the raised portion 882. The faceplate screws 880 may be received through openings (not shown) in the flange portions 884, openings (not shown) in the faceplate 806, and openings of a yoke (not shown) of the light switch to attach the mounting assembly 810 to the light switch. As shown, the mounting assembly 810 may include a base 811 that defines a toggle actuator opening 812 that extends through the base 811 and the raised portion 882 and that is configured to receive at least a portion of the toggle actuator of the light switch. The base may extend outward from a front surface 883 of the raised portion 882.

The mounting assembly 810 may be configured to be mounted to the light switch with the toggle actuator in a first orientation in which the toggle actuator is in an up position, and in a second orientation in which the toggle actuator is in a down position, while maintaining the functionality of the remote control device. The raised portion may be also sized such that the mounting assembly 810 may be mounted over a paddle switch (e.g., a standard decorator paddle switch) received in a decorator opening of the faceplate 806 (e.g., when the paddle actuator is in either an up position or a down position).

A remote control device that includes the mounting assembly 810 may be configured to enable releasable attachment of a control unit (e.g., a control unit similar to the control unit 620 of the remote control device 600) to the mounting assembly 810. The mounting assembly 810 may include one or more engagement features that are configured to engage with complementary engagement features of such a control unit (not shown). A control unit (not shown) that is configured to be releasably attachable to the mounting assembly 810 may include resilient snap-fit connectors (e.g., similar to the resilient snap-fit connectors 615 of the control unit 620). The base 811 of the mounting assembly 810 may define corresponding recesses 814 that are configured to receive the snap-fit connectors of the control unit.

The mounting assembly 810 may include a release mechanism that is operable to cause the control unit to be released from an attached position relative to the mounting assembly 810. As shown, the base 811 of the mounting assembly 810 may include a release tab 816 that may be actuated (e.g., pushed) to release the control unit from the mounting assembly 810. As shown, the release tab 816 may be connected to the base 811 of the mounting assembly 810 via a resilient, cantilevered spring arm 850, such that a gap 852 is defined between the base 811 and the spring arm 850. In operation, when the release tab 816 is pressed up toward the base 811, the spring arm 850 may deflect into the gap 852, allowing the lowermost recess 814 adjacent to the release tab 816 to disengage from the corresponding lower snap-fit connector of the control unit, such that the control unit may be released from the mounting assembly 810.

The base 811 may be fixedly attached to the raised portion 882 of the mounting assembly 810. For example, the base 811 may be connected to the raised portion 882 using an adhesive. Alternatively, the base 811, the raised portion 882, and the flange portions 884 may be molded as a single part. As shown in FIG. 49B, the base 811 may be configured such that the release tab 816, including the spring arm 850, is spaced from the front surface 883 of the raised portion 882 (e.g., for example by a gap 854 that is defined between the spring arm 850 and the front surface 883) to allow the release tab 816 to move relative to the raised portion 882 (e.g., without interfering with the raised portion 882).

In accordance with an example process of installing the mounting assembly 810 to the light switch, the faceplate screws 880 of the faceplate 806 may first be removed from the installed light switch. The toggle or paddle actuator of the light switch may be switched to the on position and the mounting assembly 810 may be installed over the toggle or paddle actuator of the light switch, for example without removing the faceplate 806. The faceplate screws 880 may then be inserted through the openings in the flange portions 884 of the mounting assembly 810 and the faceplate 806, and tightened into the openings in the yoke of the light switch. The faceplate screws 880 may be the same screws used to attach the faceplate 806 to the light switch prior to installation of the mounting assembly 810 or different screws, for example longer screws to ensure that the screws may be received through the openings of the flange portions 884, the faceplate 806, and the yoke of the light switch.

Figure 50B:
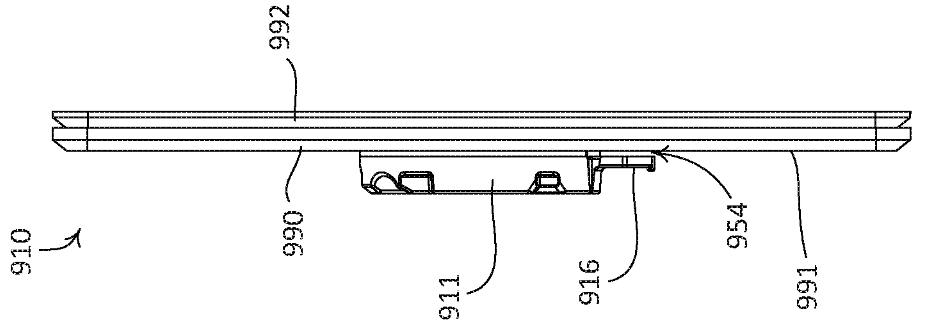
FIG. 50B is a right side view of the mounting assembly illustrated in FIG. 50A.
Figure 50A:
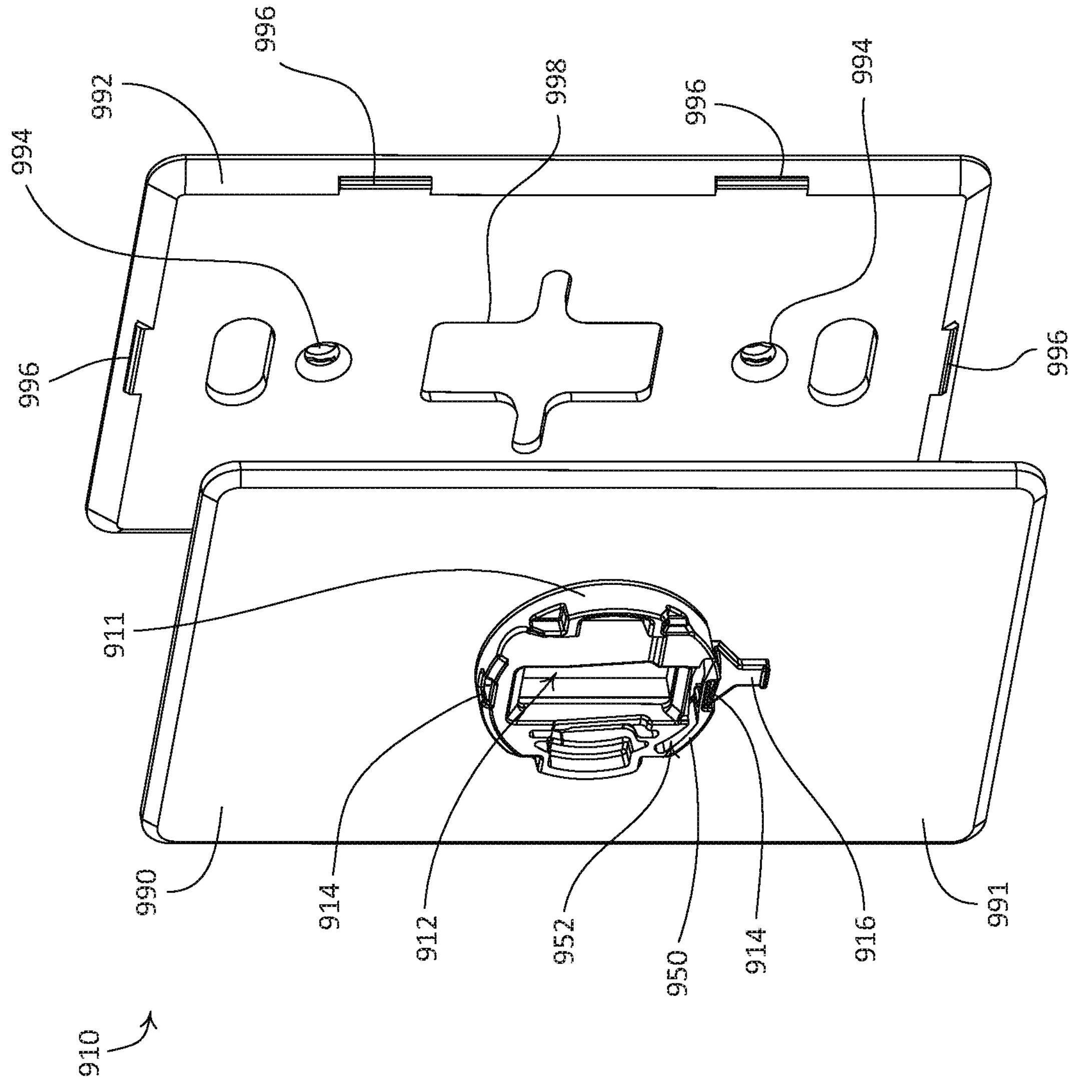
FIG. 50A is a front perspective view of a mounting assembly component of another example retrofit remote control device.

FIGS. 50A-50B depict another example mounting assembly 910 that may be a component of another example remote control device (e.g., a battery-powered rotary remote control device) that may be deployed, for example, as the remote control device 120 of the load control system 100 shown in FIG. 1. The mounting assembly 910 may be more generally referred to as a base portion of such a remote control device. The mounting assembly 910 may be configured to be mounted over a toggle actuator (not shown) of a standard light switch (not shown), such as, for example, the toggle actuator 106 of the SPST maintained mechanical switch 104 and/or the toggle actuators 204, 504, 604, 704 of the light switches 202, 502, 602, 702, respectively.

The mounting assembly 910 may comprise a faceplate portion 990 and an adapter portion 992 that may be configured to be attached to the light switch. For example, the adapter portion 992 may be fixedly attached to the light switch via faceplate screws (not shown) received through openings 994 in the adapter portion 992 and openings in a yoke (not shown) of the light switch. The faceplate portion 990 may be configured to be attached to the adapter portion 992. For example, the adapter portion 992 may comprise engagement features, such as snap-fit connectors 996, configured to engage with complementary engagement features (not shown) of the faceplate portion 990, such as corresponding recesses defined in a rear surface of the faceplate portion 990. As shown, the mounting assembly 910 may include a base 911 that defines a toggle actuator opening 912 that extends through the base 911 and the faceplate portion 990 and that is configured to receive at least a portion of the toggle actuator of the light switch. The base 911 may extend outward from a front surface 991 of the faceplate portion 990. The adapter portion 992 may define a toggle actuator opening 998 that is configured to receive at least a portion of the toggle actuator of the light switch. The mounting assembly 910 may be configured to be mounted to the light switch with the toggle actuator in a first orientation in which the toggle actuator is in an up position, and in a second orientation in which the toggle actuator is in a down position, while maintaining the functionality of the remote control device.

A remote control device that includes the mounting assembly 910 may be configured to enable releasable attachment of a control unit (e.g., a control unit similar to the control unit 620 of the remote control device 600) to the mounting assembly 910. The mounting assembly 910 may include one or more engagement features that are configured to engage with complementary engagement features of such a control unit (not shown). A control unit (not shown) that is configured to be releasably attachable to the mounting assembly 910 may include resilient snap-fit connectors (e.g., similar to the resilient snap-fit connectors 615 of the control unit 620). The base 911 of the mounting assembly 910 may define corresponding recesses 914 that are configured to receive the snap-fit connectors of the control unit.

The mounting assembly 910 may include a release mechanism that is operable to cause the control unit to be released from an attached position relative to the mounting assembly 910. As shown, the base 911 of the mounting assembly 910 may include a release tab 916 that may be actuated (e.g., pushed) to release the control unit from the mounting assembly 910. As shown, the release tab 916 may be connected to the base 911 of the mounting assembly 910 via a resilient, cantilevered spring arm 950, such that a gap

952 is defined between the base 911 and the spring arm 950. In operation, when the release tab 916 is pressed up toward the base 911, the spring arm 950 may deflect into the gap 952, allowing the lowermost recess 914 adjacent to the release tab 916 to disengage from the corresponding lower snap-fit connector of the control unit, such that the control unit may be released from the mounting assembly 910. The base 911 may be fixedly attached to the faceplate portion 990 of the mounting assembly 910. For example, the base 911 may be connected to the faceplate portion 990 using an adhesive. Alternatively, the base 911 and the faceplate portion 990 may be molded as a single part. As shown in FIG. 50B, that base 911 may be configured such that the release tab 916, including the spring arm 950, is spaced from the front surface 991 of the faceplate portion 990 (e.g., for example by a gap 954 that is defined between the spring arm 950 and the front surface 991) to allow the release tab 916 to move relative to the faceplate portion 990 (e.g., without interfering with the faceplate portion 990).

In accordance with an example process of installing the mounting assembly 910 to the light switch, an existing faceplate (not shown) of the light switch may first be removed. The toggle actuator of the light switch may be switched to the on position. The adapter portion 992 may be attached to the light switch, for example by inserting faceplate screws through the openings 994 of the adapter portion 992 and tightening the faceplate screws into corresponding openings of the yoke (not shown) of the light switch. The faceplate portion 990 may then be attached to the adapter portion 922 (e.g., snapped into place) with the toggle actuator of the light switch extending through the toggle actuator opening 912 in the base 911.

It should be appreciated that retrofit remote control devices (e.g., the example remote control devices 200, 500, 600 illustrated and described herein) may be implemented with alternative user interfaces that may be configured to be attached to the mounting assemblies 210, 510, 610, 710, 810, 910 (e.g., other than the rotating portions 222, 522, 622 and the actuation portions 224, 524, 624). For example, any of the mounting assemblies 210, 510, 610, 710, 810, 910 may be configured to have mounted thereto a remote control device having another type of actuator that moves relative to the mounting assembly, such as a linear slider and/or a rocker switch. Additionally, a remote control device having one or more buttons and/or a touch sensitive surface (e.g., a capacitive touch surface) for controlling, for example, electrical loads may be configured to be mounted to the mounting assemblies 210, 510, 610, 710, 810, 910.

It should further be appreciated that the control units 220, 520, 620 illustrated and described herein are not limited to having circular shapes, and that the control units may be alternatively implemented having other shapes. For example, any of the control units 220, 520, 620 (e.g., the rotating portions 222, 522, 622 and/or the actuation portions 224, 524, 624) may be configured with rectangular shapes, square shapes, diamond shapes, triangular shapes, oval shapes, star shapes, or any other suitable shapes. Additionally, the respective front surfaces of any of the actuation portions 224, 524, 624 and/or the side surfaces of each of the rotating portions 222, 522, 622 may be planar or non-planar. It should further still be appreciated that the light bars 226, 526, 626 are not limited to the circular geometries illustrated and described herein, and that any of the light bars 226, 526, 626 may be configured with alternative shapes, such as rectangular shapes, square shapes, diamond shapes, triangular shapes, oval shapes, star shapes, or any other suitable shapes. Additionally, any of the light bars 226, 526, 626 may be configured as a continuous loop, a partial loop, a broken loop, a single linear bar, a linear or circular array of visual indicators, and/or other suitable arrangement. Furthermore, the surfaces of any of the control units 220, 520, 620 may be characterized by various colors, finishes, designs, patterns, or the like.

It should further still be appreciated that mounting assemblies for retrofit remote control devices are not limited to configurations for mounting over an installed light switch (e.g., such as the mounting assemblies 210, 510, 610, 710, 810, 910), and that the mounting assemblies may be alternatively configured to mount to other structures. For example, any of the mounting assemblies 210, 510, 610, 710, 810, 910 may be alternatively configured to be mounted directly to a structure such as a wall (e.g., via double-sided adhesive tape). This may allow the establishment of one or more additional control locations in a space (e.g., at a location in a room that is not proximate to an installed light switch). In another example, any of the mounting assemblies 210, 510, 610, 710, 810, 910 may be alternatively configured to be mounted to a pedestal, for instance in a configuration implemented as a tabletop remote control device. In such an implementation, the mounting assembly may be integral with the pedestal, adhered to the pedestal, removably attachable to the pedestal, or the like.

It should further still be appreciated that retrofit remote control devices (e.g., the example remote control devices 200, 500, 600 illustrated and described herein) may be mounted over a light switch that is installed such that the toggle actuator is oriented other than vertically (e.g., horizontally). It should further still be appreciated that the respective release tabs of the example mounting assemblies 210, 510, 610, 710, 810, 910 are not limited to the locations and/or orientations illustrated and described herein. Stated differently, the respective release tabs of the example mounting assemblies are not limited to the illustrated downward-extending configurations or side-located configurations, and may be alternatively configured with other orientations and/or locations. For example, any of the example mounting assemblies may be alternatively configured such that the respective release tabs thereof extend from, or are located at, any alternative locations along the perimeters of the respective bases.

The invention claimed is:

1. A remote control device configured to be mounted over an installed light switch, the light switch having a switch actuator that extends through a faceplate of the light switch, the switch actuator operable to control whether power is delivered to an electrical load, the remote control device comprising:

a control unit that comprises an attachment portion and a rotating portion that is configured to rotate relative to the attachment portion, the control unit further comprising a wireless communication circuit and a control circuit that is responsive to the rotating portion and communicatively coupled to the wireless communication circuit, the control circuit configured to cause the wireless communication circuit to transmit a control signal in response to an actuation of the rotating portion; and a mounting assembly to which the control unit is attachable, the mounting assembly configured to releasably retain the control unit when the control unit is attached thereto, the mounting assembly comprising:

a base that is configured to be mounted over the switch actuator, the base having an elongated slot that extends therethrough, the slot configured to receive a portion of the switch actuator; and a bar that extends across the slot, the bar supported by the base such that the bar is translatable toward an end of the slot, wherein the bar defines an edge that faces the end of the slot, the edge configured to engage a first side of the switch actuator as the bar is translated toward the end of the slot.

2. The remote control device of claim 1, wherein the bar is operable to contact the first side of the switch actuator such that an opposed second side of the switch actuator is biased against the end of the slot, thereby securing the base in a mounted position relative to the switch actuator and causing a lower surface of the base to be biased against an outer surface of the faceplate such that the switch actuator is maintained in a first position in which power is delivered to the electrical load.

3. The remote control device of claim 2, wherein the bar contacts the first side of the switch actuator at a first location that is spaced a first distance from the outer surface of the faceplate, and wherein the second side of the switch actuator contacts an end of the slot at a second location that is spaced a second distance from the outer surface of the faceplate that is shorter than the first distance, such that the switch actuator is actively biased toward the first position.

4. The remote control device of claim 2, wherein the base is configured such that the end of the slot slides along the second side of the switch actuator as the bar makes contact with the first side of the switch actuator.

5. The remote control device of claim 2, wherein the edge is a first edge, and wherein the base defines a second edge at the end of the slot, the second edge configured to bite into the second side of the switch actuator as the bar makes contact with the first side of the switch actuator.

6. The remote control device of claim 1, wherein the mounting assembly further comprises a screw that operably connects the bar to the base, wherein driving the screw causes the bar to travel toward the end of the slot.

7. The remote control device of claim 6, wherein the base is configured to support the screw such that an axis of rotation of the screw is angularly offset relative to the outer surface of the faceplate.

8. The remote control device of claim 1, wherein the edge is configured to bite into the first side of the switch actuator as the bar is translated toward the end of the slot.

9. The remote control device of claim 1, wherein the edge is beveled inward from opposed ends of the bar, such that the edge may cause the mounting assembly to laterally self-center on the switch actuator.

10. The remote control device of claim 1, wherein the control signal causes an adjustment of an amount of power delivered to the electrical load.

11. A mounting assembly that is configured to be mounted over an installed light switch, the light switch having a switch actuator that extends through a faceplate of the light switch, the switch actuator operable to control whether power is delivered to an electrical load, the mounting assembly further configured such that a control unit that controls an electrical load is attachable to the mounting assembly, the mounting assembly comprising:

a base that is configured to be mounted over the switch actuator, the base having an elongated slot that extends therethrough, the slot configured to receive a portion of the switch actuator; and a bar that extends across the slot, the bar supported by the base such that the bar is translatable toward an end of the slot, wherein the bar defines an edge that faces the end of the slot, the edge configured to engage a first side of the switch actuator as the bar is translated toward the end of the slot.

12. The mounting assembly of claim 11, wherein the bar is operable to contact the first side of the switch actuator such that an opposed second side of the switch actuator is biased against the end of the slot, thereby securing the base in a mounted position relative to the switch actuator and causing a lower surface of the base to be biased against an outer surface of the faceplate such that the switch actuator is maintained in a first position in which power is delivered to the electrical load.

13. The mounting assembly of claim 12, wherein the bar contacts the first side of the switch actuator at a first location that is spaced a first distance from the outer surface of the faceplate, and wherein the second side of the switch actuator contacts an end of the slot at a second location that is spaced a second distance from the outer surface of the faceplate that is shorter than the first distance, such that the switch actuator is actively biased toward the first position.

14. The mounting assembly of claim 12, wherein the base is configured such that the end of the slot slides along the second side of the switch actuator as the bar makes contact with the first side of the switch actuator.

15. The mounting assembly of claim 12, wherein the edge is a first edge, and wherein the base defines a second edge at the end of the slot, the second edge configured to bite into the second side of the switch actuator as the bar makes contact with the first side of the switch actuator.

16. The mounting assembly of claim 11, wherein the mounting assembly further comprises a screw that operably connects the bar to the base, wherein driving the screw causes the bar to travel toward the end of the slot.

17. The mounting assembly of claim 16, wherein the base is configured to support the screw such that an axis of rotation of the screw is angularly offset relative to the outer surface of the faceplate.

18. The mounting assembly of claim 11, wherein the bar defines an edge that faces the end of the slot, the edge configured to bite into the first side of the switch actuator as the bar is translated toward the end of the slot.

19. The mounting assembly of claim 11, wherein the edge is beveled inward from opposed ends of the bar, such that the edge may cause the mounting assembly to laterally self-center on the switch actuator.

* * * * *